(12) United States Patent
Colson et al.

(10) Patent No.: US 7,699,954 B2
(45) Date of Patent: *Apr. 20, 2010

(54) NONWOVEN FABRIC AND METHOD AND APPARATUS FOR MANUFACTURING SAME

(75) Inventors: Wendell B. Colson, Weston, MA (US); Paul G. Swiszcz, Boulder, CO (US); David Hartman, Framingham, MA (US)

(73) Assignee: Hunter Douglas, Inc., Upper Saddle River, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/180,338

(22) Filed: Jul. 25, 2008

(65) Prior Publication Data

US 2008/0286520 A1    Nov. 20, 2008

Related U.S. Application Data

(62) Division of application No. 11/851,863, filed on Sep. 7, 2007, which is a division of application No. 09/869,941, filed as application No. PCT/US00/00571 on Jan. 10, 2000, now abandoned.

(60) Provisional application No. 60/115,600, filed on Jan. 12, 1999, provisional application No. 60/154,717, filed on Sep. 20, 1999, provisional application No. 60/155,364, filed on Sep. 20, 1999, provisional application No. 60/155,365, filed on Sep. 20, 1999.

(51) Int. Cl.
*B32B 37/00* (2006.01)
(52) U.S. Cl. .................. 156/178; 156/176; 156/177; 156/272.2; 156/308.2
(58) Field of Classification Search .................. 156/181, 156/176, 177, 178, 179, 272.2, 308.2
See application file for complete search history.

(56) References Cited

U.S. PATENT DOCUMENTS 1,890,197 A    12/1932    Sussmuth (Continued)

FOREIGN PATENT DOCUMENTS

CA    889808    1/1972

(Continued)

OTHER PUBLICATIONS

Examiner's Answer for U.S. Appl. No. 11/352,551 dated Dec. 21, 2007.

(Continued)

*Primary Examiner*—Jeff H Aftergut
(74) *Attorney, Agent, or Firm*—Merchant & Gould

(57) ABSTRACT

An apparatus for fabricating a unique nonwoven fabric which has the appearance of a woven fabric includes a supply station for parallel warp yarns, a support structure for orienting the parallel warp yarns into a cylindrical orientation, a weft yarn applicator for wrapping weft yarns around the cylindrically oriented warp yarns after an adhesive scrim has been overlaid onto the warp yarns, a heating station for activating the adhesive and a cooling station for setting the adhesive, and a cutter for severing the cylindrically formed fabric laminate so that it can be flattened and wrapped onto a take-up roller. The weft yarn applicator including a rotating drum wherein a plurality of spools of weft yarn material are mounted in circumferentially spaced relationship and a tensioner is provided for applying the weft yarn material around the warp yarns in a predetermined tension which may be the same as, greater than, or less than the tension in the warp yarns.

16 Claims, 44 Drawing Sheets

U.S. PATENT DOCUMENTS

| | | | |
|---|---|---|---|
| 2,244,203 A | | 6/1941 | Kern |
| 2,797,728 A | | 7/1957 | Slayter et al. |
| 2,985,220 A | * | 5/1961 | Fry, Jr. .................. 156/181 |
| 3,041,230 A | * | 6/1962 | Diehl ..................... 156/172 |
| 3,391,043 A | * | 7/1968 | Bascom ................... 156/181 |
| 3,531,363 A | | 9/1970 | Shambelan |
| 3,591,434 A | | 7/1971 | Hartstein |
| 3,686,048 A | | 8/1972 | Schirtzinger |
| 3,737,950 A | | 6/1973 | Bolliand et al. |
| 3,753,842 A | | 8/1973 | Pittman |
| 3,758,329 A | | 9/1973 | Garick |
| 3,848,295 A | | 11/1974 | Bolliand et al. |
| 4,132,828 A | | 1/1979 | Nakamura et al. |
| 4,360,555 A | | 11/1982 | Bascom et al. |
| 4,910,064 A | * | 3/1990 | Sabee .................... 428/113 |
| 5,061,545 A | | 10/1991 | Li et al. |
| 5,294,258 A | | 3/1994 | Jarrell et al. |
| 7,056,403 B2 | * | 6/2006 | Colson et al. ............ 156/177 |
| 7,468,113 B2 | * | 12/2008 | Colson et al. ............ 156/172 |

FOREIGN PATENT DOCUMENTS

| | | |
|---|---|---|
| EP | 0 292 266 | 11/1988 |
| EP | 1600544 | 11/2005 |
| GB | 1440081 | 6/1976 |
| GB | 2041028 | 9/1980 |
| WO | WO 00/41523 | 7/2000 |
| WO | WO 01/21877 | 3/2001 |

OTHER PUBLICATIONS

Final office action for U.S. Appl. No. 10/088,614 dated Dec. 6, 2005.
Final office action for U.S. Appl. No. 10/088,614 dated Jan. 31, 2005.
Final office action for U.S. Appl. No. 10/088,614 dated Nov. 22, 2004.
Final office action for U.S. Appl. No. 11/352,551 dated Jan. 30, 2007.
Office action for U.S. Appl. No. 10/088,614 dated Jul. 12, 2005.
Office action for U.S. Appl. No. 10/088,614 dated Mar. 24, 2004.
Office action for U.S. Appl. No. 11/352,551 dated Jun. 27, 2006.
PCT communication pursuant to article 96(2) EPC for Application No. 00 963 629 dated Nov. 4, 2004.
PCT communication pursuant to article 96(2) EPC for Application No. 00 963 629 dated May 2, 2005.
PCT preliminary examination report of application No. PCT/US00/25681 dated Jun. 15, 2001.
International Search Report for application No. PCT/US00/25681 dated Feb. 8, 2001.
Partial European Search Report for EP 05 01 4958.

* cited by examiner

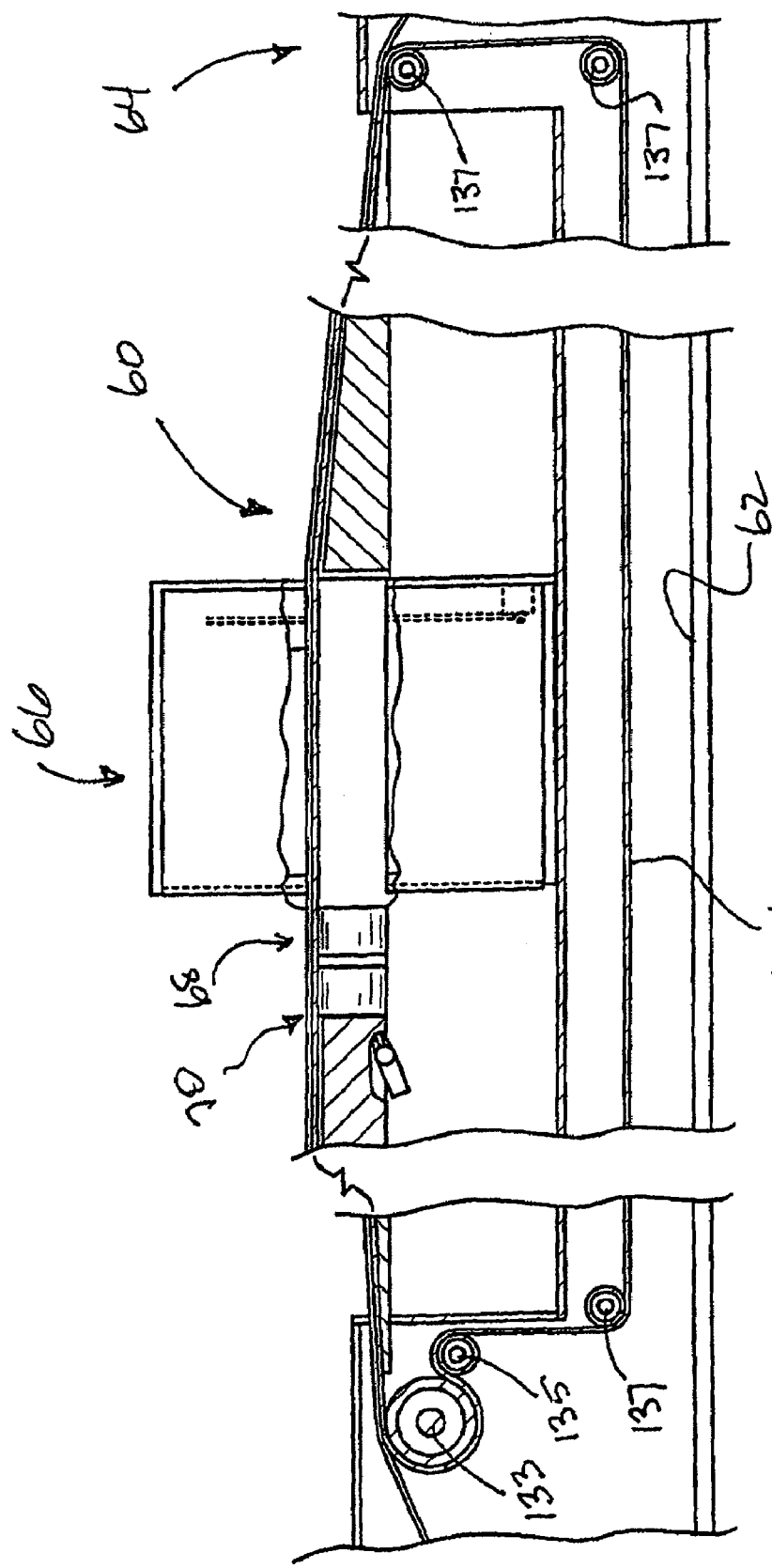

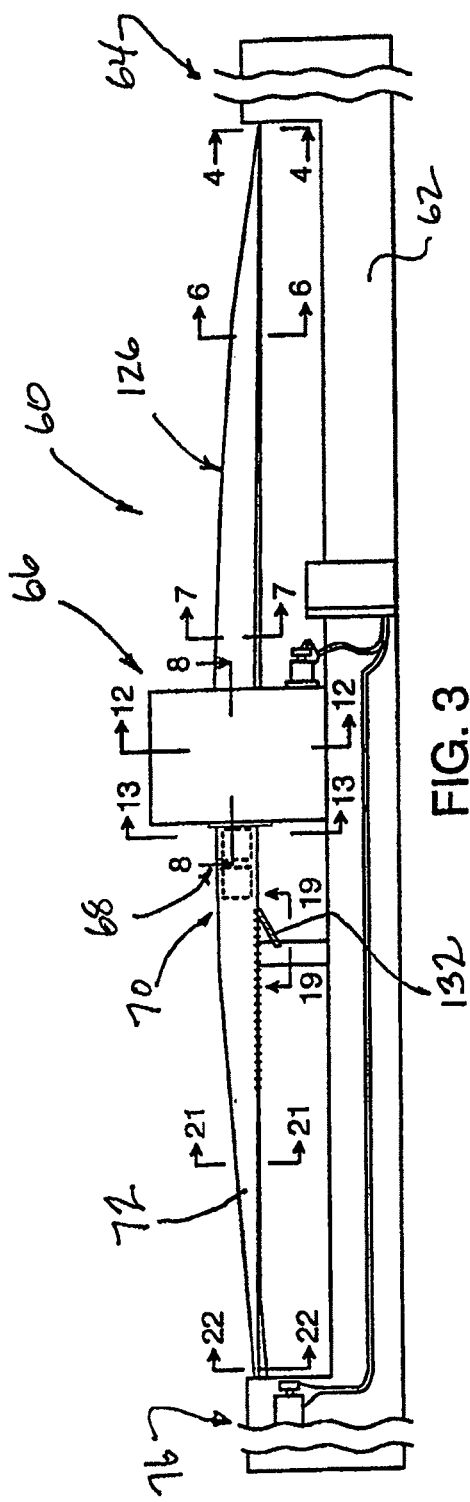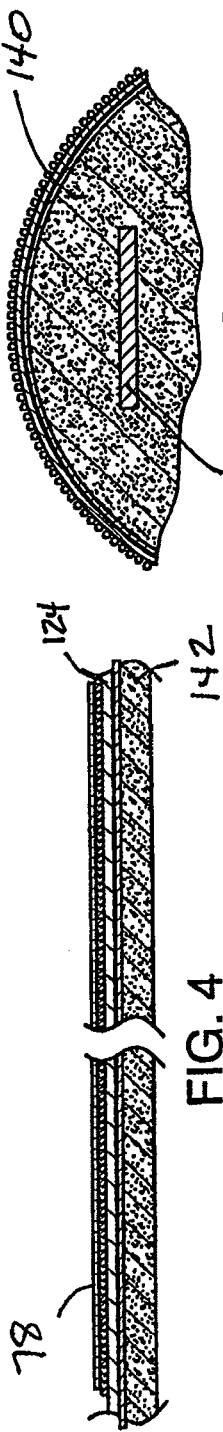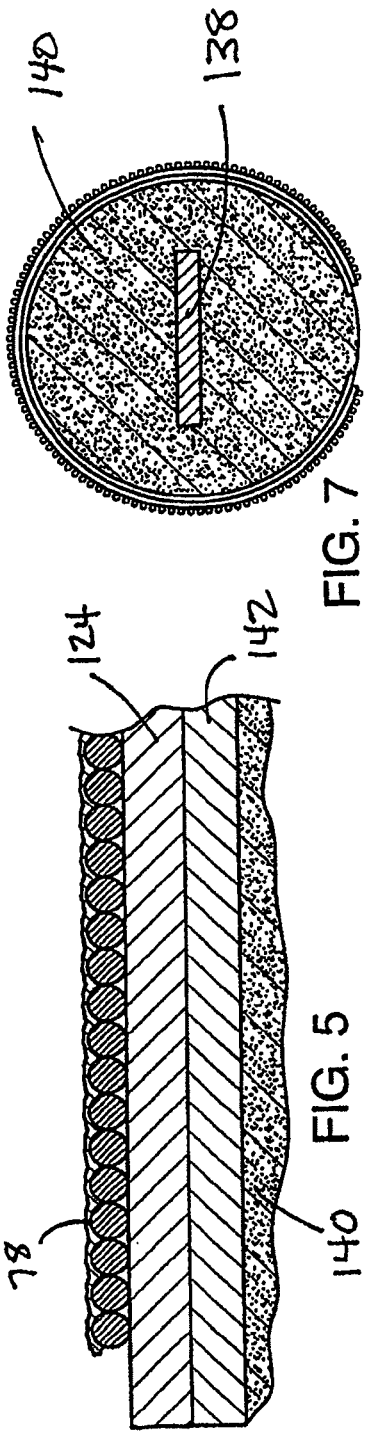

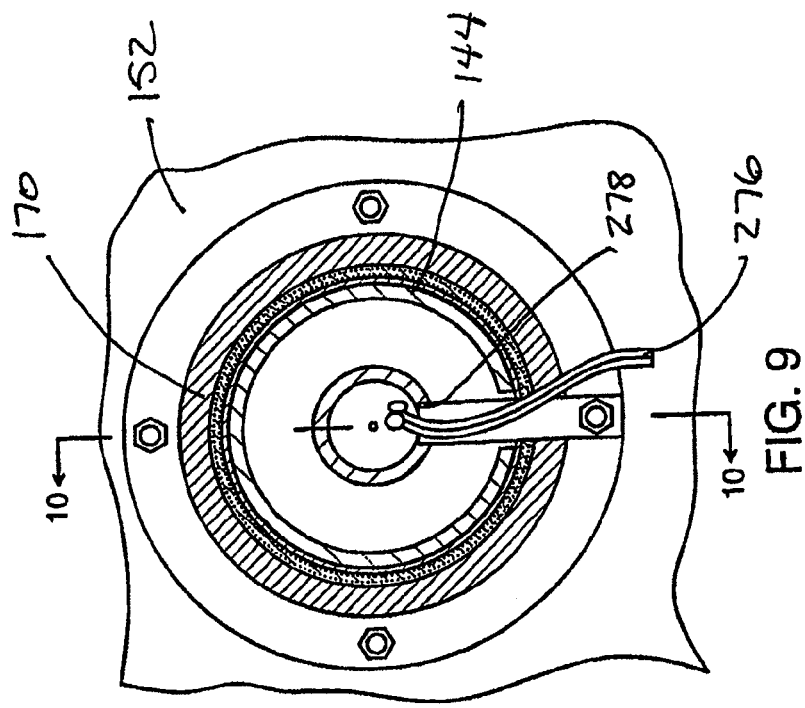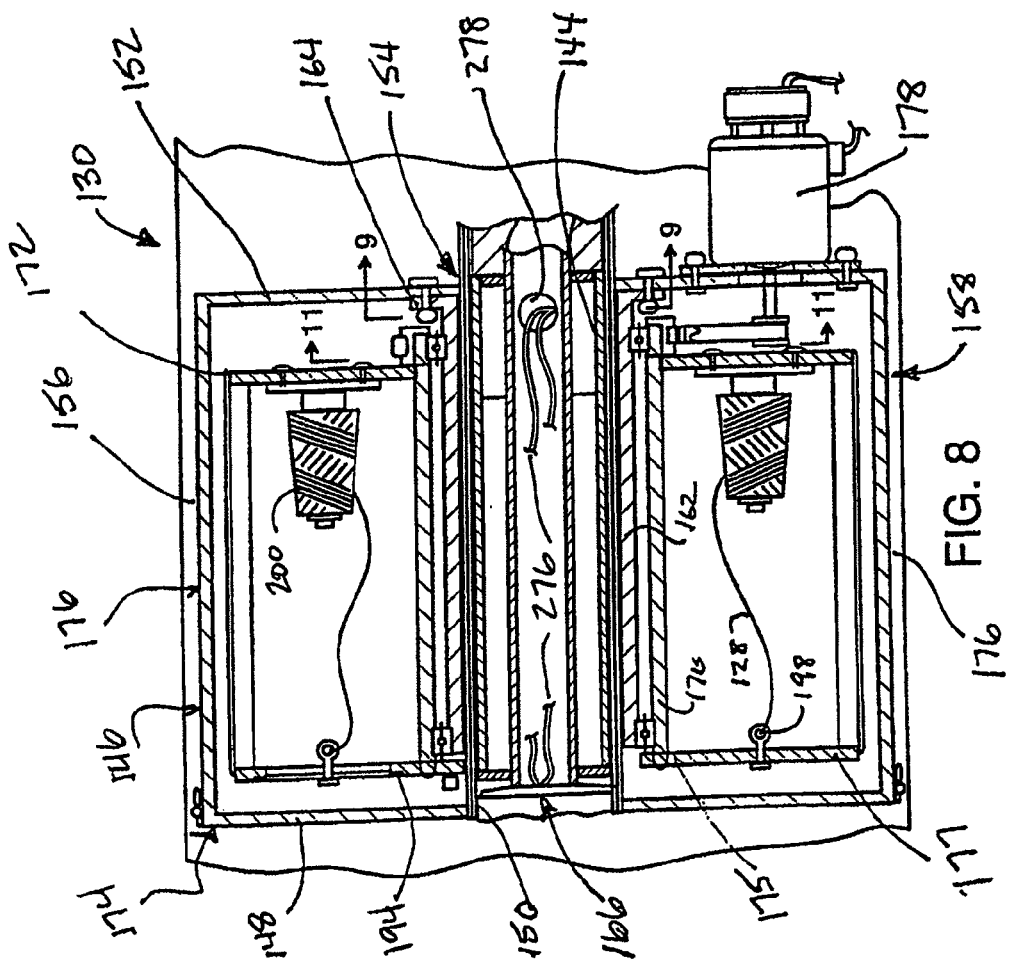

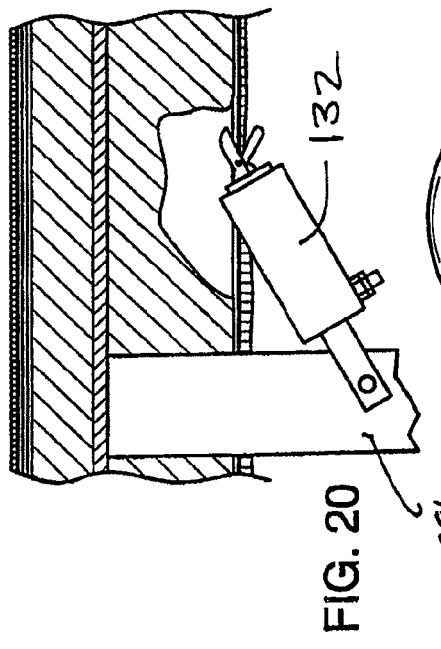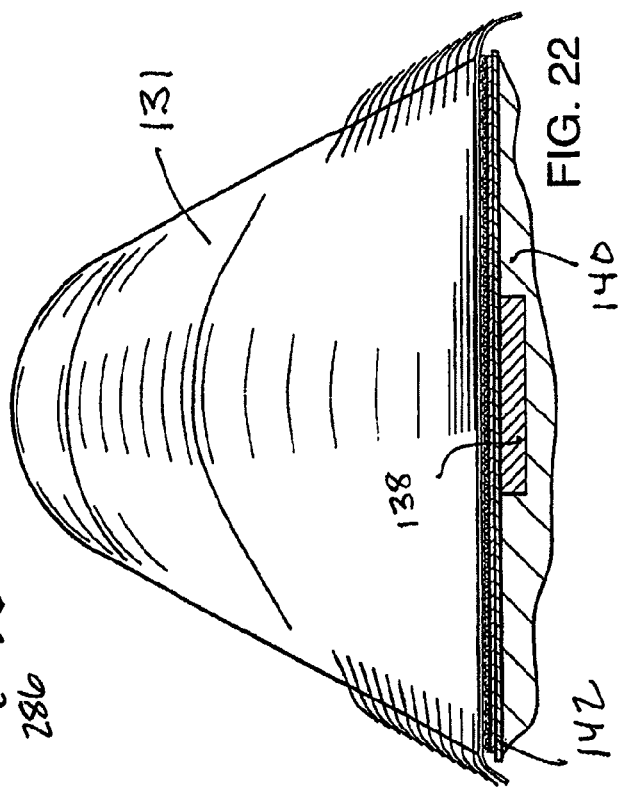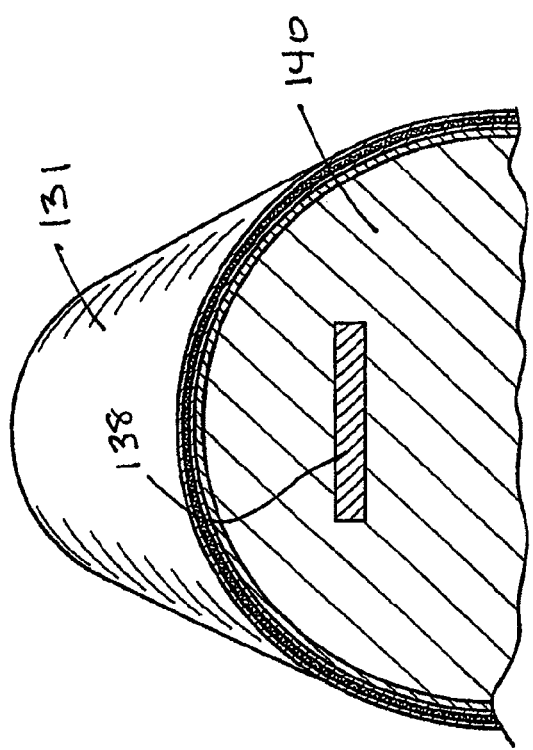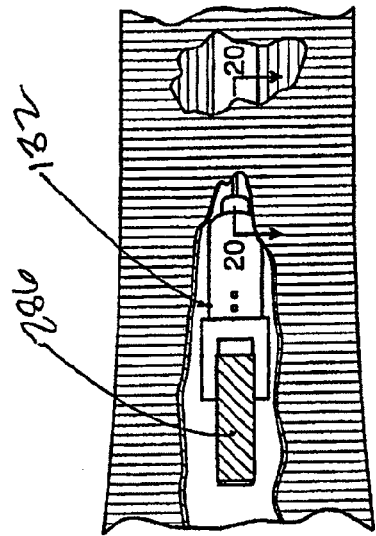

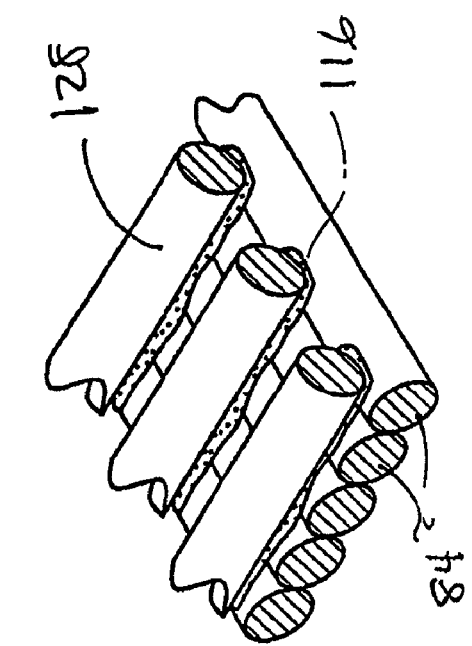
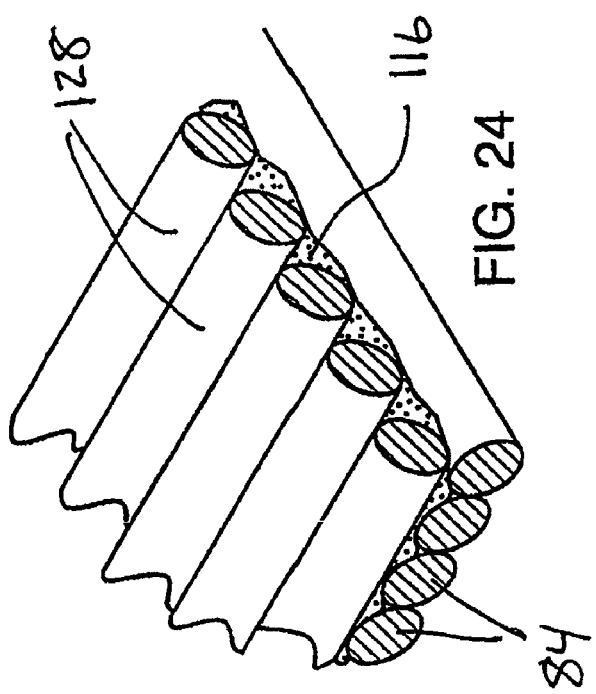
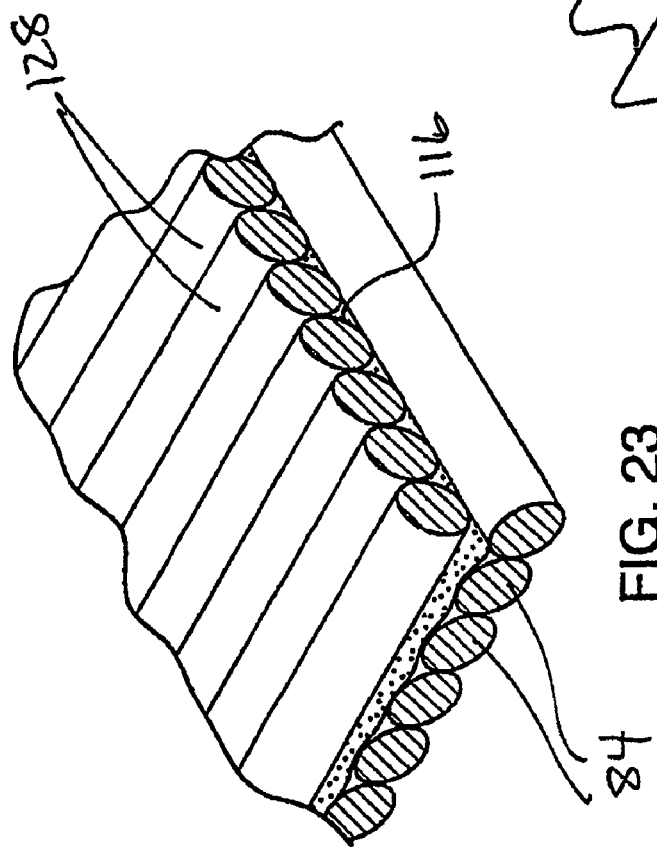
FIG. 23
FIG. 24
FIG. 25

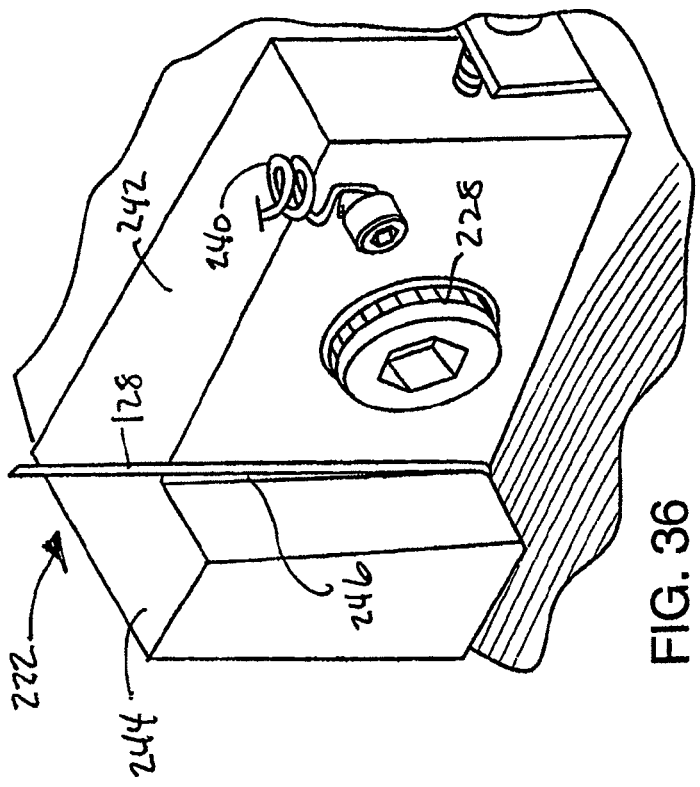
FIG. 36
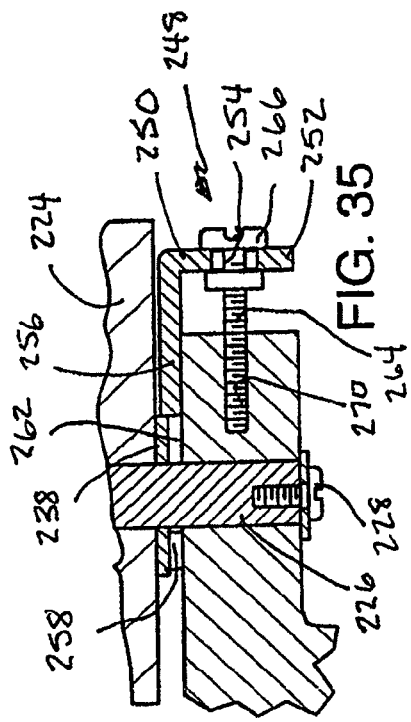
FIG. 35
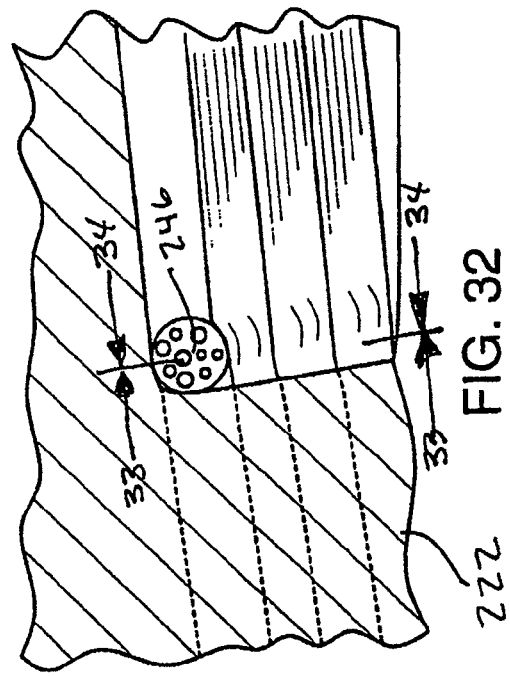
FIG. 32
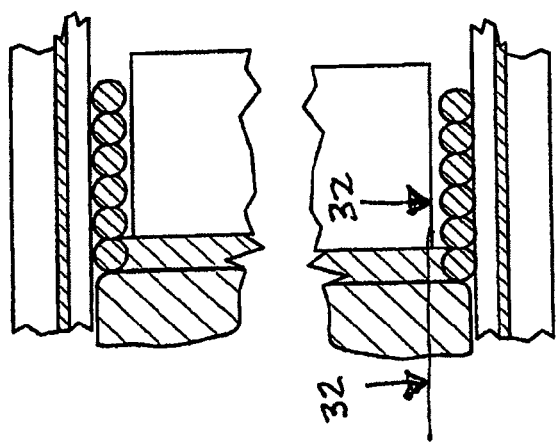
FIG. 34
FIG. 33

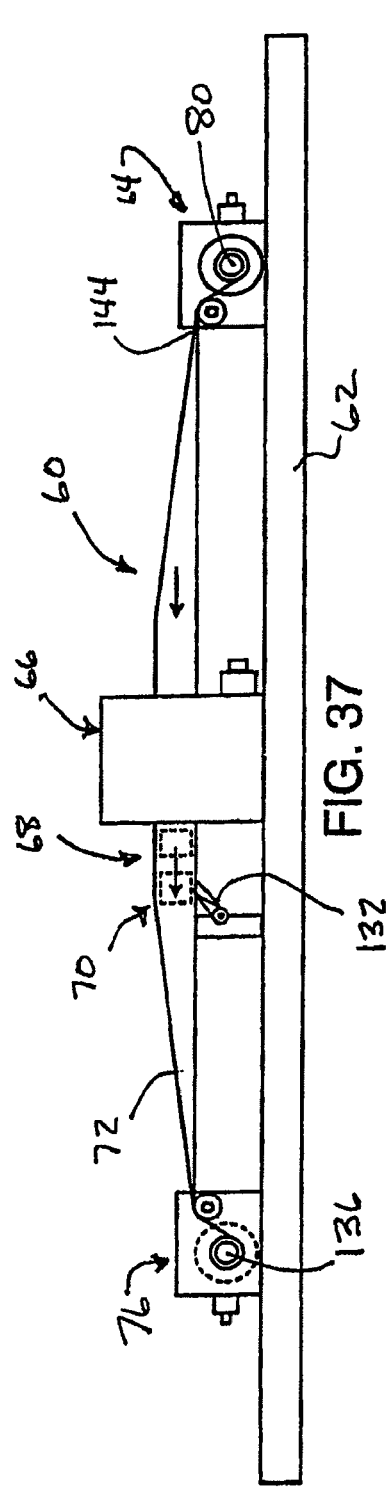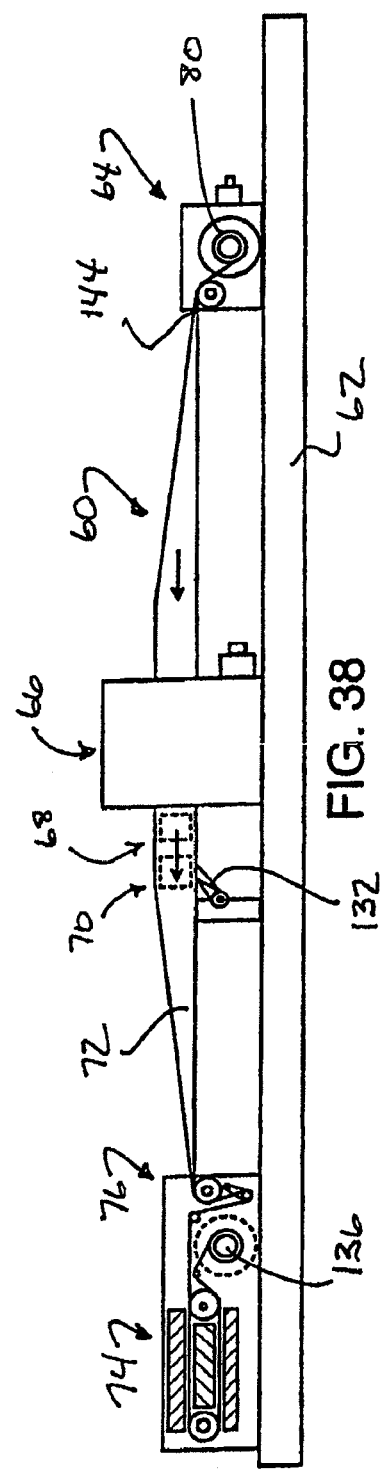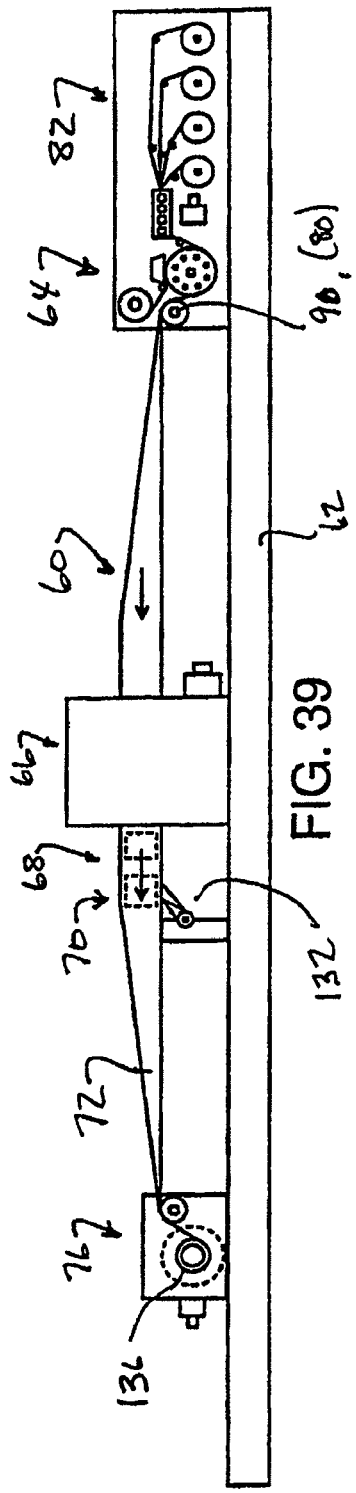

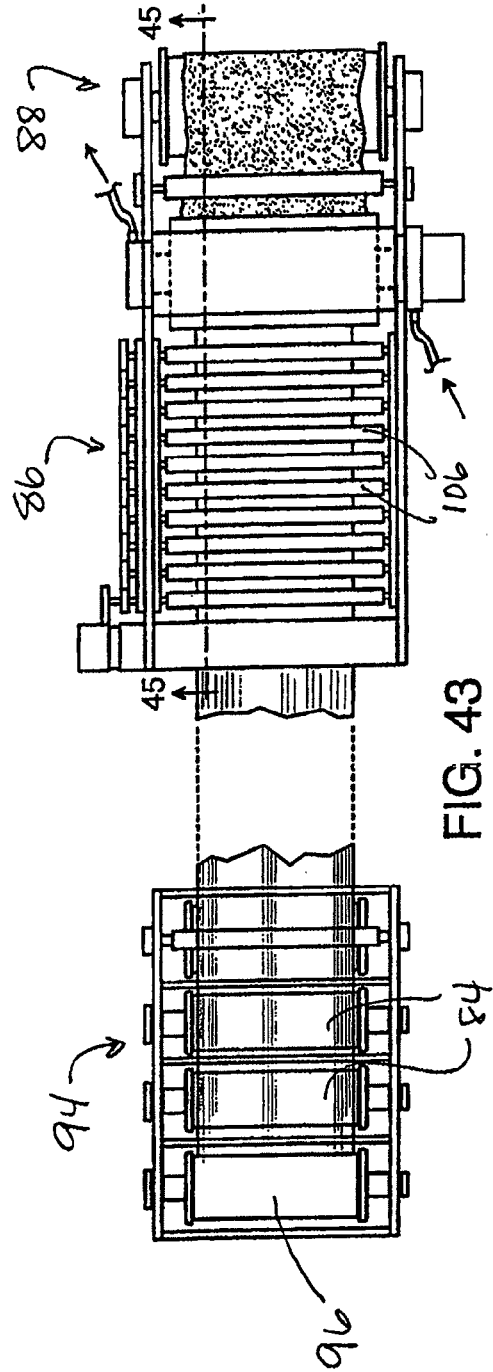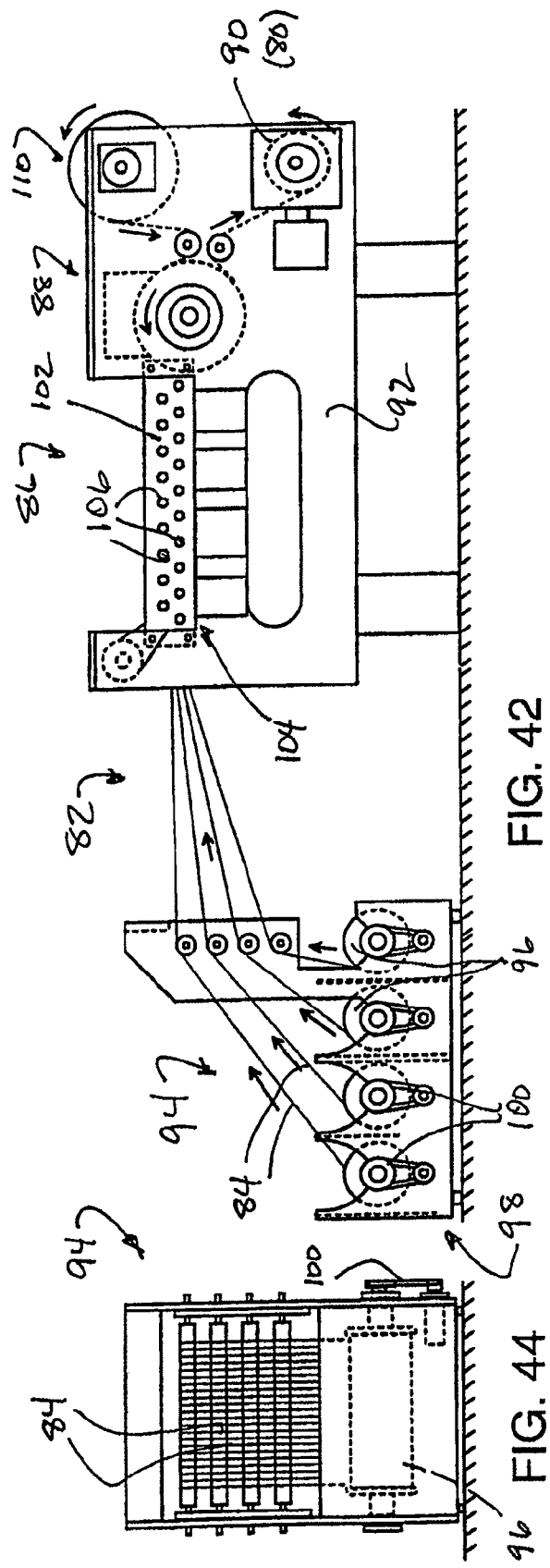
FIG. 43
FIG. 42
FIG. 44

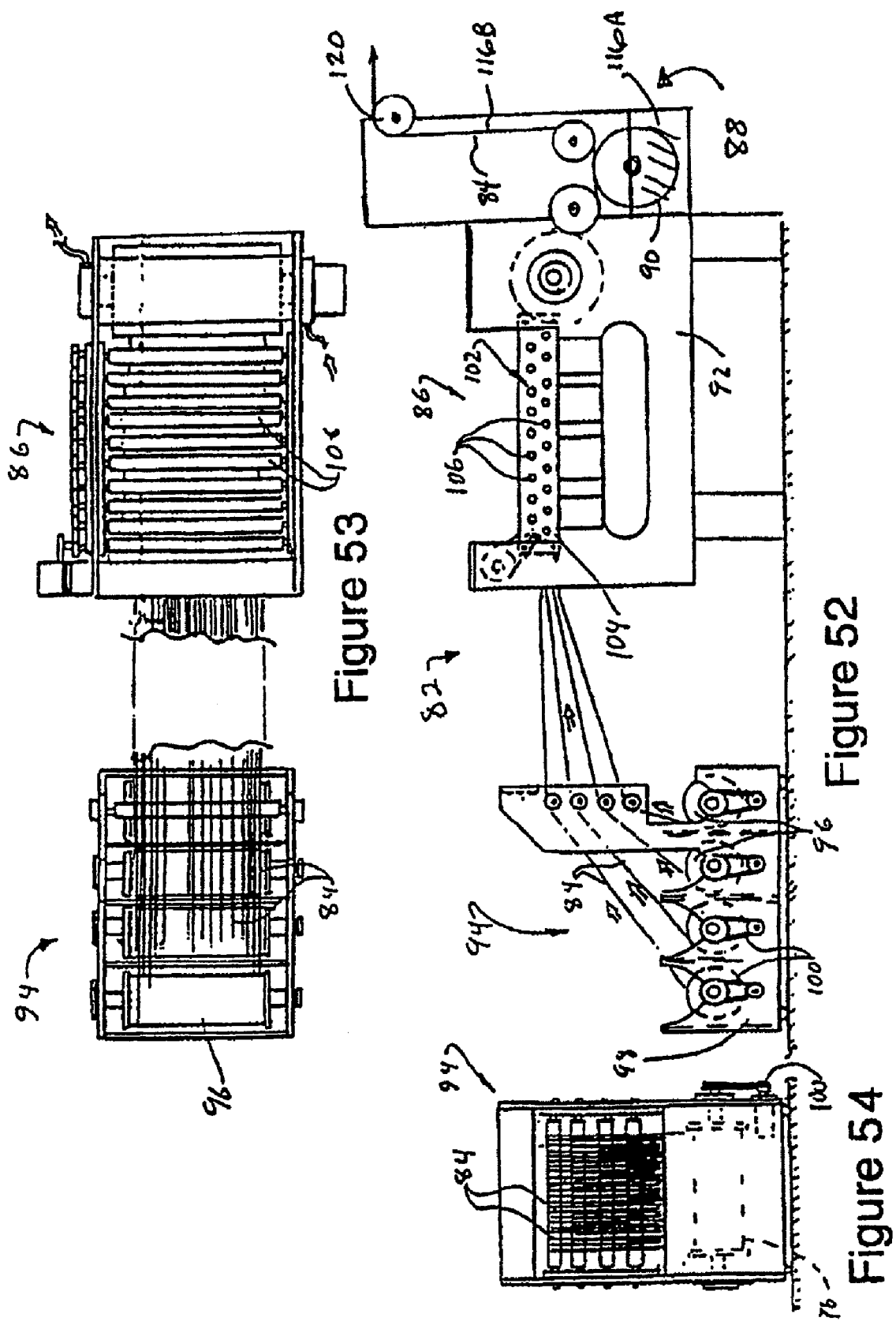

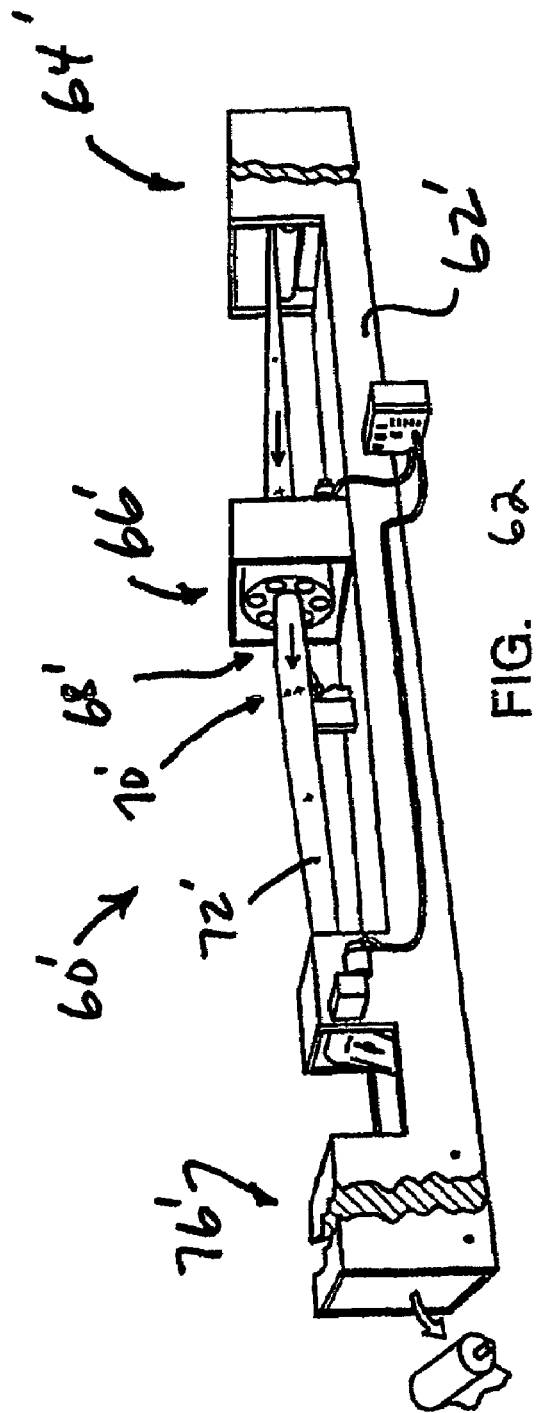
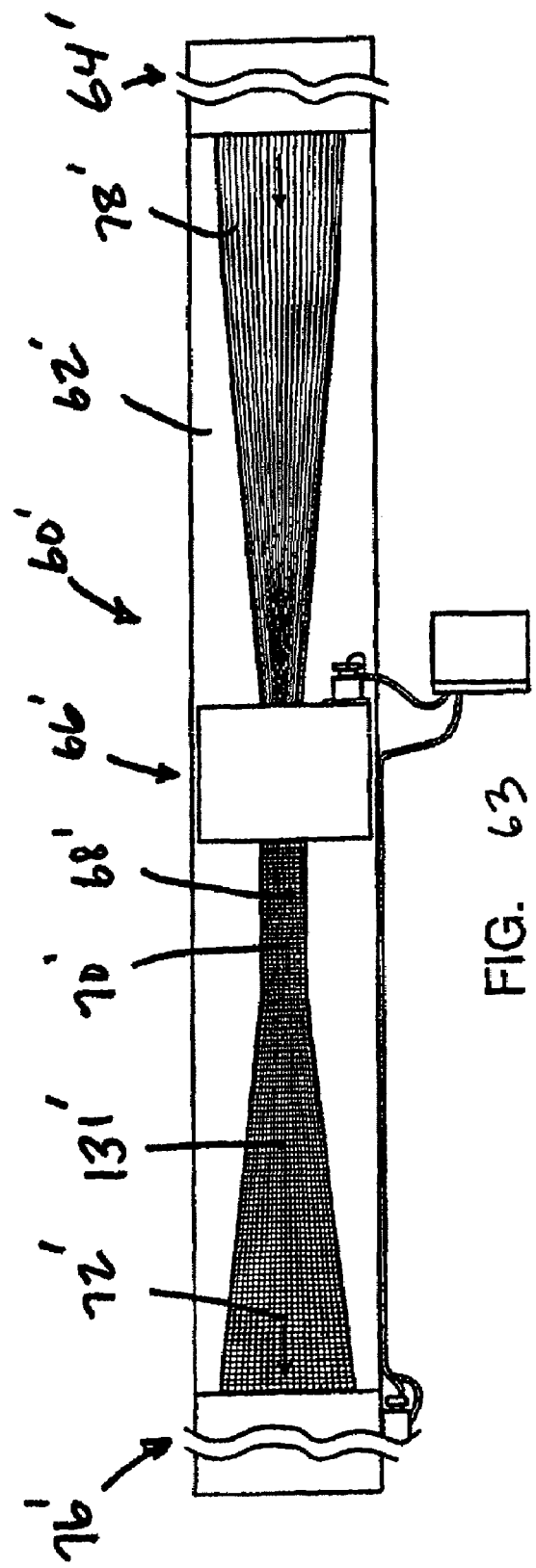

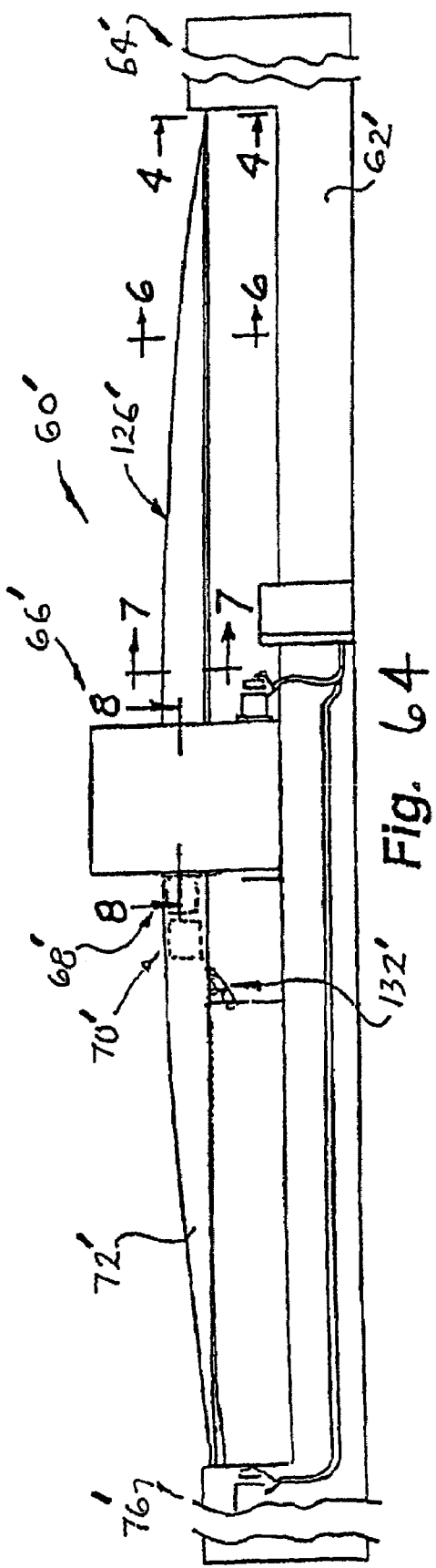

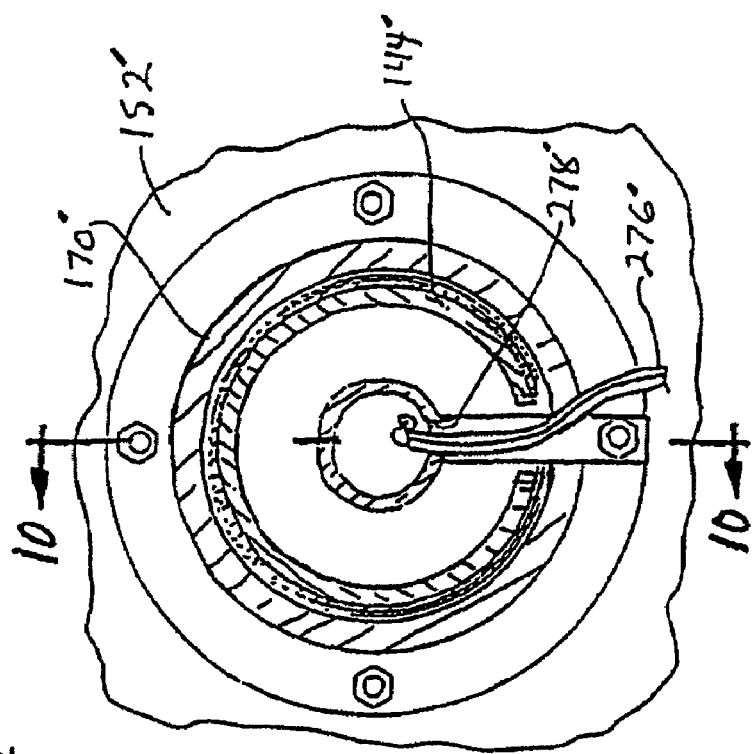
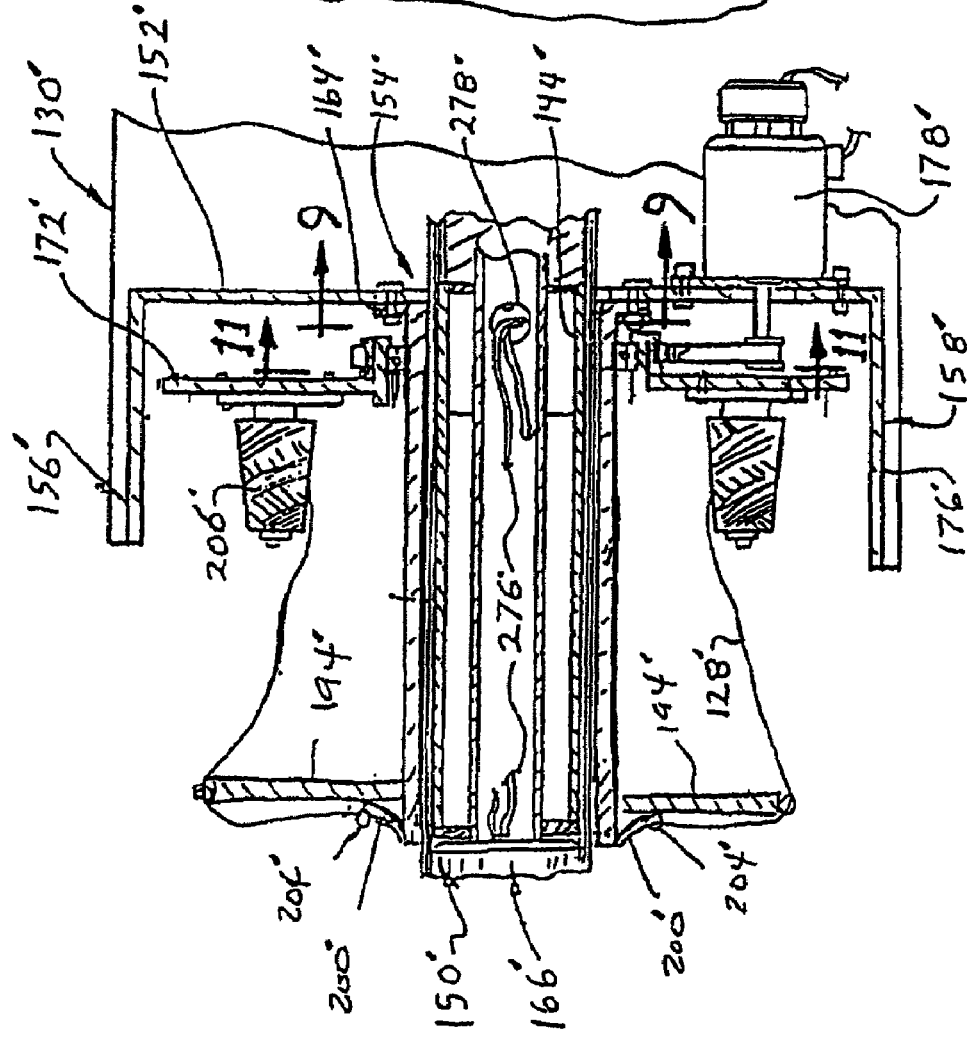
FIG 66
FIG 65

NONWOVEN FABRIC AND METHOD AND APPARATUS FOR MANUFACTURING SAME

CROSS-REFERENCE TO RELATED APPLICATIONS

This application is a divisional of U.S. patent application Ser. No. 11/851,863 filed Sep. 7, 2007, pending, which is a divisional of U.S. patent application Ser. No. 09/869,941, filed Jan. 4, 2002, now abandoned.

U.S. patent application Ser. No. 09/869,941 was a 371(c) National Phase filing of PCT Application No. PCT/US00/00571, filed Jan. 10, 2000, which designated the United States and was published in the English language on Jul. 20, 2000 as PCT Publication No. WO 00/41523. PCT Application No. PCT/US00/00571 claimed priority from the following U.S. Provisional Patent Applications Ser. No. 60/115,600, filed Jan. 12, 1999; Ser. No. 60/154,717, filed Sep. 20, 1999; Ser. No. 60/155,364, filed Sep. 20, 1999; and Ser. No. 60/155,365 filed Sep. 20, 1999. The disclosures of all of the applications listed above are hereby incorporated by reference in their entirety as if set forth herein in full.

FIELD OF THE INVENTION

This invention relates generally to nonwoven fabric materials, to processes for the preparation of such materials, and to various apparatus used in the manufacture of such materials.

BACKGROUND OF THE INVENTION

As described above, the present invention relates to nonwoven fabric materials and, more particularly, to a nonwoven fabric material which may have the appearance of a woven fabric and which is easily engineered along with an apparatus and method for manufacturing same by pulling warp yarns gently bound by an adhesive material along the longitudinal extent of the surface of a cylindrical support and subsequently helically wrapping weft yarns transversely around the cylindrically supported warp yarns prior to activating the adhesive, and setting the adhesive to bond the completed product.

Nonwoven fabrics are similar to woven and knitted fabrics in that all are planar, inherently flexible, typically porous structures composed primarily of natural or synthetic fiber materials (i.e., yarns, threads, or filaments). Nonwoven fabrics are unique in that they can be engineered to resemble woven or knitted fabrics, but they can also be made to have superior physical characteristics over woven or knitted fabrics. Thus, nonwoven fabrics are highly influenced by the properties of their constituent fibers and the manner in which the nonwoven fabric is prepared. Typical methods for preparing nonwoven fabrics include mechanical, chemical and thermal interlocking of layers or networks of the fiber materials.

SUMMARY OF THE INVENTION

The present invention comprises a nonwoven fabric-like material. The "fabric-like" material preferably has the general appearance of a fabric, most preferably of a woven fabric, and has one or more characteristics of a traditional cloth fabric, including uniformity of texture, pliability, strength, appearance, and the like. One preferred embodiment of the fabric-like material comprises substantially parallel yarn fibers (or fiber-substitutes) held together in a nontwisting manner by a series of adhesive bridges or a combination of adhesive and stray yarn fiber bridges on one side of the parallel fibers. This fabric-like material can be used as is, or it can be further transformed into other fabric-like materials by further processing as described herein. The present invention also provides a continuous, in-line method and apparatus for manufacturing such nonwoven fabrics in such a manner that the nonwoven fabric can have a variety of desirable physical characteristics. The method and apparatus are further designed such that the nonwoven fabric can be produced at a relatively rapid rate in comparison to known systems for manufacturing wovens.

Reference to the term "yarn" will be made throughout the present specification and the term should be broadly interpreted to include mono and multi-filament yarns and/or strands of various materials. The yarns may be large or small in diameter or denier, and can be made from many types of materials including, but not limited to, polyester, polyethylene, polypropylene and other polymers or plastics; wool, cotton, hemp and other natural fibers; blends of natural and/or synthetic fibers; as well as fiber-substitutes such as glass, metal, graphite and the like. It is conceivable that some of the warp and/or weft yarns may be metal and/or metal alloys such as, for example, copper and/or aluminum wire, or combinations of metal and synthetic or natural fibers. It should also be appreciated with the description that follows that various densities of warp or weft yarn wrap will be referenced and these densities will vary depending upon the type of yarn as described above and the desired characteristics of the nonwoven product being manufactured.

For the purposes of this disclosure, "warp" yarn materials include any combinations of materials or combinations of yarns that have the yarns or fiber-substitute materials primarily positioned to run in the machine direction of the apparatus and that are aligned in a controlled manner before being treated with an adhesive material to form a fabric-like, nonwoven substrate. "Weft" yarn materials include any combinations of materials or combinations of yarns that have the yarns or fiber-substitute materials primarily positioned to run substantially perpendicular to the warp yarn materials.

One especially preferred nonwoven fabric of the present invention has the appearance of a woven fabric, but is considered a nonwoven because the warp and weft yarns are not interlaced or interwoven, but instead are laid one over the other and adhered together. There are several embodiments of this product of this invention. The first embodiment involves the laydown of weft yarns onto a substrate comprised of a conventional nonwoven including, but not limited to, a bonded carded web, a wet laid, an air laid, or a spunbonded web.

In one preferred nonwoven embodiment, a bonded carded web is used as the substrate for the weft yarns. This web material is particularly suited for the nonwoven of the present invention because the carding process, by its nature, typically orients fibers in the machine direction of the web. A fiber orientation in which the majority portion of the fibers run in the machine directions creates a substrate in which the fibers mimic warp yarns and are substantially perpendicular to the orientation of the weft yarns. When viewed with a light shining through a product in accordance with the present invention, the perpendicular orientation of the carded fibers in the web relative to the weft yarns, creates the visual impression of a woven material.

The bonded carded web can be printed with an adhesive or, in accordance with one embodiment of the present invention, a randomly oriented adhesive lace or scrim can be lightly bound to its surface prior to application of the weft yarns. This type of adhesive lace allows for the use of a low level of adhesive by weight in a loosely applied laydown such that there are portions of the weft yarns that are not adhesively connected to the warp nonwoven substrate. The structure, because of the discontinuous adhesive laydown, also has a certain degree of porosity which mimics the breathability of a woven which has a yarn-on-yarn construction and no film. The resultant structure has improved hand that mimics that of a woven material. The adhesive is preferably made from thermoplastic polymer, but other adhesives may be used including thermoset adhesives, and 100% solid adhesives. The preferred type of adhesive is preferably a thermally activated copolyester that on a weight basis represents about 10-20% of the weight of the complete nonwoven structure. This adhesive scrim is sandwiched between the nonwoven substrate described above, and the weft yarns. Once activated, the adhesive holds the weft yarns to the nonwoven substrate.

In yet another embodiment, a plurality of warp yarns are formed into an aligned group, substantially parallel and equally spaced apart. If desired, different warp yarns, for example yarns of various types (synthetic, natural, yarn-substitutes) and/or yarns of various deniers, can be aligned using this apparatus, resulting in nonwoven fabric materials having particularly interesting and unique properties. This parallel grouping of yarns is advantageously fixed in place by forming an adhesive coating, printed on only one side of the warp yarns, using a hot melt roll coater. Cooling of the hot melt adhesive occurs almost instantaneously, and the resulting product is a fixed web or substrate consisting essentially of a plurality of aligned warp yarns and an adhesive film positioned substantially only on one side of said yarn fibers.

An especially preferred embodiment of the warp yarn material generator used herein comprises a warp yarn aligner, through which a plurality of individual yarns or threads (alike or different) are passed to be placed in substantially parallel alignment. Once aligned, the yarns are next passed to the adhesive station, which is preferably a hot melt roll (e.g., gravure) coater. In this device, a thin film of hot melt adhesive is imprinted on only one side of the plurality of aligned warp yarns. The adhesive does not remain as a film after application; the adhesive typically partially separates when applied to the parallel yarns. Bridges of adhesive and/or fragments of yarn strands (each independently with or without an adhesive coating) form and/or otherwise extend over the spaces between parallel yarns. These bridges hold the yarns together and prevents individual yarns or threads from twisting relative to one another.

As used herein, the term "bridges" is meant to define the physical result of applying a thin film of adhesive to one side of aligned warp yarns; namely a combination of adhesive strands, adhesive coated fragments of yarn strands, and/or fragments of yarn stands which contact adhesive on two or more aligned yarns (e.g., at two or more points), such that the series of aligned warp yarns are held together in a substantially user selected spatial arrangement, and wherein the yarns do not twist, rotate, or otherwise separate relative to one another due to the presence of the bridges on one side. In other words, the bridges lock the yarns in place in a manner selected by the manufacturer of the warp yarn material. Upon cooling of the adhesive, a flexible, yet unified substrate web of warp yarns having the look and feel of a nonwoven fabric, is obtained. This warp yarn substrate is suitable for further processing as a nonwoven fabric or otherwise. If desired, this combination of the warp yarns and adhesive may be wound onto a spool for later handling, or formed into sheets for other uses as desired.

The preferred warp yarn aligner has a plurality of vertically displaced sets of horizontally spaced rollers. The upper set of rollers is within a horizontal plane positioned above a horizontal plane containing the lower set of rollers, though it is conceivable that the orientation of the sets of rollers are not an upper and lower set of rollers but possibly a left and right set of rollers or somewhere in between so that the plane of the sets of rollers would be horizontally rather than vertically displaced or somewhere in between. The rollers are aligned transversely with each other. In the arrangement where the rollers are positioned within horizontal planes, each roller in a set is horizontally offset from rollers in the other set so that rollers in each set are positioned between rollers of the other set and the outer perimeter of the rollers in one set overlaps the outer perimeter of the rollers in the other set. In this manner the warp yarns which pass transversely through the sets of rollers must pass under the upper set of rollers and over the lower set of rollers contacting all of the rollers in each set with an engagement are on each roller. It has been found that an engagement are of about 20 degrees is preferable herein, although higher or lower degrees should also be useful. At least some of the rollers may be roughened on their outer surface to impart a vibration to the yarns, preferably in the plane of the web.

The warp yarns, e.g., from a beam of the same, are roughly aligned when delivered to the rollers, e.g., through a comb device or otherwise, are passed through the spaces between the sets of rollers as described above. The rollers are driven at a roller-face speed that is faster than the linear speed of the yarns. By over driving the rollers relative to the linear speed of the yarns it has been discovered that the yarns will become substantially parallel. The textured rollers could be run at a speed slower than the yarns and achieve the same effect, but over speeding the rollers at a ratio within the range of 2:1 to 3:1 has been found to be very effective. Parallel alignment of the warp yarns is important for most nonwoven products because it results in a uniform appearance of the yarns which makes the end product look more like a woven product.

One preferred hot melt adhesive applicator is a Rototherm® hot melt roll coater. In operation of the hot melt adhesive coating apparatus the series of parallel warp yarns are drawn through the glue apparatus, supported by a series of rollers. A thin film web (ranging from about 0.25 to 1 mil) of hot melt adhesive is continuously gravure coated onto one side of the aligned warp yarns. The actual thickness of the film web varies within the range specified, and depends upon the weight of the fabric, and is usually applied at from about 5% to 25% of the fabric weight. For a fabric weight of 50 g/m$^2$ the adhesive may be applied at from about 2 to 15 g/m$^2$, preferably at from about 5 to 10 g/m$^2$. After being gravure coated, the warp yarn substrate rapidly solidifies, fixing the parallel arrangement and equal spacing of the yarns. The adhesive film web also prevents twisting or rolling of the yarns, which maintains the "feel" of the product. A cooling path is provided to ensure that the adhesive web is set before the substrate is collected, e.g., in a roll form, sheet form, or otherwise as desired by the manufacturer or end user.

The yarn orientation produced in this embodiment, in which the fibers run in the machine direction, provides a nonwoven fabric material substrate in which the fibers mimic warp yarns, which can be used in subsequent nonwoven manufacturing processes to make materials that have the visual impression aid physical feel of a woven material. Such materials often exceed the physical characteristics of woven fabrics, particularly with respect to strength, resistance to tearing, fraying, and the like, without the necessity of post treatments, including chemical treatments, to achieve these properties. Post treatments, if desired, could still be employed, particularly if beneficial properties were achieved thereby.

While the above described adhesive methods are preferred embodiments, other methods of preserving the aligned warp yarn strands could be employed. For example, the warp yarns can be contacted with a dry adhesive layer that is heated and then cooled to bond the materials; the adhesive could be applied with a melt blown applicator; or the aligned warp yarn strands could be bound via an adhesive to another layer of material, a film of adhesive, or a substrate comprising adhesive and another nonwoven fabric material.

Another embodiment of the nonwoven fabric of the present invention involves the combination of warp yarns and weft yarns, with the weft yarns being positioned substantially perpendicular to the warp yarns. The terms "substantially perpendicular" are used to define an approximately 90 degree relationship of the cross-directional intersection of the weft and warp yarns to one another. This may vary by up to about 5 degrees in either direction away from a perfect 90 degree intersection, e.g., from about 85 degrees to about 95 degrees. One such product produced in accordance with the present invention has an intersection angle of about 89.7 degrees.

In one embodiment of the cross-directional (or "XD") apparatus, the warp and weft yarns are adhered to one another with the same adhesive material that is used to bond the warp yarns as a substrate. The yarn density can approach as high as 140 yarns per inch for a single strand 36 cotton count yarn. This is substantially higher than the density available in the same yarn count of a conventional woven fabric which has a maximum yarn density of about 90 yarns per inch for the same yarn.

The use of an open structure adhesive material (e.g., scrim, lace or the like) in the preferred embodiments of the XD apparatus allows the formation of a finished fabric structure with very good hand properties. This is due to the ability of both the warp and the weft yarns to move freely in the positions where they are not joined by the adhesive lace. The adhesive preferably represents less than 5-20% by weight of the entire structure.

In yet another embodiment of XD apparatus, the warp and weft yarns are again positioned substantially perpendicularly to one another as described above, but instead of being joined by an adhesive scrim or lace, they are joined by a melt blown adhesive web. The meltblown process is well known in the art and creates micro denier yarns. These yarns can be laid down more uniformly than the adhesive scrim, but yet use less adhesive in the structure. The micro denier yarns if activated properly will create a finished structure that has good hand, but a more uniform appearance than the finished structure provided with an adhesive scrim.

A preferred XD apparatus used herein for joining the warp yarn materials and the weft yarn materials includes the following components:
(a) a supply station for aligned warp yarn materials and the adhesive material, whether as a film, scrim or lace; or a meltblown web or other bondable material added to the supply station,
(b) a warp yarn material delivery station where the warp yarn material is conformed longitudinally to the outer surface of a cylindrical support so as to extend longitudinally of the support,
(c) a weft yarn application station through which the warp material passes,
(d) a heating or adhesive activating station,
(e) a cooling or adhesive setting station, and
(f) a fabric take-up station; e.g., a take-up roll, a sheeter, or the like.

In the operation of one version of the XD apparatus, the transfer roll of warp yarn material that is produced on the warp yarn material manufacturing unit is transferred to the supply station and the warp yarn material is extended through the apparatus on a transfer belt from the supply station to a take-up station. As the warp yarn material extends through the apparatus it is supported along the length of a substantially cylindrical, or as an alternative a polygonal cross-sectioned, support surface on the transfer belt and the warp yarns or fibers maintain their parallel relationship along the length of the cylindrical surface. The warp yarn material is thereby disposed in a substantially cylindrical configuration. A drive roll is positioned between a take-up roll at the take-up station and a cooling or adhesive setting station that is upstream from the take-up station. The drive roll rotates the transfer belt along the length of the support surface thereby advancing the warp yarn material through the apparatus at little or no tension and at a predetermined and variable speed. Alternatively, the take-up roll can be replaced with other conventional processing equipment, including for example, a sheeter, a laminator, or the like.

Prior to encountering the adhesive activating and setting stations, the warp yarn material passes through the weft yarn application station where a plurality of continuous weft yarns are wrapped around the warp yarn material with the adhesive material disposed between the warp yarn material and the weft yarns. It will be appreciated that as the warp yarn material passes through the weft yarn application station it is still in a substantially cylindrical configuration. The cylindrical composite structure of warp yarn material, adhesive and weft yarns is passed through the activating or heating station where the adhesive is activated to bond the warp yarn material and weft yarns together. Immediately thereafter, the composite structure passes through the setting or cooling station where the adhesive is set so that the warp yarn material and weft yarns are adhesively bonded together into a substantially fixed nonwoven relationship which has the appearance of a woven product. It will be appreciated by those skilled in the art that other systems for activating and deactivating the adhesive can be used, such as by way of example, moisture, high frequency light, pressure or other temperature regulating systems. A cutter longitudinally cuts the composite structure and as the material continues through the apparatus, the material is forced into a planar configuration as the support surface is progressively converted from a cylindrical configuration to a flat configuration.

In one embodiment of the weft yarn application station, an enclosed rotating drum is provided that has a ring-like enclosure with a plurality of supplies of weft yarn materials on separate individual spools, cones or the like. The drum has a cylindrical axial passage along its longitudinal axis through which the warp yarns with the overlying adhesive pass. Each spool of weft yarn material is associated with a tensioner also mounted on the rotating drum that is spaced slightly from the cylindrical axial passage so as to be in closely spaced relationship with the warp yarn material and adhesive. The weft yarn material passes through the tensioner and subsequently around a guide pin that is also mounted on the drum but immediately adjacent to the warp yarn material and adhesive overlay. The weft yarn material, after passing through the tensioner, extends around the guide pin and immediately onto the adhesive and is caused to be laid transversely around the adhesive and warp yarns as the drum rotates about its axis. The tensioner is adjustable so that the tension in the weft yarn, as it is wrapped around the warp yarn material, can be adjusted so as to have a tension the same as, greater than or less than whatever tension there may be in the warp yarns.

In the tensioner embodiment described above, up to twelve spools of weft yarn material can be mounted within the rotating drum on a radial wall thereof even though the size of the drum can be increased or the density of the spools within the drum can be increased so as to allow for more or less than twelve spools. By providing twelve spools of material at a pre-determined equal circumferential spacing within the drum, the drum can be properly balanced so that it can be rotated at high rates of speed substantially without vibration.

In the tensioner embodiment, it is also important that the twelve spools, or however many are used, are at an exactly equal angular displacement relative to each other. Exact angular displacement and the pushing of the weft yarns against the next adjacent weft yarn results in the weft yarns being precisely and controllably placed so as to optimize weft yarn packing. If an alternative spacing is desired however, then the exact equal angular displacement is not necessary. In such cases the fiber spacing will be controlled by a predetermined angular spacing of the rolls.

The drum also has a separate power source for rotating the drum at a different speed than the power source at the take-up station in the apparatus which advances the transfer belt and the warp yarn material through the apparatus. Accordingly, the warp yarn material can be moved linearly through the apparatus along the cylindrical support at either a selected steady speed and/or at a variable speed, while the rate of rotation of the drum can be at an independent selected steady speed and/or at a variable speed. This allows the weft yarns to be wrapped around the warp yarn material at predetermined constant and/or desired variable spacings and also at an angle relative to the longitudinal axis of the warp yarn material. In other words, while the weft yarn material is wrapped substantially perpendicularly to the warp yarn material, in reality it is slightly offset from perpendicular and the angle of offset can be varied by varying the rate of rotation of the drum relative to the linear speed at which the warp yarn material is advanced through the drum. For example, if the user wished to vary the average spacing of the weft yarns, the belt speed would be adjusted relative to the speed of the drum (one faster, one slower). Varying the degree of difference in relative speeds changes the weft yarn to warp yarn spacing and incidentally changes the angle of laydown of the weft yarns.

In an especially preferred embodiment of the XD apparatus, several components previously identified have been modified and/or omitted, as discussed in detail below. The warp yarn material continues to be supported on a transfer belt and configured into a cylindrical form. A drive roll continues to drive the cylindrical warp yarn material through the weft yarn application station, where the cylinder of warp yarns are supported to allow application of the weft yarns. Heating and cooling stations are used to set the adhesive between the warp and weft layers, and the cylindrical form is cut and flattened under tension to form a unified structure having the appearance of a woven fabric.

In this embodiment, the weft yarn application station comprises an enclosed rotating drum that has a ring-like enclosure with a plurality of supplies of weft yarn material on separate individual spools, cones or the like. The drum has a cylindrical axial passage along its longitudinal axis through which the warp yarns with the overlying adhesive pass. The cylindrical axial passage is fitted with a conical aligner, which serves as the final guide for guiding the rotating weft yarns into position on the warp yarns in substantially perpendicular alignment. The conical aligner is a stationary unit, which has an angled or sloped surface directed toward the forward movement of the warp yarns. A preferred slope ranging from about 15 to 60 degrees has been found to be effective, with a 45 degree slope being most preferred.

Each of the weft yarns are delivered to a fixed point on the stationary conical aligner, and from that point each yarn falls down the slope of the aligner and finally falls into place on the cylindrical warp fabric yarns, landing on the adhesive on the exposed surface of the warp yarns. By use of the conical aligner described herein, the weft yarns do not overlap one another. Instead, the weft yarns slide down the aligner and onto the warp fabric. In tight packing cases, the tension imparted to the weft yarns causes individual yarns to hit one another, whereas in loose packing cases, the individual yarns do not usually strike one another on the conical aligner. The individual fibers are laid transversely around the warp yarn substrate where they contact the adhesive on the one side of the warp yarn substrate as the drum rotates. As described above, the speed of rotation may vary as desired, from very slow (e.g., 200 rpm or less) to very fast (e.g., over 1000 rpm). A speed of about 500-600 rpm has been found to be very useful in forming the preferred nonwoven fabrics. Tension of the weft yarns is automatically provided by the centrifugal rotation of the drum.

It will be appreciated that both the tensioning of the weft yarns and the conical aligner's guiding of the placement of the weft yarns at the surface of the warp yarn material, in conjunction with the rotation of the weft yarns around the warp yarn material results in very high accuracy of weft yarn placement. High accuracy of the yarn placement can result in high weft yarn packing density, uniformity of the weft yarn, structural engineering of the fabric based on known placement of the weft yarns, and overall improved performance of the product.

As in the tensioner embodiment described above, a number of spools (e.g., 8, 10, 12, 14, 16, 18, etc.) of weft yarn material can be mounted within the rotating drum on a radial wall thereof even though the size of the drum can be increased or the density of the spools within the drum can be increased so as to allow for more or less than twelve spools. An even number of spools has been found easy to space evenly within the drum. However, an odd number of spools could likewise be employed, if spaced properly in the drum to maintain a balanced state.

It will be appreciated that while the nonwoven product may be heat set and given a finished high strength bond lamination while still in the cylindrical configuration on the substantially cylindrical support surface as described above, an alternative heat set and lamination method may be used.

In one preferred alternative method, post lamination treatment of the bonded warp and weft yarns may be desirable. A lamination apparatus may be used, either as a separate unit, or as an integral part of the XD apparatus, positioned, e.g., between the drive roll and the take up roll. A laminator in this section is preferably a flat belt laminator. The nonwoven material is fed through the post laminating section under a predetermined tension and is re-heated, and re-cooled, before being wound up onto the take up roll. The use of the flat belt laminator may reduce curl and/or shrinkage in the cross-direction of the product and produce a better bond.

One especially preferred laminator apparatus comprises a separate unit with a dual belt driven, continuous pressure lamination section that utilizes pressure, heat and cooling to bond at least two substrates (plies) with adhesive between the layers of the substrates.

Such a separate laminator apparatus can be employed to make a variety of composite and/or reinforced materials. One or more of the component parts of the laminate (i.e., the substrates or plies) may be a woven fabric material, a non-woven fabric web, or a mat of fibers. Adhesive materials, preferably thermoplastic materials, are used to bond the various substrates in the laminate construct. These materials may be melted and remelted over and over. When used to laminate yarns, especially polymer yarns, thermoplastic copolyester adhesives are preferred, as these materials may be selected to have a melting temperature below the melting temperature of the yarns. Industrial type laminates that may be formed using the laminator described herein include natural and/or synthetic fabric-based, asbestos-based, glass-based, nylon-based, flame-retardant and/or flame-resistant based, and mixtures thereof. Laminates of other materials may also be prepared as will be appreciated by those having ordinary skill in the field.

Nonwoven fabrics such as those formed on either of the XD apparatus described above are one especially preferred class of materials used as the plies or substrates in the pressure laminator described herein. Preferably, both substrates are nonwoven fabric substrates, one of the fabric substrates representing the weft strands and another representing the warp strands. The adhesive used to bond the nonwoven substrates should be activated by heat during the lamination process. The combination of pressure, heating to activate the adhesive and cooling of the joined substrates while still under pressure, minimizes shrinkage, sets the yarn size in the final nonwoven fabric laminate, and imparts high strength, including fray resistance characteristics, to the final product. In addition, because the laminate is being formed under pressure, the warp and weft yarns are forced into intimate contact, whereby the adhesive between the layers is spread there between, giving the final laminate the appearance of a woven product. The adhesive is captured between the warp and the weft yarns, preferably in an invisible manner.

The most preferred lamination apparatus used for pressure bonding nonwoven substrates has an outer housing or frame in which a rectangular pressure box is mounted. The shape of the box need not be rectangular, but this shape is currently preferred. The pressure box comprises two spaced apart sections, an upper section and a lower section, each of which has pressure seals along its four edges, and each of which is further provided with a plurality of both heating and cooling elements. Two counter rotating drive belts, an upper drive belt and a lower drive belt, contact one another at and together run through a space between the two sections of the pressure box. The belts are dimensionally larger (length and width) than the seals of the pressure box. This is necessary to permit pressurization of the box, both above and below the two belts. One belt is driven in a clockwise manner and the other belt is driven in a counterclockwise manner. Once the belts are in motion, one end of the pressure box is the inlet (feed) end and one end is the outlet end of the laminator.

The lower section of the preferred pressure box is mounted rigidly to the frame or housing, whereas the upper section of the pressure box can be adjusted as necessary to permit access to the interior of the box. Normally, the sections are spaced apart sufficiently to permit passage of the drive belts therethrough under pressure (or in a depressurized state), with or without material to be laminated therebetween. If desired, these positions could be reversed, with the lower section e.g., spring mounted against a fixed position upper section.

During the lamination process, substrate materials to be laminated are passed through a pressure seal at the inlet end of the pressure box, and into the space between the two drive belts. Air pressure applied to the upper and lower sections of the pressure box is used to compress the air-impermeable belts toward one another, creating a diaphragm effect between the belts, thereby compressing the substrates situated therebetween. Movement of the two belts through the pressure box allows for the continuous feeding of substrate materials and thermoplastic adhesive. Once therein, the substrates are nipped or pressed together by the diaphragm effect caused by the pressure applied to the belts. The pressed substrates are then heated under pressure, melting and spreading the adhesive. This allows the substrate layers to come close together, preferably with at least some portions of the warp and weft yarn strands becoming coplanar or nearly coplanar. The heated substrates are then cooled, while still under pressure, forming the final laminate. The cooled laminate exits the pressure box through an exit pressure seal, where it is collected as desired. When two or more nonwoven polyester substrates (e.g., at least one warp substrate and at least one weft substrate) are laminated in this apparatus, the thickness of the laminate at the outlet end of the laminator is at least 5%, preferably at least 10% and most preferably at least about 20% less than the combined thickness of the substrates and adhesive, as measured at the inlet end of the laminator.

The upper and lower sections of the pressure box are equipped with a plurality of heating and cooling elements, which are used to activate and set the thermoplastic adhesive between the substrate layers. Heating and cooling can be accomplished by any means available to the skilled artisan. For example, hot pellets, contact heating bars, radiant heating bars, hot fluids (e.g., oil), hot gases (steam), and the like can be employed. Likewise, cooling fluids (e.g., water), adiabatic cooling methods, cold gases, and the like can be employed. If desired, two separate pressure fluids can be employed, one serving as the heating medium, the other serving as the cooling medium. The skilled artisan can readily devise equivalent pressurization and heating and/or cooling systems given this disclosure.

In an especially preferred embodiment, the plurality of heating and cooling bars located in the lower section of the pressure box are rigidly mounted, whereas the plurality of heating and cooling bars in the upper section of the pressure box are mounted so as to float on top of the materials being laminated. This arrangement has been found to be especially useful in the preparation of nonwoven fabrics. Shrinkage is minimized or eliminated and the final laminate has the physical characteristics (feel and appearance) of a thermomechanically finished fabric.

Advantageously, at least about 10%, preferably at least about 25% and most preferably about 50% of the box interior at the inlet end of the pressure box is provided with heat bars, and the remainder of the pressure box, again, at least about 10%, preferably at least about 25% and most preferably about 50% of the box interior, is provided with cooling bars. The heating bars are ideally located at the inlet end of the pressure box and the cooling bars are ideally located at the outlet end of the pressure box. If desired, multiple zones of heating and cooling could be included within the pressure box; e.g., heat/cool, heat/cool, heat/cool, etc. Alternatively, the sequence can include a preheat section, a full heating and hold, followed by a cooling sequence. The only requirements for successful lamination are the heat activation of the adhesive and the cool setting of the adhesive, both occurring under pressure.

The current rectangular pressure has a pressure area about 1500 square inches ($in^2$). The drive belts, which are substantially non-porous Teflon® coated belts, are pressurized from both sides of the pressure box with air (or other fluid medium) pressure of at least 2 psi, preferably at least about 5 psi, and most preferably at least about 10 psi. Higher pressures can be achieved with modification of the equipment to support and sustain the same. This pressure applied to the belts is equivalent to a compressive weight (force) ranging from about 3000 lbs to about 15,000 lbs, applied over the 1500 $in^2$ area of the current pressure box. For laminating the nonwoven fabrics of the present invention, a compressive force from about 5,000 lbs to about 15,000 lbs is typical, and a compressive force of about 15,000 lbs (at 10 psi gauge) has been found to be especially preferred to date. This is important because in a traditional pressure laminator, which uses top and bottom platens, if a weight of 15,000 lbs was placed on the top platen to provide the compressive force to effect lamination, any belt running thereunder would either stop and/or break, due to the excessive amount of friction that would be generated. Low pressure continuous laminators of this type (continuous, 2 belt, heat/cool zones) are commercially available. Such laminators provide a maximum of about ½ psi compressive force. This upper limit is generally dictated by belt stoppage and/or breakage.

Other and further embodiments of the present invention will be apparent from the following detailed description and claims, and are illustrated in the accompanying drawings which, by way of illustration, show preferred embodiments of the present invention and the principles thereof.

BRIEF DESCRIPTION OF THE DRAWINGS

FIG. 2B is a fragmentary diagrammatic vertical section taken through a portion of the apparatus of FIG. 1 illustrating the endless loop of the transfer belt used in the apparatus.

FIG. 3 is a fragmentary diagrammatic side elevation of the apparatus shown in FIG. 1.

FIG. 4 is an enlarged fragmentary section taken along line 4-4 of FIG.

FIG. 5 is an enlargement of a portion of FIG. 4.

FIG. 6 is an enlarged fragmentary section taken along line 6-6 of FIG. 3.

FIG. 7 is an enlarged section taken along line 7-7 of FIG. 3.

FIG. 8 is an enlarged fragmentary section taken along line 8-8 of FIG. 3.

FIG. 9 is an enlarged fragmentary section taken along line 9-9 of FIG. 8 and being rotated ninety degrees.

FIG. 19 is an enlarged fragmentary section taken along line 19-19 of FIG. 3.

FIG. 20 is an enlarged fragmentary section taken along line 20-20 of FIG. 19.

FIG. 21 is an enlarged fragmentary section taken along line 21-21 of FIG. 3.

FIG. 22 is an enlarged fragmentary section taken along line 22-22 of FIG. 3.

FIG. 23 is a fragmentary isometric view of a nonwoven fabric material made with the apparatus illustrated in FIG. 1.

FIG. 24 is a fragmentary isometric similar to FIG. 23 of a second embodiment of a fabric manufactured with the apparatus of FIG. 1.

FIG. 25 is a fragmentary isometric of a third embodiment of a fabric manufactured with the apparatus of FIG. 1.

FIG. 32 is an enlarged fragmentary section taken along line 32-32 of FIG. 33.

FIG. 33 is an enlarged fragmentary section taken along line 33-33 of FIG. 32.

FIG. 34 is an enlarged fragmentary section taken along line 34-34 of FIG. 32.

FIG. 35 is an enlarged fragmentary section taken along line 35-35 of FIG. 30.

FIG. 36 is a fragmentary isometric view looking downwardly on the control system of FIG. 30.

FIG. 37 is a diagrammatic side elevation of the apparatus of FIG. 1.

FIG. 38 is a diagrammatic side elevation of the apparatus of FIG. 1 with an alternative take-up system to that illustrated in FIG. 37.

FIG. 39 is a diagrammatic side elevation of the apparatus of FIG. 1 showing an alternative supply system for the warp yarns and adhesive scrim to that of FIG. 37.

FIG. 42 is a diagrammatic side elevation of the warp yarn material manufacturing unit.

FIG. 43 is a top plan view of the manufacturing unit shown in FIG. 42 with portions removed for clarity.

FIG. 44 is a front end elevation of the apparatus of FIG. 43.

FIG. 52 is a diagrammatic side elevation of the preferred warp yarn material alignment unit;

FIG. 53 is a top plan view of the warp yarn material alignment unit shown in FIG. 52 with portions removed for clarity;

FIG. 54 is a front end elevation of the apparatus of FIG. 53;

FIG. 62 is a diagrammatic side elevation of a preferred embodiment of the weft yarn application (XD) apparatus of the present invention;

FIG. 63 is a fragmentary diagrammatic top elevation of the apparatus shown in FIG. 62 with the adhesive removed for clarity;

FIG. 64 is a fragmentary diagrammatic side elevation of the apparatus shown in FIG. 62;

FIG. 65 is an enlarged fragmentary section taken along line 8-8 of FIG. 64;

FIG. 66 is an enlarged fragmentary section taken along line 9-9 of

FIG. 65 and being rotated ninety degrees;

DETAILED DESCRIPTION OF THE PREFERRED EMBODIMENTS

The present invention includes three principal nonwoven fabric manufacturing apparatus, all of which can be used either separately for the production of nonwoven fabric products and/or preferably which are used in combination for the manufacture of high quality, high strength, nonwoven fabrics having the hand and appearance of woven fabrics. The present invention generally consists of (1) a warp yarn alignment apparatus, which has two especially preferred embodiments, as well as the nonwoven fabric products generated thereby; (2) a weft yarn application apparatus (or XD apparatus), which has two especially preferred embodiments, as well as the nonwoven fabric products generated thereby; and (3) a high pressure lamination apparatus which can be used to fuse the product generated in the XD apparatus into fray resistant, high strength nonwoven fabric. Some of the embodiments described in detail below have additional and/or alternative component parts, all of which contribute special characteristics to the nonwoven fabric products manufactured by the apparatus.

Figure 1:
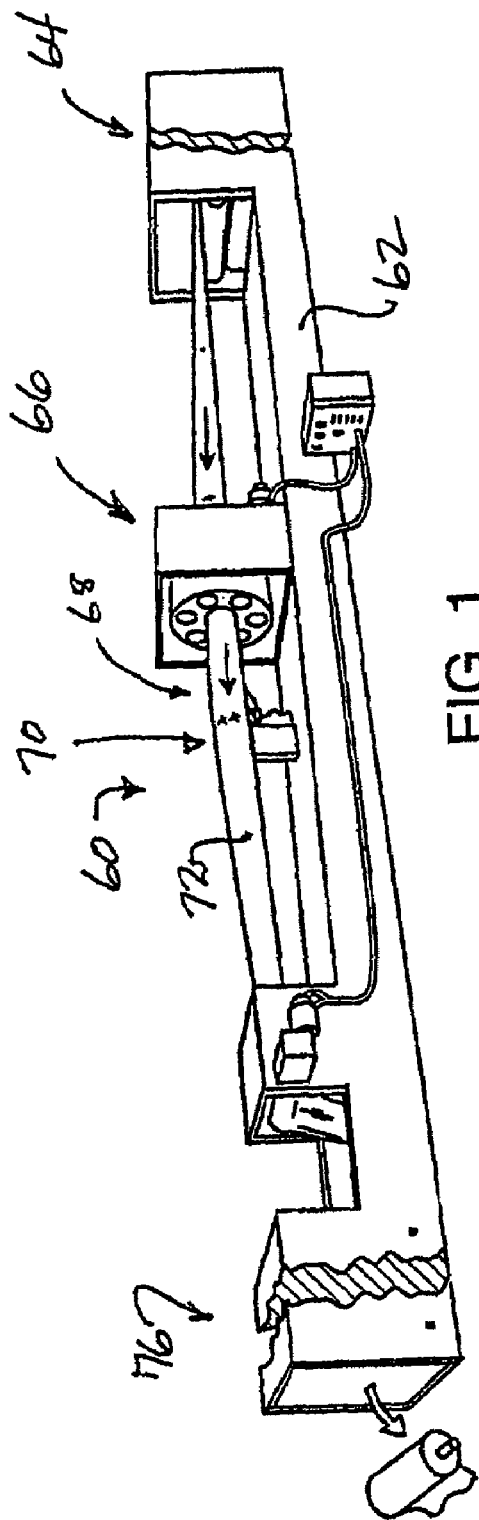
FIG. 1 is a fragmentary diagrammatic isometric view of the apparatus of the present invention.

One preferred embodiment of the nonwoven fabric manufacturing apparatus 60 is shown in FIG. 1 to include an elongated in-line framework 62 including a warp yarn material supply station 64, a weft yarn application station 66, a heating station 68, a cooling station 70, a flattening station 72 that may include a flat bed laminator 74 (FIG. 1B), and a take up station 76. As will be described in more detail hereafter a warp yarn material 78 is provided on a supply roll 80 at the warp yarn material supply station. The warp yarn material is prepared in a warp yarn material manufacturing unit, two of which are described in greater detail below.

Warp Yarn Substrates and Manufacturing Apparatus Therefor

One preferred nonwoven fabric of the present invention has parallel yarns held in a substantially parallel and nontwisting relationship in the form of a nonwoven, fabric-like sheet. Such materials are referred to herein as warp yarn substrates, and two manufacturing units for the formation of such substrates have been developed. In each case, adhesive is applied to one side of the parallel yarns. The adhesive is advantageously applied in a random pattern, forming bridges of adhesive between parallel yarns. These adhesive bridges provide the backbone of the warp yarn substrate, giving it fabric-like flexibility and feel. The bridges also hold the parallel positioning of the fibers and prevent twisting of individual fibers.

One preferred warp yarn manufacturing unit is illustrated in FIGS. 42 through 51. As illustrated therein, the warp yarn material manufacturing unit 82 includes a supply of warp yarn 84 which is passed through an alignment station 86 into an adhesive application station 88 and then to a driven transfer roll 90 which acts as a rewind roll on the warp yarn apparatus and as an unwind roll on the weft yarn (XD) apparatus, as described below. The transfer roll can also be the supply roll for the warp yarn material supply station 64 of the nonwoven fabric manufacturing apparatus. The transfer roll 90 is taken to the warp yarn material supply station of the nonwoven manufacturing apparatus of FIG. 1 where the warp yarn material is introduced to the remainder of the apparatus. Of course, the manufacturing unit 82 and the manufacturing apparatus 60 could be integrated thereby avoiding the transfer roll 90 by passing the warp yarn material 78 directly from the manufacturing unit to the supply station.

The warp yarn material manufacturing unit 82 shown in FIGS. 42 through 51 includes a framework 92 for the warp yarn alignment station 86 and the adhesive application station 88 where an adhesive is applied to the aligned warp yarns to create a warp yarn and adhesive laminate referred to as the warp yarn material 78. It will be appreciated with the description that follows that at least one embodiment of the nonwoven product of the invention is not made from independent warp yarns, but rather is made from a substrate simply having a majority of interconnected fibers primarily oriented in the warp or machine direction. One such type of substrate that has these characteristics is a bonded, carded web although other substrates may be used including, but not limited to, spun-bonded nonwovens, air-laid nonwovens, and wetlaid nonwovens. In the event that a substrate that simply includes interconnected warp fibers is used, the substrate would not be passed through the warp alignment station 86 of the warp yarn material manufacturing unit but rather directly to the adhesive application station 88.

The warp yarn material manufacturing unit 82 further includes a yarn supply station 94 which holds multiple horizontally and rotatably stored beams 96 of roughly aligned warp yarns which are ultimately integrated into the warp yarn material. It will be appreciated that the multiple beams of yarns are provided to achieve a desired warp yarn density which is preferably about 40 to 90 yarns per inch. Each beam of yarn is rotatably positioned and supported on a frame 98 in the manufacturing unit and restricted from freely rotating through use of a conventional brake or friction drag system 100 to allow proper feed of the yarns under tension into the alignment station. The yarns are pulled through the alignment station by the driven transfer roll 90.

Figure 45:
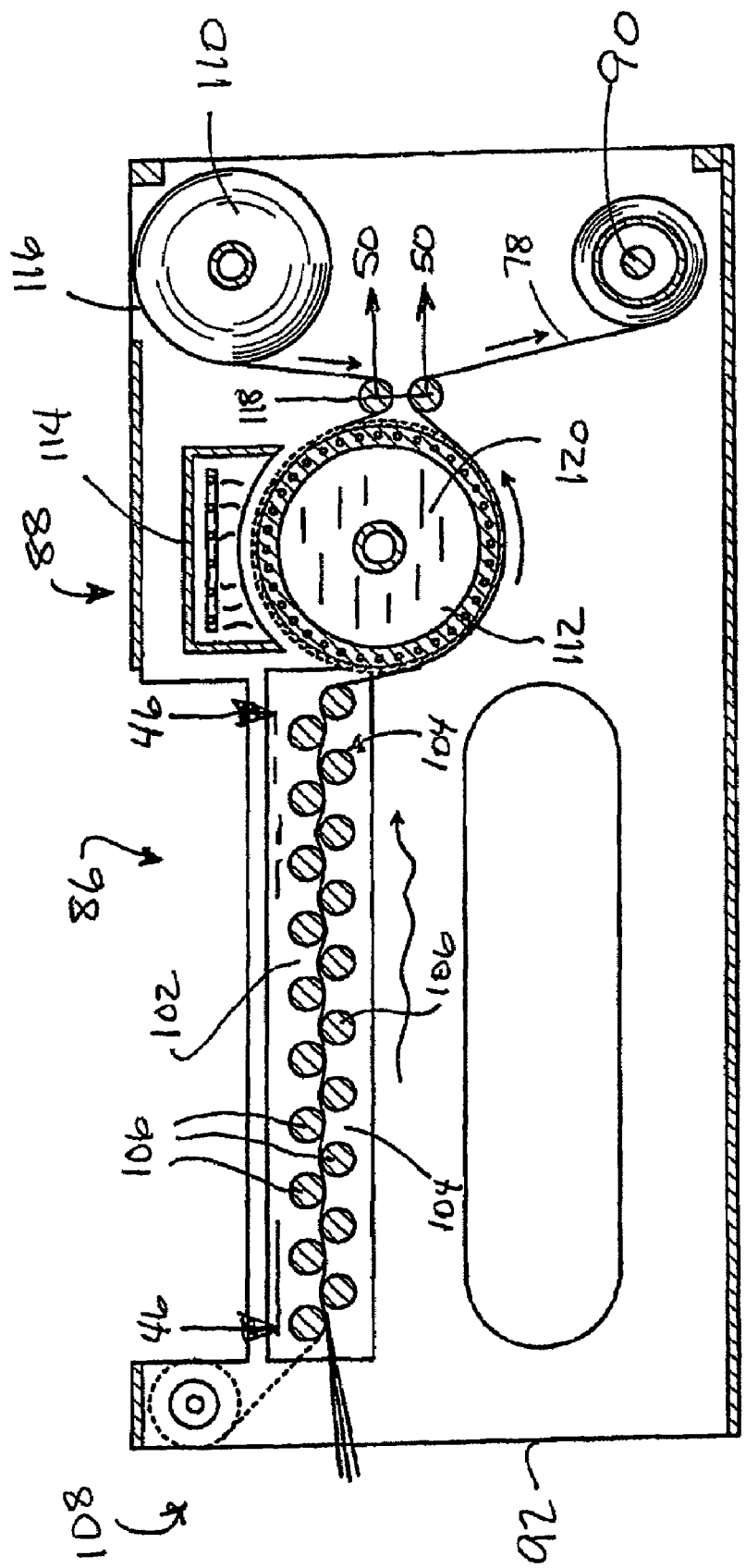
FIG. 45 is an enlarged section taken along line 45-45 of FIG. 43.

The alignment station 86 includes two vertically displaced sets 102 and 104 of horizontally spaced rollers 106. The upper set 102 is within a horizontal plane positioned above a horizontal plane containing the lower set 104 of rollers, although it is conceivable that the orientation of the sets of rollers are not an upper and lower set but possibly a left and right set or somewhere in between so that the planes of the sets of rollers would be horizontally rather than vertically displaced or somewhere in between. The rollers 106 are transversely aligned with each other. Further, when the rollers are in horizontal planes the rollers in each set are horizontally offset from the rollers in the other set so that the rollers in each set are positioned between rollers of the other set and the outer perimeter of the rollers in one set vertically overlaps the outer perimeter of the rollers in the other set. In this manner, the warp yarns which pass transversely through the sets of rollers must pass under the upper set of rollers 102 and over the lower set of rollers 104 in a generally sinusoidal, or serpentine path as seen in FIG. 45. The warp yarns in the preferred embodiment arcuately engage approximately 20 degrees of each roller. The yarns could contact more or less of each of the rollers and the amount of contact could vary from roller to roller within a row of rollers. The preferred roller diameter is about 2 inches, though this diameter does not appear to be critical. In the illustrated embodiment there are 10 rollers in each set even though varying numbers of rollers might be used. If desired, these rollers could be heated and/or cooled, which could be used to impart desirable characteristics to the yarns.

Figure 46:
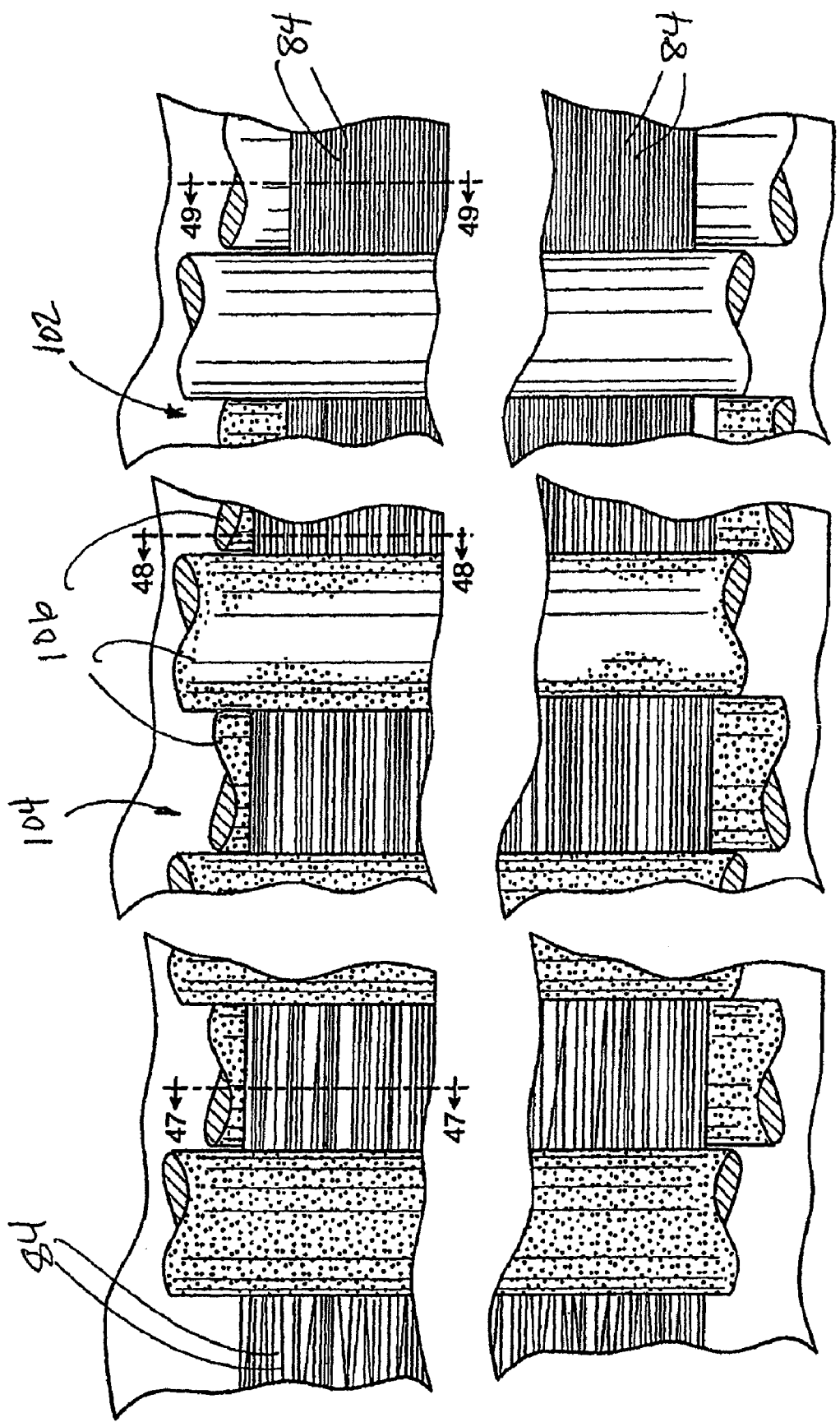
FIG. 46 is an enlarged fragmentary section taken along line 46-46 of FIG. 45 with parts removed for clarity.

As can be appreciated in FIG. 46, the peripheral surface of the rollers 106 nearest to the yarn supply station 94 preferably have a coarser surface texture than the rollers closest to the adhesive application station 86. It will be appreciated that the surface roughness of the rollers, preferably, gradually decreases from the supply station to the adhesive application station. The surface texture of the coarsest roller would preferably be finer than a 600 grit sandpaper and more particularly it is estimated that it would be similar to a 1000 grit sandpaper. The surface texture is very fine and is provided by the use of materials similar to those used in a conventional ceramic Analox roll. The material used to provide the surface texture is a ceramic coating LC-4 provided by Praxair Surface Technologies of New Haven, Conn. In at least one embodiment the rollers 106 positioned at the exit end of the alignment station 86 closest to the adhesive application station 88 are actually polished and, therefore, have a very smooth surface texture.

The rollers are rotatively driven by a drive system 108 to rotate about their longitudinal axes. The surface speed of the alignment rollers 106 is substantially greater than the linear speed of the warp yarns as they pass through the yarn aligner. The preferred ratio is about 20:1 with the roller surface speed at about 300 to 500 feet per minute and the warp yarn linear speed at about 20 feet per minute. Because the roller surface speed is so much greater than the linear yarn speed, it is easy to understand why the warp yarn beams 96 must be restricted from freely rotating to prevent yarn overrun. Other degrees of yarn/roller contact, roller speeds, roller to yarn ratios, surface textures, and surface texture gradients could be used. These parameters will be effected by at least yarn type, yarn size, and yarn material. It is believed that over driving the yarns relieves tension and causes the yarns to relax and expand, while the texture on the surface of the rolls 106 causes the yarns to vibrate and shake causing them to hit their neighbor yarns thereby ultimately finding a home position approximately equidistant from each of their neighboring yarns. This home position is believed to be the equilibrium position between adjacent yarns. At present it is only conjecture as to why the yarns align in the yarn aligner, what is known is that the yarns do become substantially aligned as illustrated in FIGS. 46 through 49.

While one preferred system for aligning the warp yarns has been described, another system would be to use conventional combs to separate and align the yarns. The system used for aligning the warp yarns does not affect the weft yarn alignment but may affect the aesthetics of the nonwoven product. After the yarns pass through the warp yarn alignment station 86 they pass into the adhesive application station 88. The adhesive application station in one preferred embodiment comprises an adhesive scrim or lace web supply roll 110 having a conventional braking or friction drag system (not shown) to prevent free rotation and thus overrun, an adhesive scrim or lace counter-clockwise rotating and driven carrier roll 112, and an infrared heater 114 adjacent to the carrier roll. The adhesive web 116 passes from its supply roll 110 beneath a first idler roller 118 (FIGS. 45 and 50) and subsequently onto the upper half of the adhesive carrier roll 112 moving in an upstream direction. While on the carrier roll, the adhesive web passes under the infrared heater 114 (as best seen in FIG. 45) where it is heated to a temperature that begins to melt the adhesive so as to render it tacky. The adhesive carrier roll itself is internally cooled in a conventional manner with a liquid coolant 120 for example, so that only the outer surface of the adhesive web is activated and becomes tacky. Once tacky, the adhesive web 116 is combined or merged with the warp yarns 84 which are fed downwardly onto the underside of the carrier roll. The adhesive web has sufficient structural integrity to act as a carrier for the yarns, once bonded thereto, and retains the yarns in parallel, nontwisting relationship. The resultant laminate of warp yarns and adhesive is defined as one embodiment of the warp yarn material. The warp yarn material passes across the top of a second idler roller 122 (FIGS. 45 and 50) and is thereafter drawn onto the driven take-up or supply roll 90 for the warp yarn material where it is gathered for transfer to the supply station 64 of the nonwoven manufacturing apparatus 60. While the warp yarn material manufacturing unit 82 has been described as being separated from the apparatus 60 of the present invention, it is to be understood that the manufacturing unit could be integrated into the remainder of the apparatus at the warp yarn material supply station 64 of the apparatus.

A preferred adhesive scrim or lace web 116 is a hot melt adhesive that can be heated to activate and cooled to set. An example is made from a hotmelt copolyester polymer. One such scrim. or lace is a Bostic PE 120-15 Copolyester web with a basis weight of 15 grams per square meter, it is produced by the Bostic Company of Middleton, Mass. The warp yarn, by way of example, may be a 36/1 spun polyester yarn available from Burlington Industries of Greensboro, N.C., or from Carolina Mills of Maiden, N.C. The warp yarns 84 disclosed above can also be used as the weft yarns in a manner to be described later. Another warp or weft yarn may be a 30/1 slub yarn (spun polyester) available from Uniblend Spinners Inc. of Conway, S.C. Other warp and weft yarns include commercially available and custom made fibers and the like.

As mentioned previously, a nonwoven substrate such as a bonded, carded web (not shown) could be used in lieu of the warp yarns 84 in the laminate structure of the warp yarn material. One such nonwoven substrate is manufactured by Hollingsworth and Vose of Floyd, Va. and identified by Model No. TR2232. Such a nonwoven should have a basis weight between 40-60 grams per square meter with a fiber denier between 1 to 5 and preferably about 1.5.

An especially preferred embodiment of the warp yarn material manufacturing unit of the present invention is shown in FIGS. 52 through 60. FIG. 61A shows the detailed relationship between the aligned warp yarns 84 and the hot melt adhesive film 116B which holds the yarns together in a cohesive product. As illustrated in FIGS. 52 through 60, the warp yarn manufacturing unit 82 includes a yarn supply station 94 which holds multiple horizontally and rotatably stored beams 96 of roughly aligned warp yarns which will ultimately be integrated into the warp yarn material. It will be appreciated that the multiple beams of yarns (preferably formed with equal tension in all yarns) are provided to achieve a desired warp yarn density which may range from about 10 to about 180 yarns per inch, and preferably range from about 40 to 90 yarns per inch. The yarn density range could be larger or smaller, depending upon the desired characteristics of the nonwoven material, as well as the denier and surface characteristics of the yarns used. Each beam of yarn is rotatably positioned and supported on a frame 98 in the manufacturing unit and restricted from freely rotating through use of a conventional brake or friction drag system 100 to allow proper feed of the yarns under tension into the alignment station. The yarns are pulled through the alignment station by the driven transfer roll 90.

Figure 55:
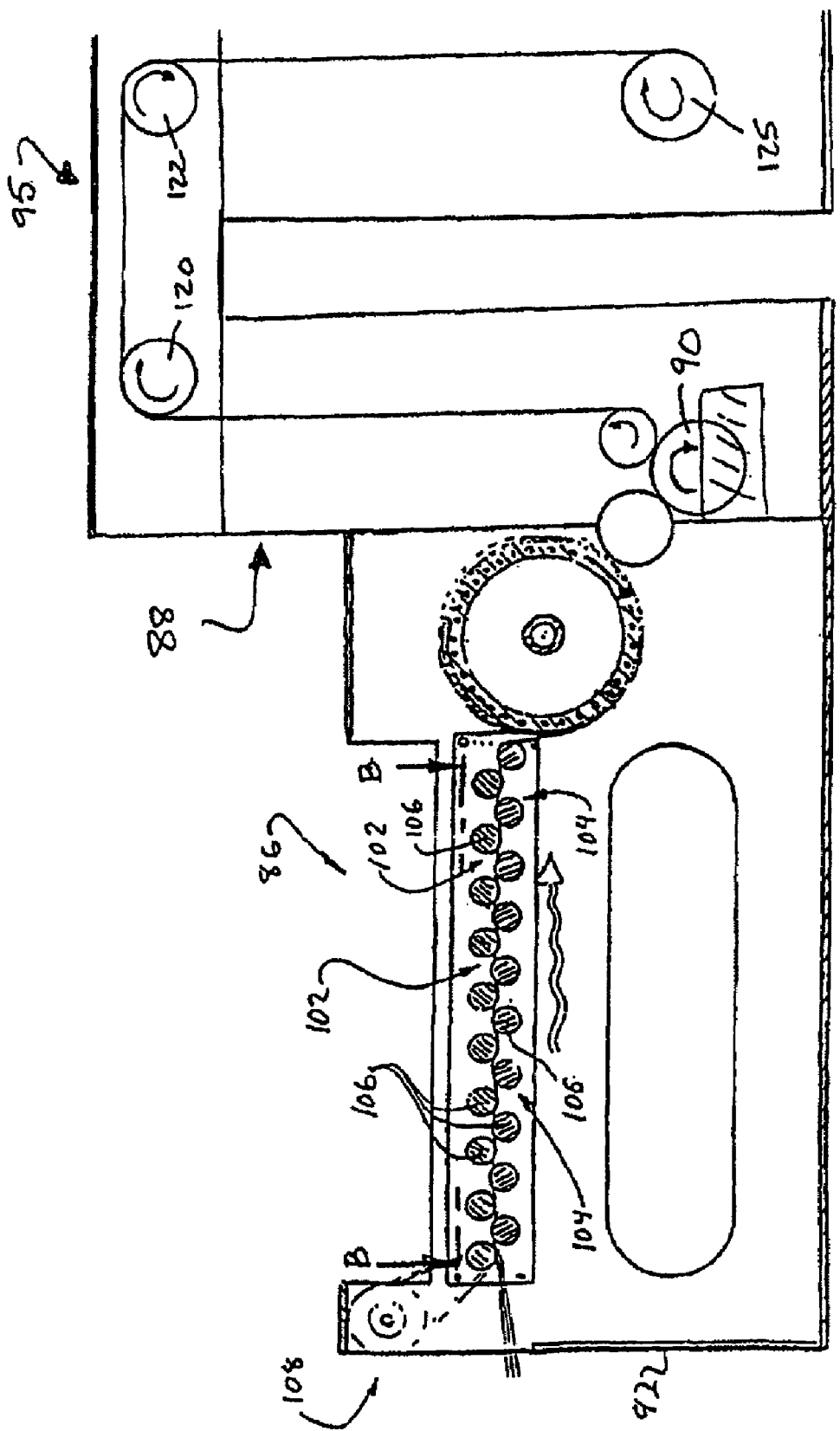
FIG. 55 is a partial cross-sectional view of the preferred warp yarn alignment unit and the hot melt adhesive applicator and cooling section, with parts removed for clarity.

As illustrated in FIG. 55 the alignment station 86 includes two vertically displaced sets 102 and 104 of horizontally spaced rollers 106. The upper set 102 is within a horizontal plane positioned above a horizontal plane containing the lower set 104 of rollers, although it is conceivable that the orientation of the sets of rollers are not an upper and lower set but possibly a left and right set or somewhere in between so that the planes of the sets of rollers would be horizontally rather than vertically displaced or somewhere in between. The rollers 106 are transversely aligned with each other. Further, when the rollers are in horizontal planes the rollers in each set are horizontally offset from the rollers in the other set so that the rollers in each set are positioned between rollers of the other set and the outer perimeter of the rollers in one set vertically overlaps the outer perimeter of the rollers in the other set. In this manner, the warp yarns which pass transversely through the sets of rollers must pass under the upper set of rollers 102 and over the lower set of rollers 104 in a generally sinusoidal, or serpentine path as seen in FIG. 55. The warp yarns in the preferred embodiment arcuately engage approximately 20 degrees of each roller. The yarns could contact more or less of each of the rollers and the amount of contact could vary from roller to roller within a row of rollers. The preferred roller diameter is about 2 inches, though this diameter does not appear to be critical. In the illustrated embodiment there are 20 rollers in each set even though varying numbers of rollers might be used.

Figure 56:
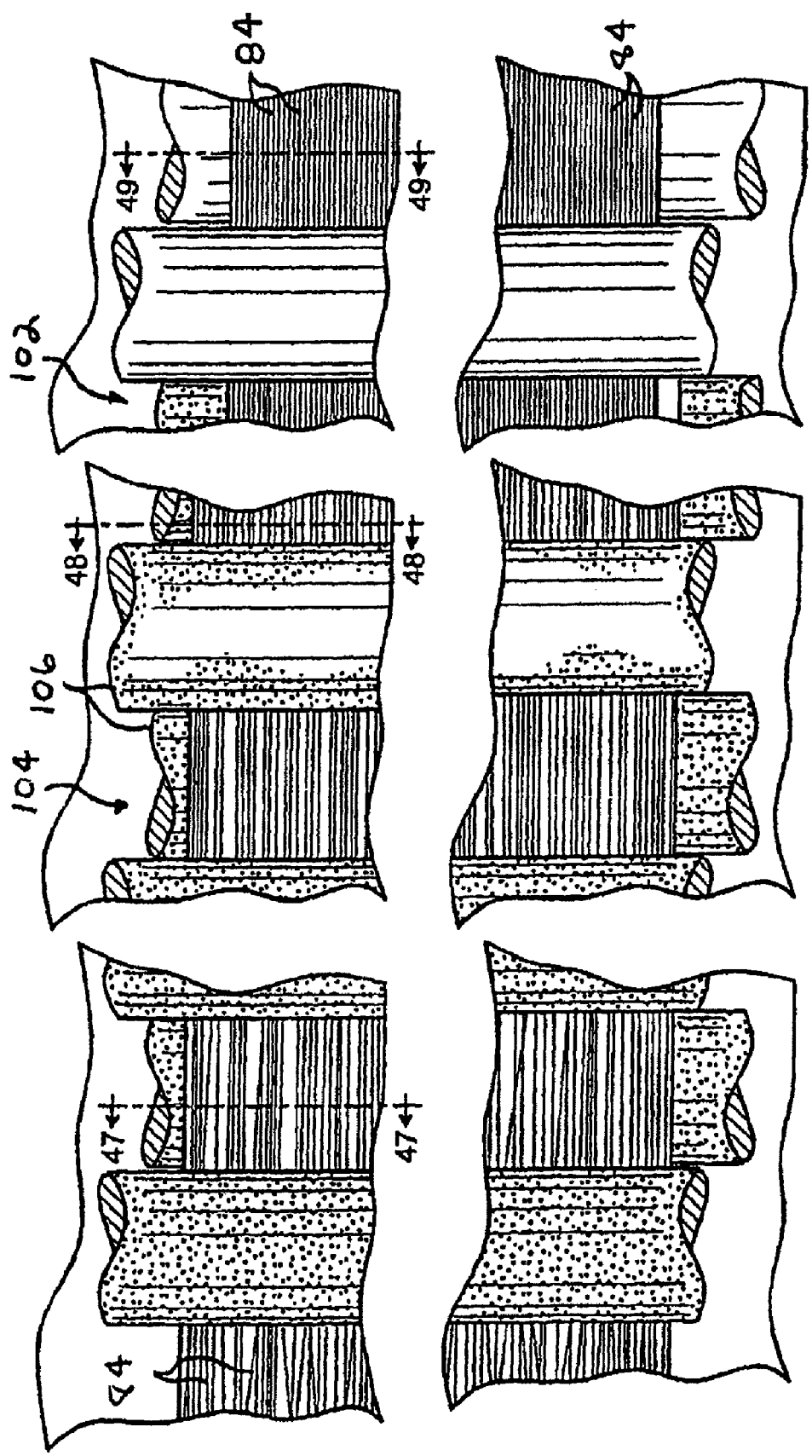
FIG. 56 is an enlarged fragmentary section taken along line B-B of FIG. 55 with parts removed for clarity.
Figure 57:
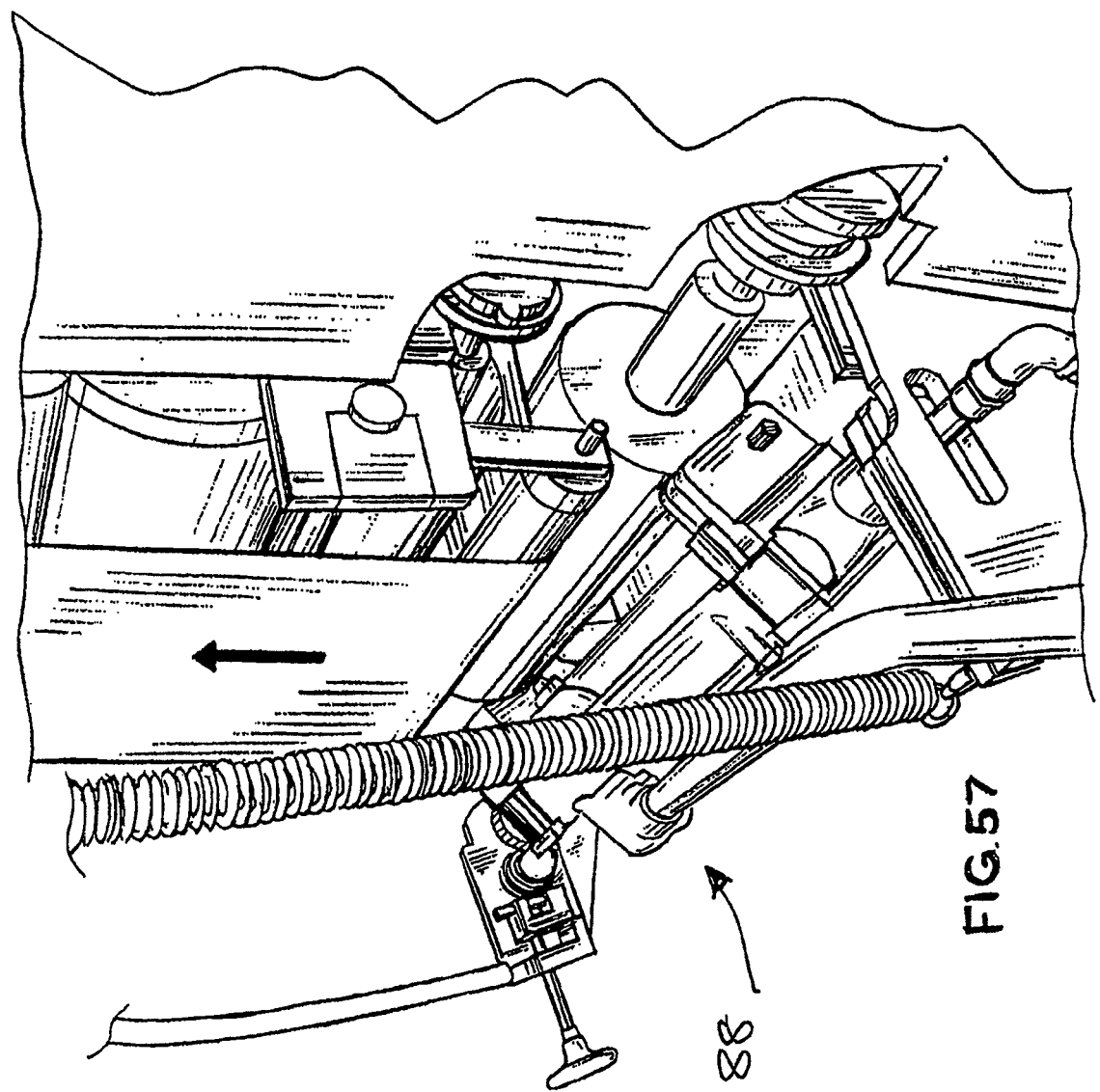
FIG. 57 is an elevational view of the preferred Rototherm® hot melt adhesive roll coater, showing the exit path of the adhesive coated warp yarn material.

As can be appreciated in FIG. 56, the peripheral surface of the rollers 106 nearest to the yarn supply station 94 preferably have a coarser surface texture than the rollers closest to the adhesive application station 86. It will be appreciated that the surface roughness of the rollers, preferably, gradually decreases from the supply station to the adhesive application station. The surface texture of the coarsest roller would preferably be finer than a 600 grit sandpaper and more particularly it is estimated that it would be similar to a 1000 grit sandpaper. The surface texture is very fine and is provided by the use of materials similar to those used in a conventional ceramic Analox roll. The material used to provide the surface texture is a ceramic coating LC-4 provided by Praxair Surface Technologies of New Haven, Conn. In at least one embodiment the rollers 106 positioned at the exit end of the alignment station 86 closest to the adhesive application station 88 are actually polished and, therefore, have a very smooth surface texture. As with the previously described embodiment, if desired, these rollers can be heated and/or cooled, to impart distinctive characteristics to the yarns.

The rollers are rotatively driven by a drive system 108 to rotate about their longitudinal axes. The surface speed of the alignment rollers 106 is substantially greater than the linear speed of the warp yarns as they pass through the yarn aligner. The preferred ratio is from about 2:1-3:1 with the roller surface speed at about 200 to 300 feet per minute and the warp yarn linear speed at about 100 feet per minute. Because the roller surface speed is so much greater than the linear yarn speed, it is easy to understand why the warp yarn beams 96 must be restricted from freely rotating to prevent yarn overrun. Other degrees of yarn/roller contact, roller speeds, roller to yarn ratios, surface textures, and surface texture gradients could be used. These parameters will be effected by at least yarn type, yarn size, and yarn material.

Figure 49:
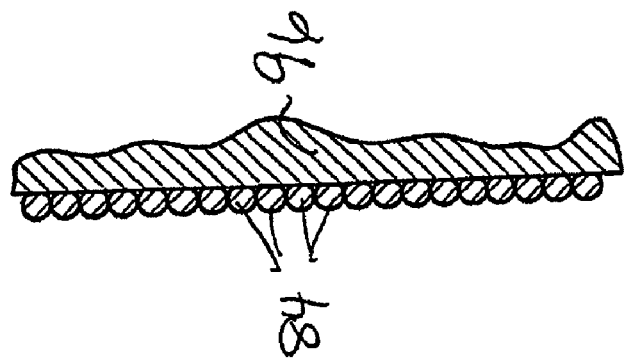
FIG. 49 is an enlarged fragmentary section taken along line 49-49 of FIG. 46.
Figure 48:
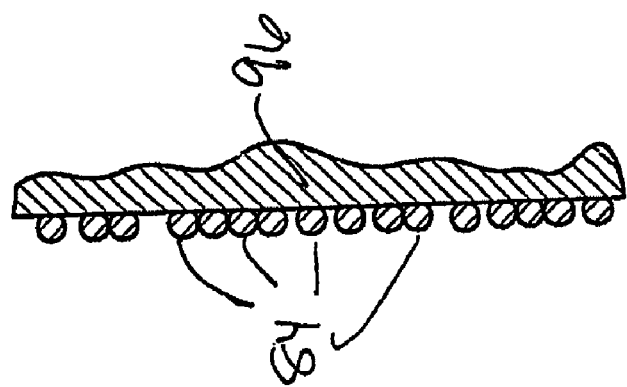
FIG. 48 is an enlarged fragmentary section taken along line 48-48 of FIG. 46.
Figure 47:
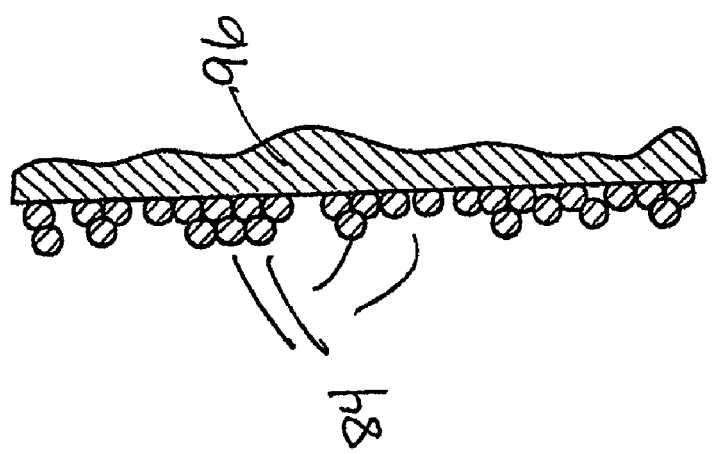
FIG. 47 is an enlarged fragmentary section taken along line 47-47 of FIG. 46.
Figure 51:
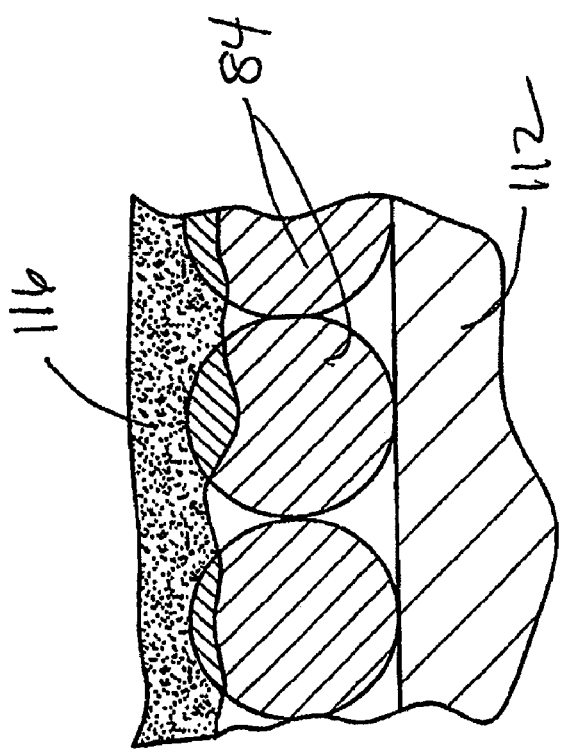
FIG. 51 is an enlarged fragmentary section taken along line 51-51 of FIG. 50.
Figure 50:
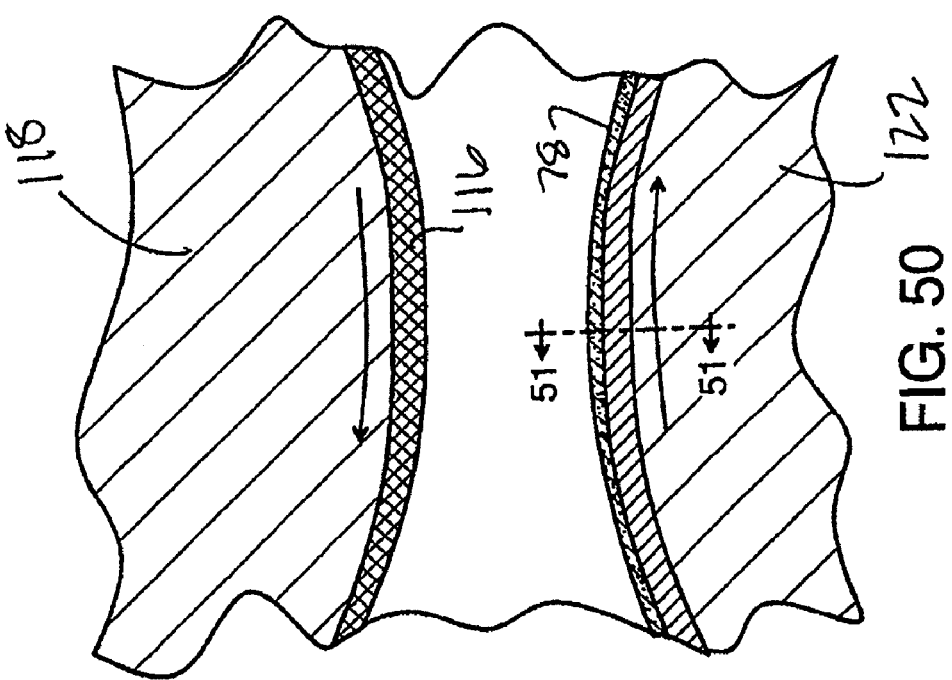
FIG. 50 is an enlarged fragmentary section taken along line 50-50 of FIG. 45.

It is believed that over-driving the yarns relieves any tension in the yarns and causes the yarns to relax and expand, while the texture on the surface of the rolls 106 causes the yarns to vibrate and shake causing them to hit their neighbor yarns thereby ultimately finding a home position approximately equidistant from each of their neighboring yarns. This home position is the equilibrium position between adjacent yarns. At present it is only conjecture as to why the yarns align in the yarn aligner, what is known is that the yarns do become substantially aligned as illustrated in FIGS. 47 through 49.

Figure 60:
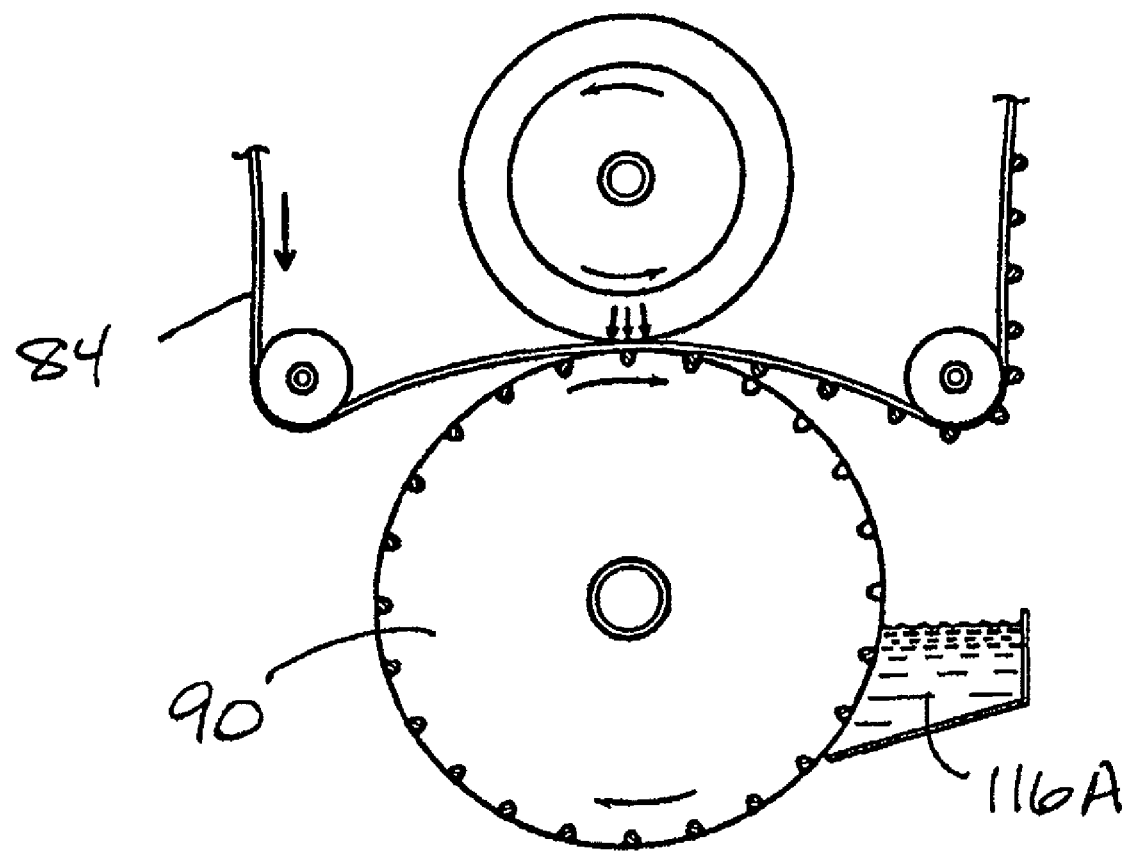
FIG. 60 illustrates the gravure coating of adhesive on one side of the aligned warp yarns.
Figure 61A:
FIG. 61A is a magnified illustration of the adhesive applied side of the warp yarn fabric showing the applied adhesive (dark color) and the bridges holding the fibers in a nontwisting and parallel relationship.
Figure 61B:
FIG. 61B is a magnified illustration of the uncoated side of the warp yarn fabric, confirming that the parallel fibers have little adhesive which passes through to the surface opposite that of FIG. 61A.
Figure 68:
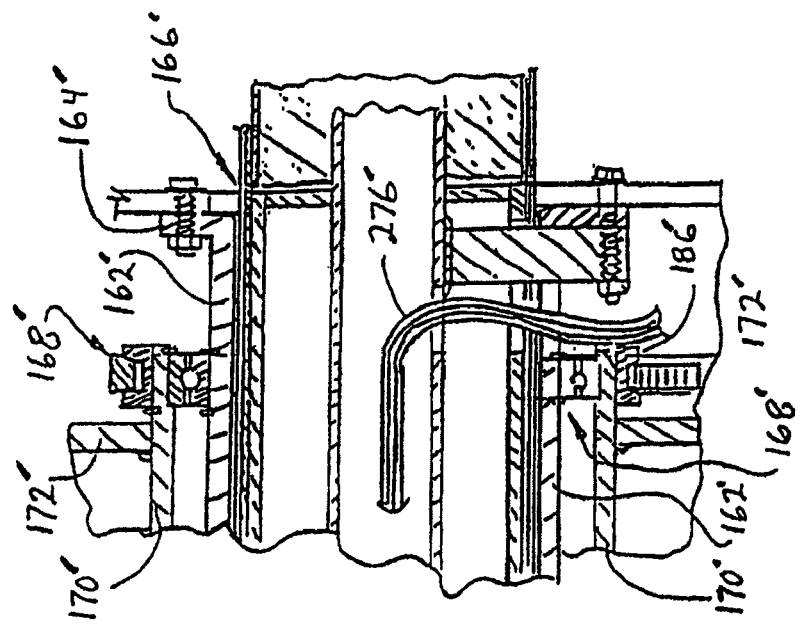
FIG. 68 is an enlarged fragmentary section taken along line 11-11 of FIG. 65 and having been rotate ninety degrees.
Figure 67:
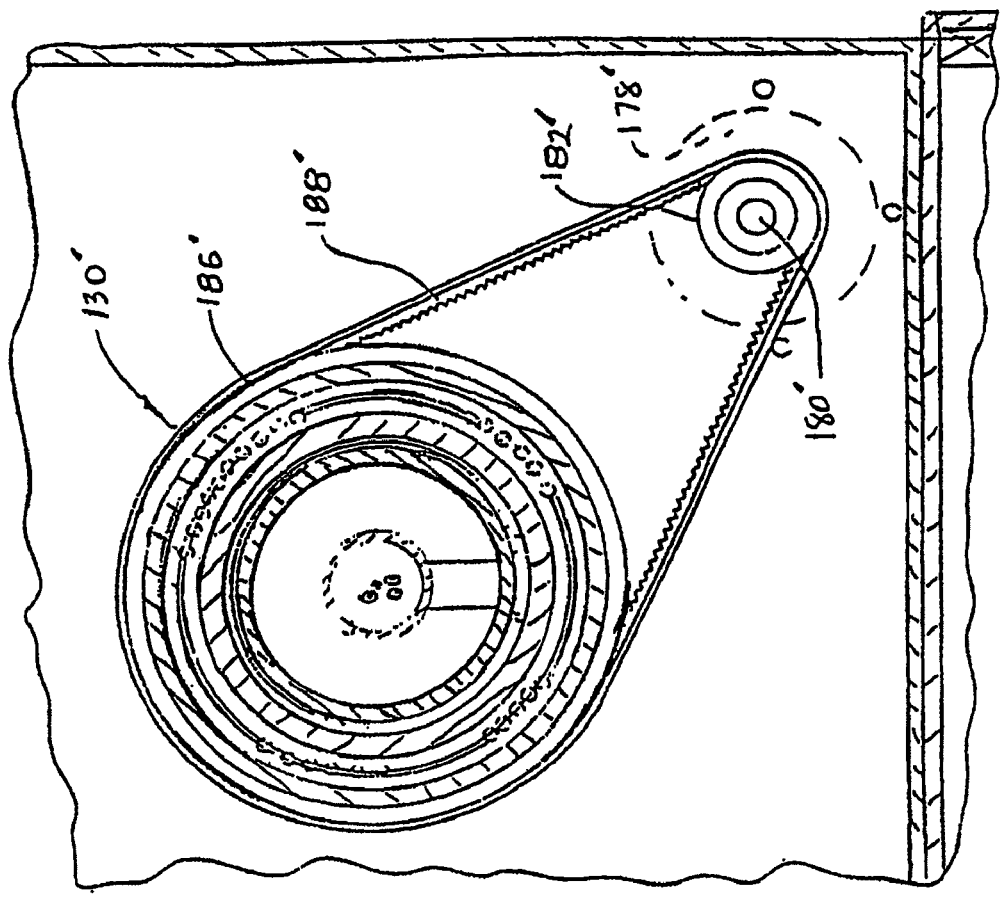
FIG. 67 is an enlarged fragmentary section taken along line 10-10 of FIG. 66.

As best illustrated in FIGS. 60, 61A and 61B, a thin film of hot melt adhesive is next applied to one side of the aligned yarns, forming a web of bridges to adjacent aligned yarns. This film is air cooled and the resulting cohesive warp yarn fabric material is collected for further use. FIG. 61A is a photograph of the side of the warp yarn fabric with the bridges of adhesive holding the fibers in a nontwisting and parallel relationship. FIG. 61B is a photograph of the uncoated side of the parallel yarns, confirming that the warp yarn substrate has adhesive on substantially only on one side of the fibers. As shown in this Figure, some minor amounts of adhesive may leak through the warp yarn substrate from the side with the desired bridges. However, substantially all of the adhesive remains on the side of the aligned yarns to which it is applied. It is estimated that no more than about 10 percent, preferably no more than about 5 percent, of the applied adhesive passes through to the untreated side of the aligned yarns.

FIGS. 57 through 60 show the preferred adhesive application unit 88, where the aligned warp yarns 84 are passed through a series of rollers into contact on one side with hot melt adhesive coater roller 90. This coater roller 90 is driven through a trough containing molten hot melt adhesive 116A and a thin (from about 0.25 to 1 mil thick) web of hot melt adhesive is gravure printed on one side of the aligned warp yarns 84. FIG. 60 illustrates a simplified version of the application of adhesive to one side of the aligned yarns with a gravure adhesive roller 90. As illustrated, the gravure roller picks up melted adhesive 116A and deposits the adhesive on only one side of the aligned yarns, forming bridges thereon, which yield a flexible sheet of aligned yarns once the adhesive has cooled.

Figure 58:
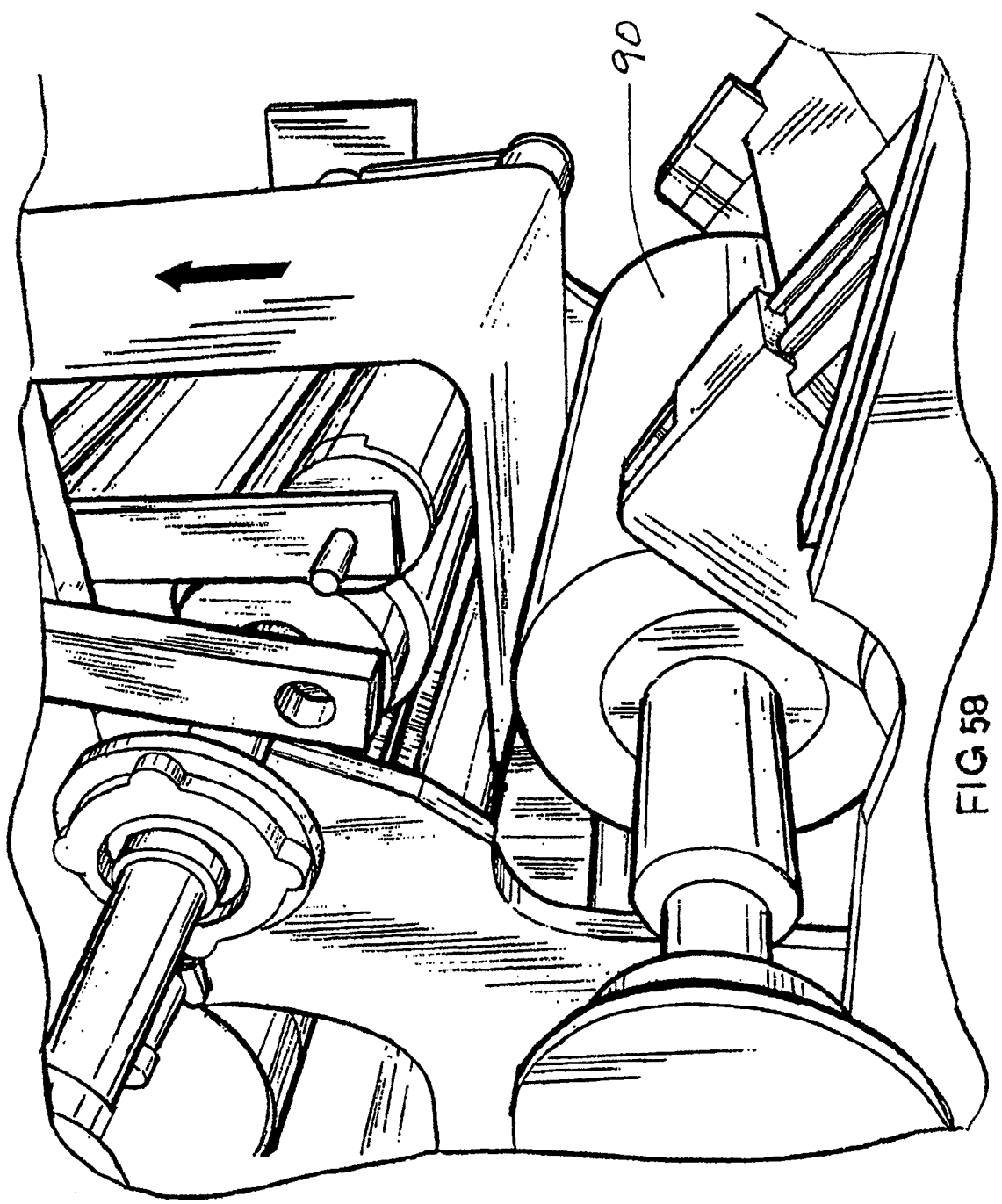
FIG. 58 is another elevational view the preferred Rototherm® hot melt adhesive roll coater, shown in the unengaged position, showing the exit path of the adhesive coated warp yarn material.

FIG. 58 is a close-up view of the relationship between the adhesive roller 90, coated with a thin film of hot melt adhesive 116A and the aligned yarn roller 122, which carries the aligned yarns 84. In this figure, the two rolls are shown in a disengaged mode. When these two rollers are put in contact with one another, the exposed side of the aligned yarns 84 is printed or coated with a thin film of the hot melt adhesive 116A. As the melted hot melt adhesive 116A cools the aligned yarns are transformed into a flexible, coherent sheet 116B.

Figure 59:
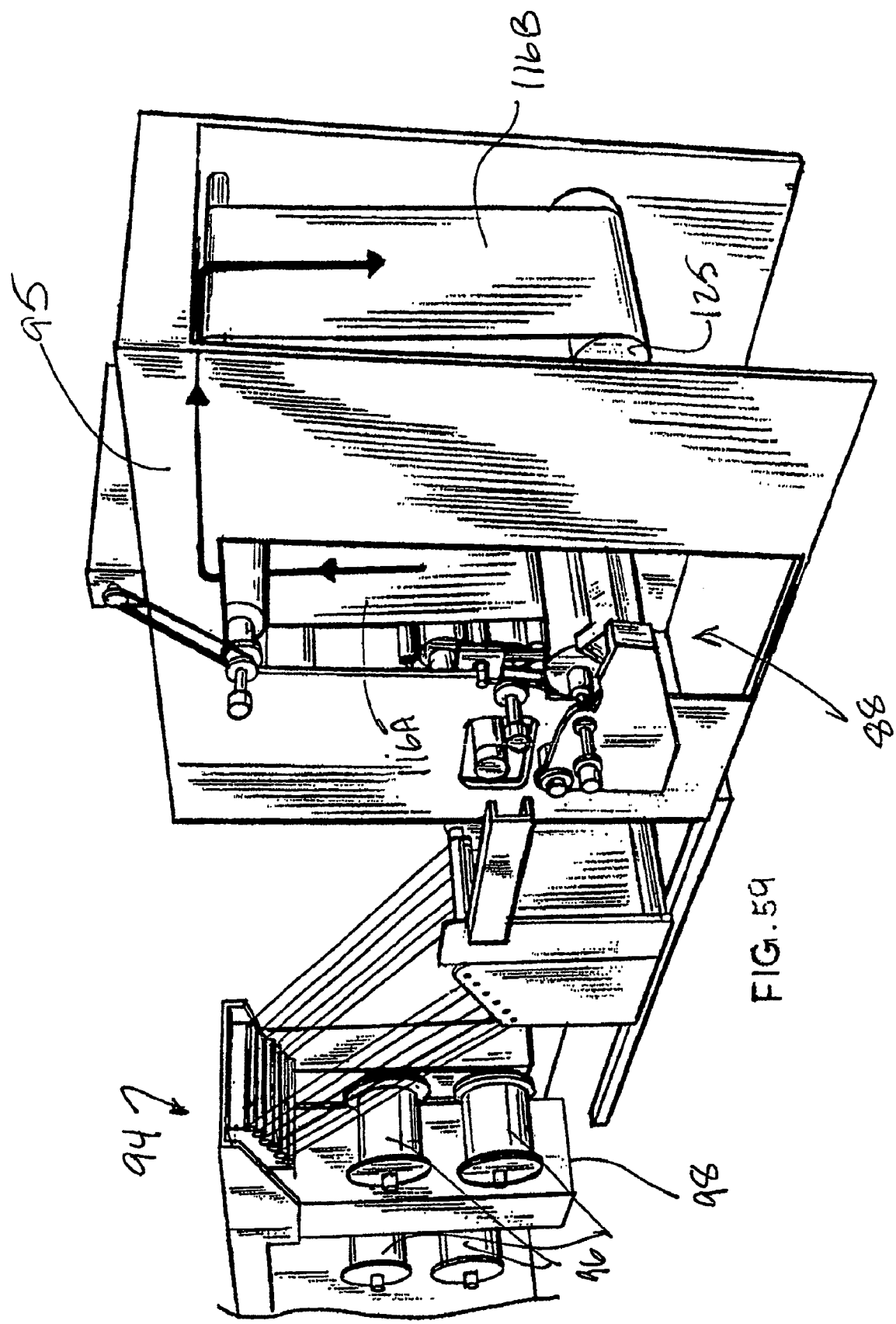
FIG. 59 is an elevational view of a preferred warp yarn alignment apparatus; with the beam station; yarn alignment station; adhesive applicator station and cooling station.

As shown in FIG. 59, to ensure complete cooling or drying of the adhesive, the coherent sheet of aligned yarns and adhesive is passed through a station 95 in which it passes over a series of rollers to the take-up reel 125. At the take-up reel 125 the nonwoven warp yarn fabric material is collected, e.g., for further processing or for use as a nonwoven fabric.

A preferred adhesive is a hot melt adhesive that can be heated to activate and cooled to set, for example a hot melt copolyester polymer. One such adhesive is EMS Grillon 1533 copolyester, produced by EMS Chemie of Sumter, S.C. The warp yarn, by way of example, may be a 36/1 spun polyester yarn available from Burlington Industries of Greensboro, N.C., or from Carolina Mills of Maiden, N.C. Another warp yarn may be a 30/1 slub yarn (spun polyester) available from Uniblend Spinners Inc. of Conway, S.C.

The aligned sheet of warp yarns, bound together on one side by adhesive bridges, is one especially preferred embodiment of the present invention. This nonwoven fabric has a unique appearance, and as described above, it can be manufactured using any number of different yarns and/or yarn substitutes, including metals such as copper, silver, gold, platinum, and the like. The bridges formed on the one side of the aligned yarns holds the material together, giving it the look and feel of a fabric product.

Wept Yarn Apparatus and Fabrics Formed Thereby

Two embodiments of the weft yarn apparatus or XD apparatus are disclosed herein, each of which positions the weft yarns substantially perpendicular to the aligned warp yarns. One such apparatus is described in detail in FIGS. 1 through 7. As illustrated therein, the warp yarn material 78 is passed on an endless, recycling transfer belt 124, preferably of Teflon®, along a substantially cylindrical support structure 126 that shapes the warp yarn material in the general shape of a cylinder with the warp yarns or yarns in the material being aligned longitudinally along the length of the substantially cylindrical support surface. When formed into the cylindrical shape, the warp yarn material is advanced through the weft yarn application station 66 at a pre-determined rate with the adhesive positioned on the exterior surface of the cylindrically configured warp yarn material. As the warp yarn material passes through the weft yarn application station, a series of weft yarns 128, as best seen in FIGS. 8, 12-15, 17 and 18) radially located on a rotating drum 130 an equal distance from one another are wrapped transversely around the cylindrically configured warp yarn material at a predetermined rate and the resultant laminate of warp yarn material 78, adhesive scrim or lace 116 and weft yarns 128 is then advanced through the heating station 68 where the adhesive scrim or lace is activated so that the adhesive bonds the warp yarn material and the weft yarns. It will be appreciated that as an alternative, adhesive could be sprayed onto the warp yarns before the weft yarns are laid down. Immediately thereafter the material passes through the cooling or adhesive setting station 70 where the adhesive is set so as to no longer be tacky. As the resultant fabric laminate 131 progresses from the cooling station to the take-up station 76, a cutter 132, preferably a rotary cutter, longitudinally severs the cylindrical laminate and the laminate material progressively changes from its cylindrical orientation to a generally flat orientation in the flattening station 72. At the downstream end of the flattening station, the belt passes down and around a drive roller 133 (FIG. 2B), that underlies the endless belt, where the belt is returned to the supply station 64 via tensioning roller 135 and idler rollers 137.

Figure 2:
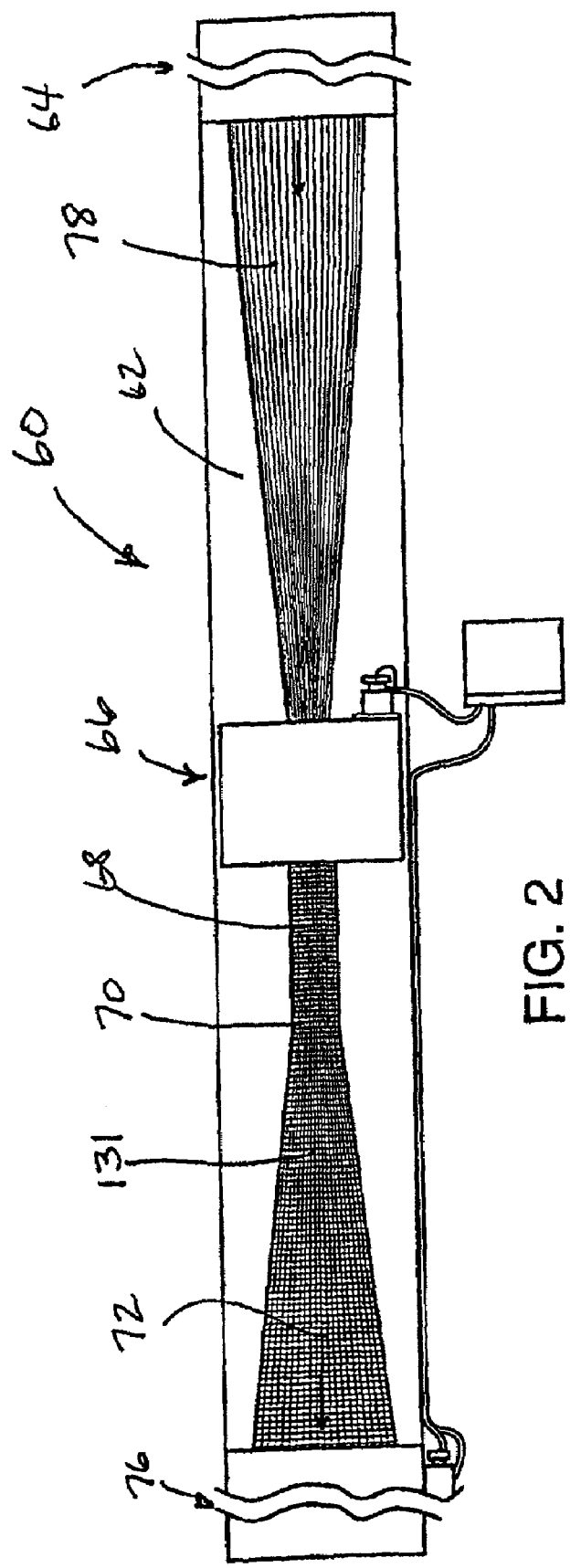
FIG. 2 is a fragmentary diagrammatic top elevation of the apparatus shown in FIG. 1 with the adhesive scrim removed for clarity.

The drive roller, through its driving engagement with the endless belt, thereby advances the warp yarn material through the apparatus. Upon passing the drive roller, the laminate material, in a preferred embodiment, is passed through a flat bed laminator 74, after which it is wrapped onto a take-up roller 136 at the take-up station which can be removed from the apparatus when necessary or at pre-determined intervals. FIG. 2 is another diagrammatic view looking down on the apparatus shown in FIG. 1. This view illustrates the longitudinal, or machine direction orientation of the warp yarn material as it enters the weft yarn application station 66 and the resultant nonwoven laminate fabric product 131 extending from the weft yarn application station toward the take-up station 76. As best illustrated in FIGS. 4 through 7, the support structure 126 extends from the supply station through the weft yarn application station 66 to the take-up station so as to support the warp yarn material 78 and ultimately the nonwoven fabric laminate 131 in a desired orientation for processing. The support structure includes a horizontal beam 138 extending uninterruptedly from the supply station 64 to the take-up station 76. The horizontal beam is covered with and supports a rigid foam 140 or other desirable material that will maintain its shape and configuration over time. The foam is a rigid polyurethane foam manufactured by Great Stuff and distributed through Home Depot centers throughout the United States. The foam is typically used for insulating window casements. At the supply station, and as best seen in FIGS. 4 and 5, the foam, which has an outer low friction covering 142 defines a flat upper surface and as the body of foam progresses toward the weft yarn application station 66, the outer covering progressively transforms into a substantially cylindrical configuration. As seen in FIG. 6, at an intermediate location between the supply station and the weft yarn application station, the outer covering of the foam is somewhat semi-cylindrical but as it reaches the weft yarn application station as seen in FIG. 7, the outer covering is substantially cylindrical. The reverse transformation of the outer covering occurs from the weft yarn application station to the drive roller 133 for a purpose to be described later.

The supply of warp yarn material 78 is disposed on the transfer roll 90 at the supply station and the yarns or fibers in the material 78 extend in parallel side-by-side relationship. A suitable braking or friction system (not seen) prevents the roll 110 from rotating freely and thus overrunning. The material is passed over an idler roller 144 onto the driven, endless recycling Teflon® belt 124 that supports the warp yarn material and advances it through the weft yarn application station. The Teflon® belt conforms to the support structure 126 and slides over a stainless steel wear plate that acts as the outer covering 142 of the foam body 140. When the warp yarn material is first fed onto the belting surface as seen in FIG. 4, the yarns or fibers of the material are positioned in parallel side-by-side relationship and extend longitudinally of the apparatus, FIG. 4 also shows the layer of adhesive scrim or lace 116 of the material overlaid on the warp yarn material as the material progresses onto and along the belting. As will be seen in FIG. 6, as the warp yarn material progresses through the apparatus, it is supported and carried by the Teflon® belt along the support structure. It initially assumes an arcuate downwardly concave orientation and, finally, when it approaches the weft yarn application station as shown in FIG. 7, it assumes a substantially cylindrical configuration with only a small longitudinal gap at the bottom of the cylinder.

As seen in FIG. 8, at the weft yarn application station 66, the foam body 140 and stainless steel wear plate or covering 142 are interrupted but the Teflon® belting 124 continues through the weft yarn application station and is supported by a rigid inner cylindrical ring 144 that extends substantially the full length of the weft yarn application station. The cylindrical ring 144 is almost contiguous with the foam 140 and, in essence, forms a continuation of the foam body through the weft yarn application station with only a small gap existing as the Teflon® belting and warp yarn material are fed through the center of the weft yarn application station.

Figure 10:
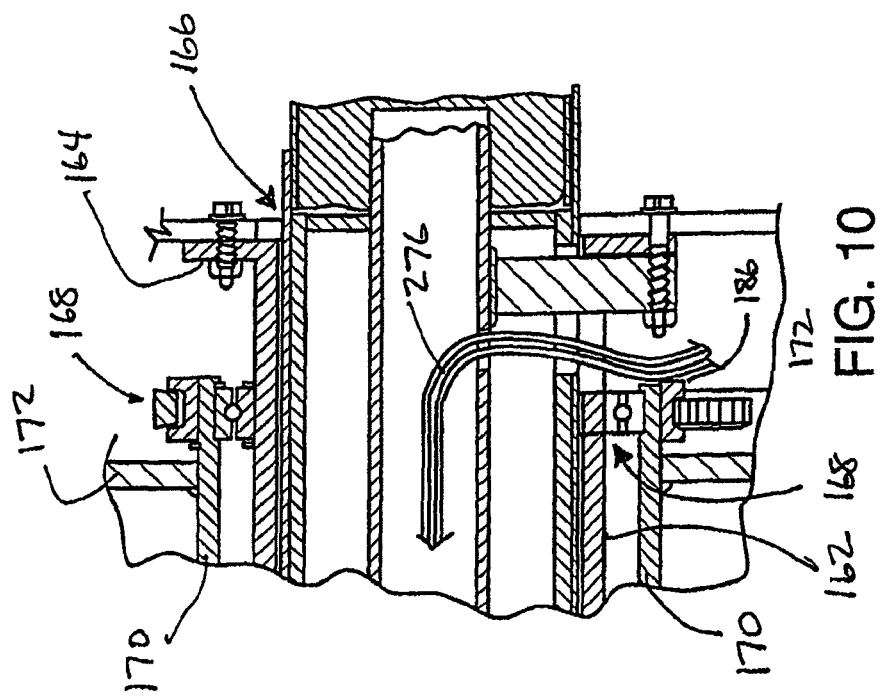
FIG. 10 is an enlarged fragmentary section taken along line 10-10 of FIG. 9
Figure 11:
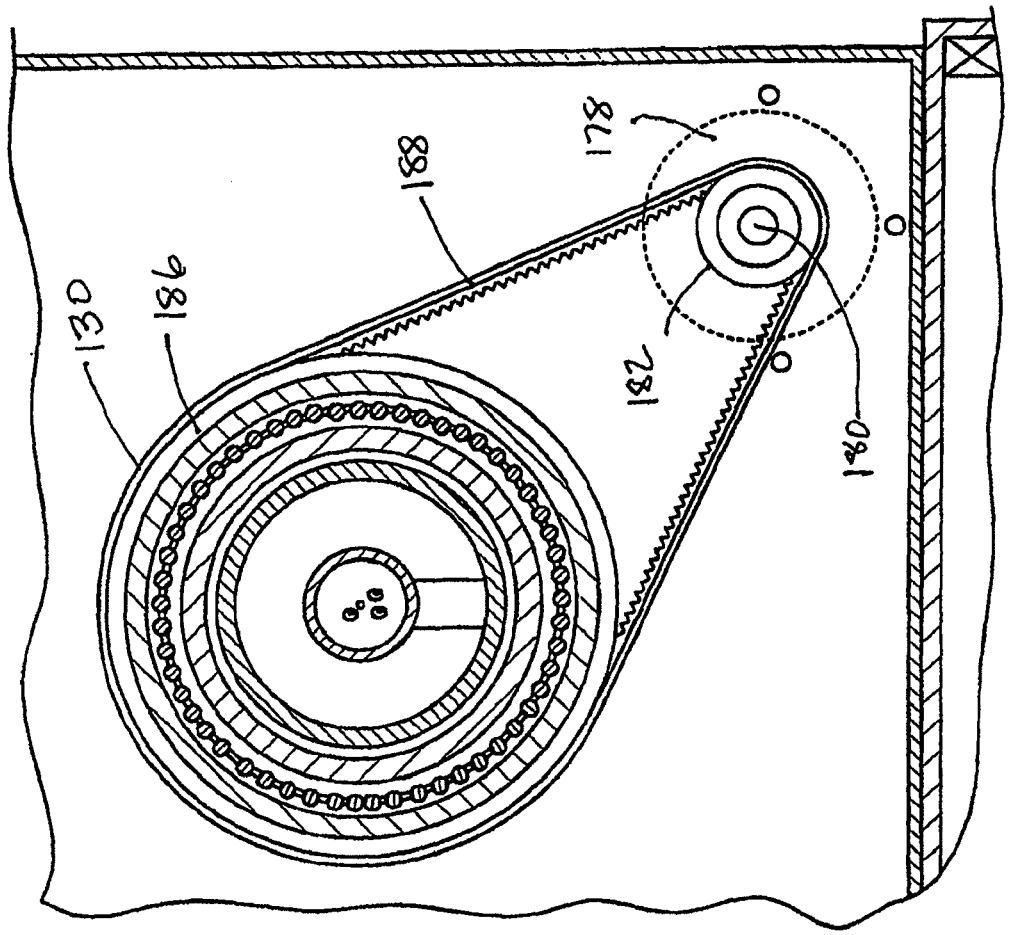
FIG. 11 is an enlarged fragmentary section taken along line 11-11 of FIG. 8 and having been rotate ninety degrees.
Figure 13:
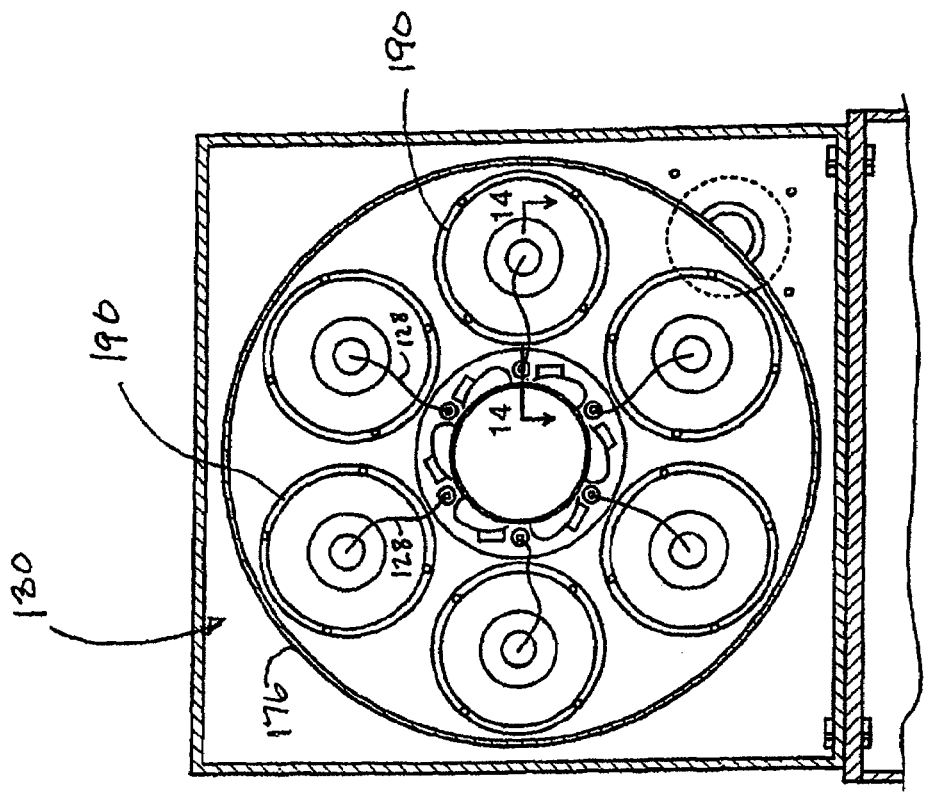
FIG. 13 is an enlarged fragmentary section taken along line 13-13 of FIG. 3.
Figure 12:
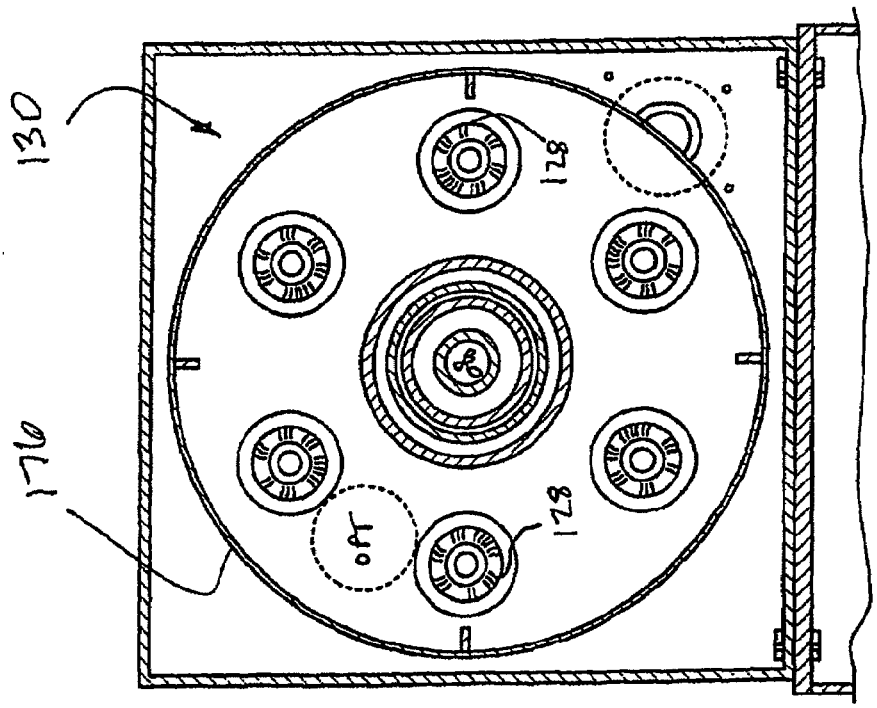
FIG. 12 is an enlarged fragmentary section taken along line 12-12 of FIG. 3.
Figure 16:
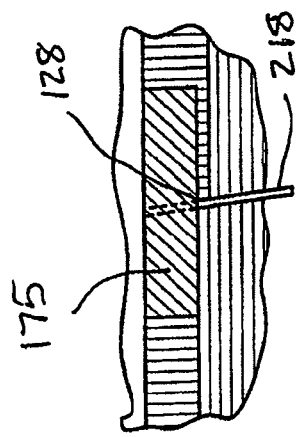
FIG. 16 is an enlarged fragmentary section taken along line 16-16 of FIG. 4.
Figure 14:
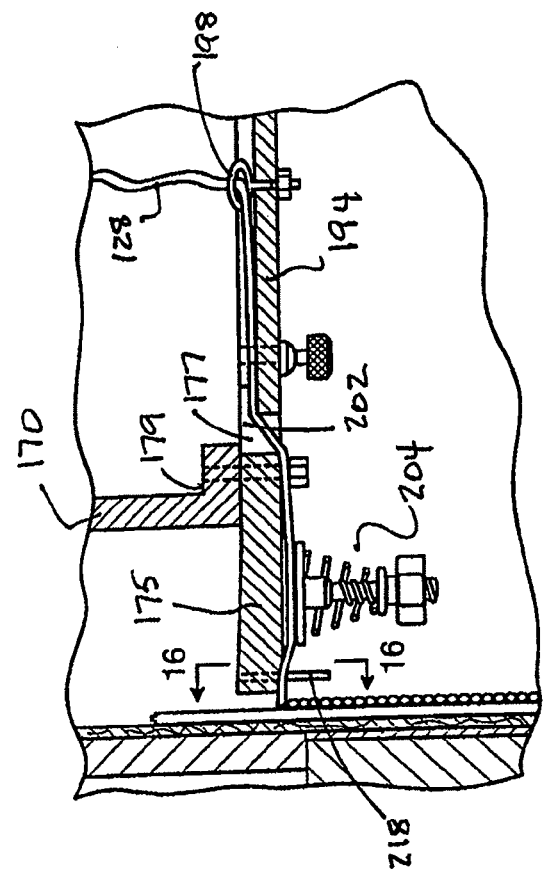
FIG. 14 is an enlarged fragmentary section taken along line 14-14 of FIG. 13.
Figure 17:
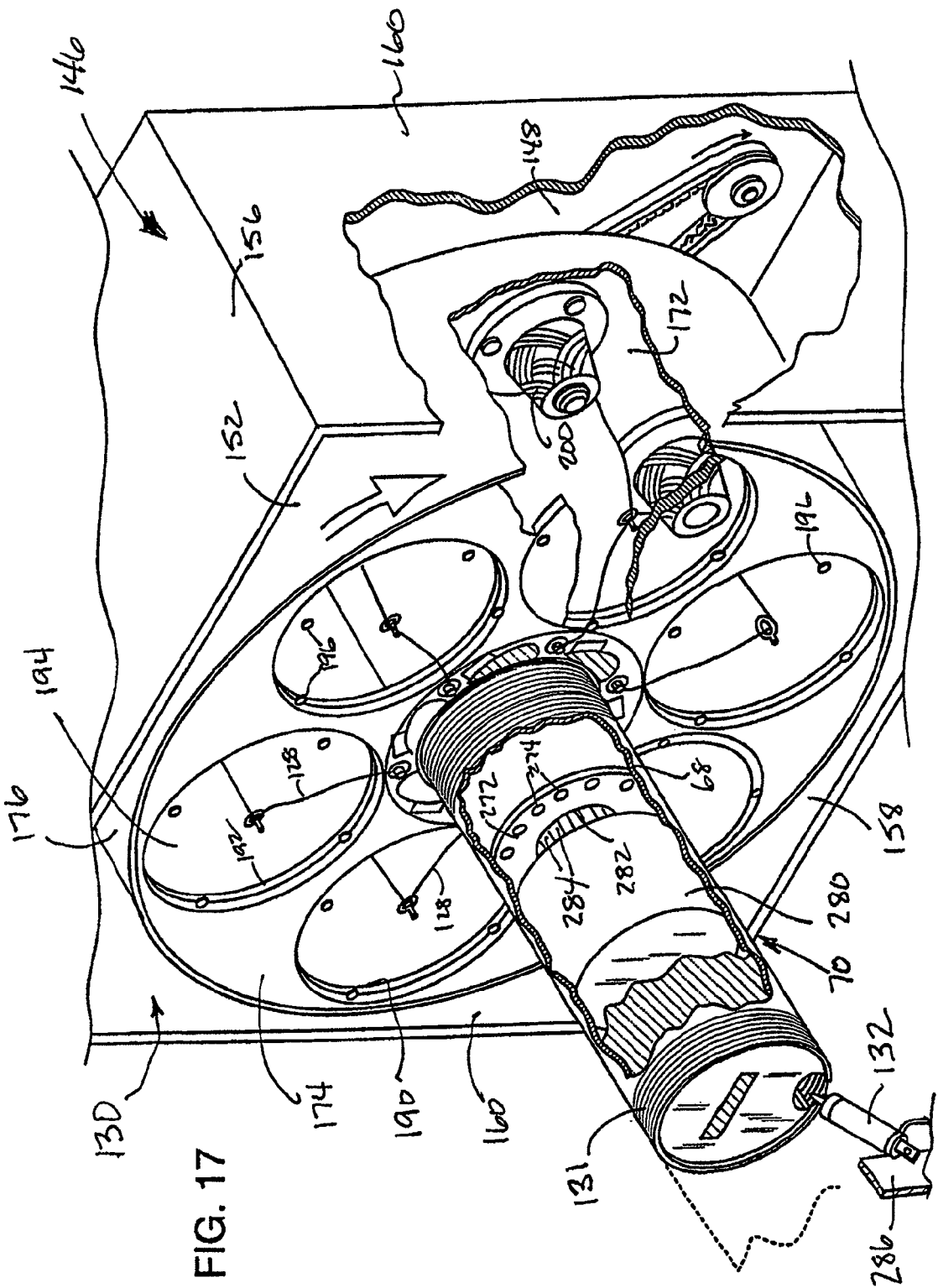
FIG. 17 is an enlarged fragmentary isometric looking downwardly on the downstream end of the weft yarn application station and with parts broken away for clarity.

The weft yarn application station 66, as probably best seen in FIGS. 8 and 17, includes an outer housing 146 having a front or upstream wall 148 with a central circular opening 150 therethrough, a rear or downstream wall 152 having an aligned circular opening 154 therethrough, a top wall 156, a bottom wall 158, and side walls 160. As best seen in FIG. 8, a rigid support ring 162 having a peripheral flange 164 at its upstream end is bolted or otherwise secured to the rear wall 152 of the housing and defines a cylindrical passage 166 through the weft yarn application station. An inner cylindrical surface of the support ring is circumferentially spaced from the belting as it extends through the weft yarn application station. The support ring carries at longitudinally spaced locations on its outer surface the inner races of large diameter thin section ball bearings 168 such as of the type provided by Kaydon Corp. of Sumter, S.C. Outer races of the ball bearings respectively support another cylindrical body 170 that forms the inner cylindrical wall of the rotating drum. The inner cylindrical wall of the rotating drum supports a front radial wall 172 at the upstream end of the drum and rear radial wall 174 at the downstream end of the drum, and the radial walls support an outer cylindrical wall 176 of the drum. The rear radial wall 174 has concentric ring-like portions defining an inner ring plate 175 and an outer ring plate 177. The inner ring plate is secured by fasteners to the ends of the inner cylindrical wall 170 and the outer ring plate is secured with fasteners to an annular flange 179 secured to the inner cylindrical wall 170, as best seen in FIG. 14. A variable speed electric motor 178, serving as power means for the weft yarn application station, is mounted on the upstream face of the front wall 148 of the housing and has a drive shaft 180 that extends into the interior of the housing and supports a drive pulley 182 that is aligned with one of the ball bearings 168. The inner cylindrical wall 170 supports a pulley 186 around which a drive belt 188 extends so as to operably interconnect the drum with the drive pulley 182 of the electric motor. Energization of the electric motor thereby rotates the drum at variably selected speeds. The details of the mounting of the ball bearing and drive belt is probably best seen in the enlarged view in FIG. 10.

Figure 15:
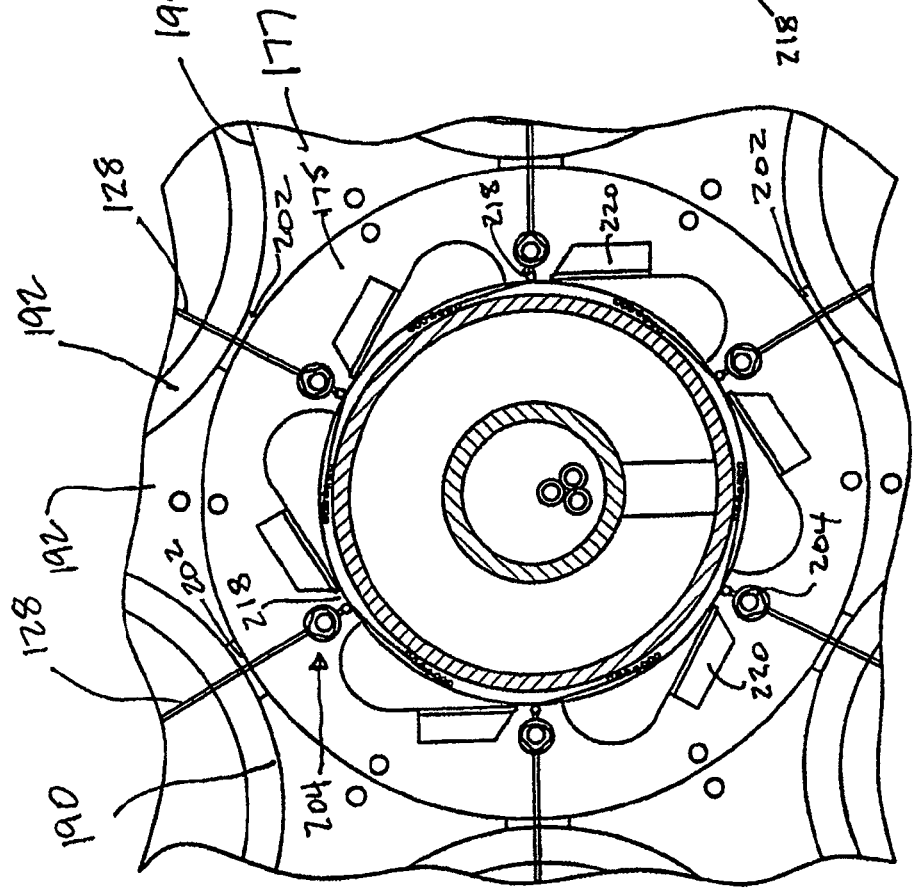
FIG. 15 is a further enlarged sectional view similar to FIG. 13.

The rear or downstream radial wall 174 of the rotating drum consists of a circular plate having a plurality (in the disclosed embodiment six) of circumferentially spaced circular openings 190 therethrough. A peripheral seat 192 passes around each opening so that a disk-like closure plate 194 can be seated in the seat to selectively close the opening. Thumb screw fasteners 196 secure the disk-like closure plates to the rear wall of the drum for easy attachment and removal. This relationship is probably best illustrated in FIGS. 9, 14, 15 and 17. Each disk-like closure plate 194 has an eyelet 198 secured thereto at its geometric center so that the eyelet is positioned on the inner side of the disk. The eyelet serves as a guide for the weft yarn material 128, as will be explained hereafter. A plurality of source supplies of weft yarn material are provided in the form of spools 200 of such material and are removably mounted on the inner surface of the front wall 172 of the rotating drum, again in circumferentially spaced relationship and alignment with the circular openings 190 in the rear wall of the drum. It should be appreciated that the number of spools of weft yarn material could vary and while the disclosed embodiment shows six such spools, more or less could be used, in a preferred embodiment, twelve such spools are used. The weft yarn material is extended from a spool 200 to the eyelet 198 on the associated closure disk 194 and then passed radially inwardly through a gap 202 between the closure disk and the front wall of the drum as best seen in FIG. 15. Associated with each closure disk and in radial alignment therewith is a tensioner 204 for controlling the tension of the weft yarn material mounted on the downstream side of the rear wall 174.

Figure 18:
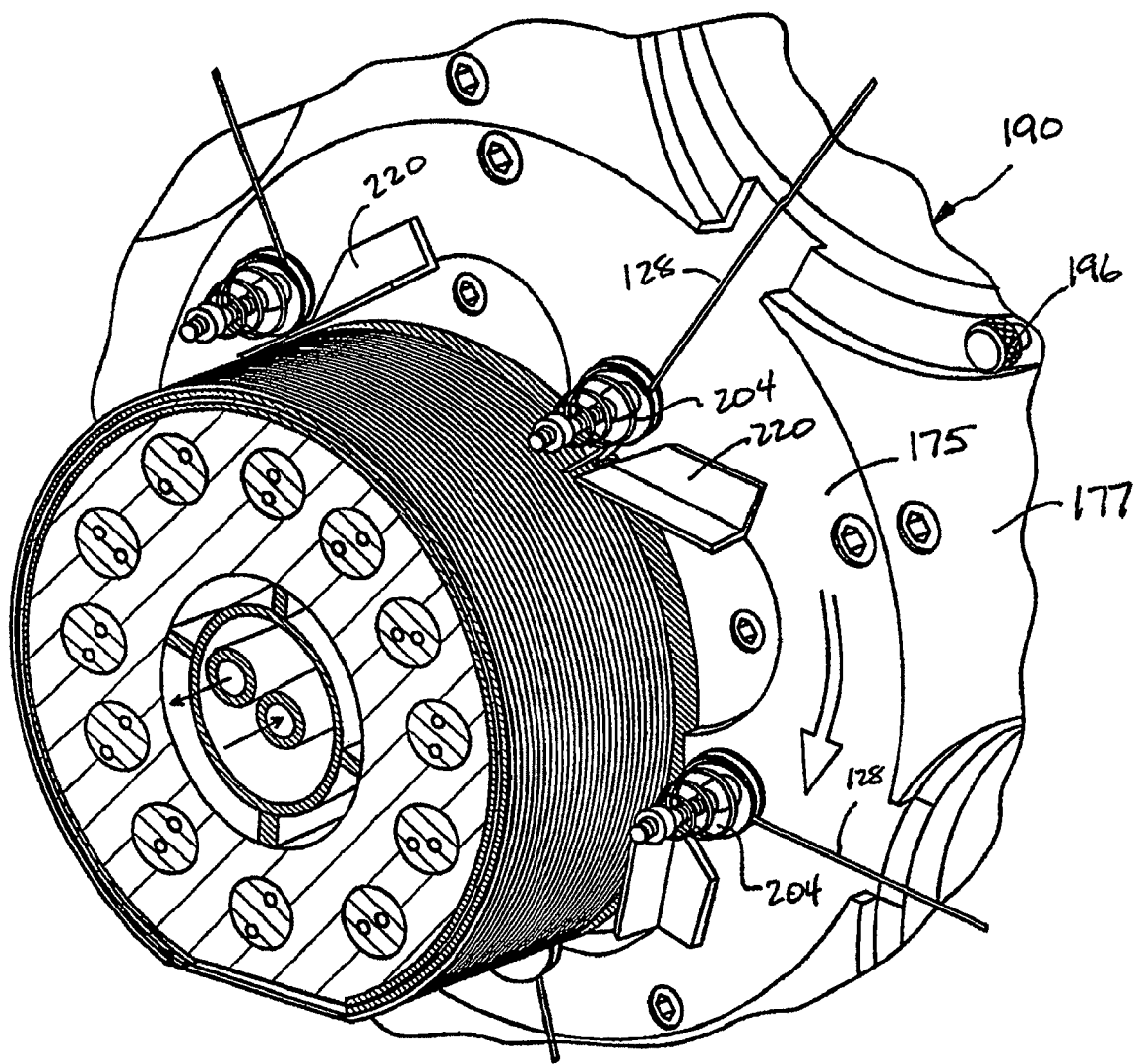
FIG. 18 is a fragmentary isometric similar to FIG. 17 only further enlarged.
Figures 30, 31:
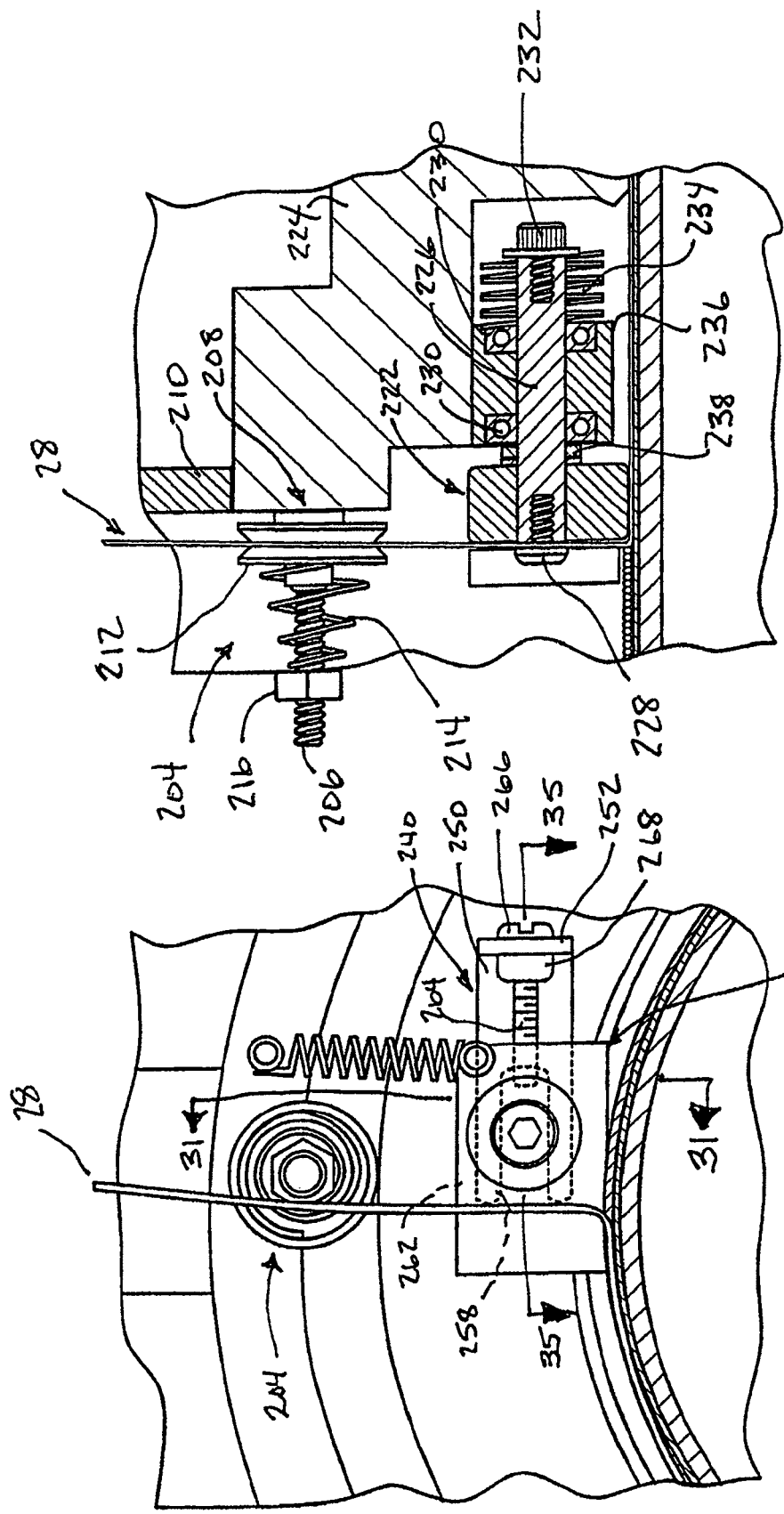
FIG. 30 is a fragmentary vertical section taken through the apparatus of FIG. 1 immediately downstream of the weft yarn application station showing an alternative control system for laying the weft yarns across the warp yarns.
FIG. 31 is a fragmentary section taken along line 31-31 of FIG. 30.

The tensioner 204 as best seen in FIGS. 14, 18 and 31 consists of a threaded rod 206 projecting downstream of the machine and having a disk-like base 208. A collar 210 is slidably disposed on the rod and also has a disk-like base in confronting relationship with the disk-like base 212 of the rod. A coil spring 214 is concentrically mounted on the rod and in engagement with the collar 210 at one end and in engagement with a threaded nut 216 at the opposite end so that the nut can be threaded onto the rod and positioned at any selected longitudinal position to vary the compressive strength of the coil spring. The weft yarn material 128 passes between the base of the rod and the base of the collar and is allowed to slide therebetween but in frictional engagement therewith. The frictional drag on the weft yarn material is regulated by the compressive strength of the spring.

Immediately adjacent to the tensioner 204 and in radial alignment therewith at the innermost edge of the rear wall 174 of the drum 136 is a guide pin 218 that also projects downstream of the machine and around which the weft yarn material extends. The guide pin is positioned immediately adjacent to the warp yarn material 78, for example, at a gap of about 0.015 inches, though other gaps could be used. The guide pin thereby allows the weft yarn 128 to be very accurately applied across the warp yarn material as the drum is rotated in a manner to be described in more detail hereafter.

As probably best seen in FIG. 18, a plurality of leveling plates 220 of generally L-shaped cross-section are mounted on the downstream face of the rear wall 174 of the rotating drum immediately adjacent to an associated tensioner 204 and guide pin 218 and positioned to the right or in a clockwise direction from the tensioner and guide pin when looking upstream. The leveling plate is mounted a distance approximately equal to the thickness of the weft yarns 128 from the adhesive outer surface of the warp yarn material 78 so as to assure a uniform level wrap of the weft yarn material onto the adhesive scrim or lace of the warp yarn material.

An alternate guide pin in the form of a leveling block 222 is illustrated in FIGS. 30 through 36. It will there be seen that the leveling block is positioned immediately adjacent to an associated tensioner 204 which serves both to guide the weft yarn 128 as it is laid down on the warp yarn material 78 and also to assure that the previous wraps of weft yarn are in a single layer and packed together as desired. The block 222 provides significant control over the lay down of the weft yarn material and provides for accurate placement of the yarns relative to one another. The weft yarns can be packed very densely up to 140, 36/1 cotton count yarns per inch or they can be placed accurately with no more than a ten thousandths of an inch difference in the position of one yarn and the position of the next adjacent yarn.

The leveling block 222 as best seen in FIG. 36 is generally L-shaped in transverse cross-section and pivotally mounted to a ring block 224 (which replaces the inner ring plate 175 described previously) on the inner periphery of the rear wall 174 of the rotating drum 130 with a pivot assembly. The pivot assembly as best seen in FIGS. 30 and 31 includes a pivot shaft 226 that is keyed to the leveling block and secured thereto with a cap screw 228 with the pivot shaft being rotatably mounted on a pair of ball bearings 230 mounted within the ring block. The innermost end of the pivot shaft also has a cap screw 232 secured therein which retains a compression spring 234 between the end cap and an abutment surface 236 within the ring block. The compressive force of the compression spring can be regulated with the cap screw and serves to operably draw the leveling block against a low friction washer 238 to adjust the ease with which the leveling block is allowed to pivot with the pivot shaft.

A coil spring 240 anchored to the rear wall 174 of the rotating drum 130 and to the leveling block 222 biases the opposite end of the block against the underlying previously wrapped weft yarn material 128. This keeps the wraps of weft yarn material in one uniform level which is desired for the finished nonwoven fabric product. The leveling block has two legs 242 and 244 which define a groove 246 at their juncture with the groove confining and controlling a segment of the weft yarn material 128 as it is transferred from the associated and adjacent tensioner 204 to the surface of the warp yarn material 78 in a controlled manner. Of course, when the leveling blocks are used, the previously described leveling plates 220 are not necessary.

An adjustable spacer 248 is mounted on the leveling block 222 and functions to selectively adjust the spacing between the leveling block and the ring block 224 (FIGS. 30 and 31) so that the groove 246 in the leveling block can be aligned with the tensioner 204 whereby the weft yarns pass in a straight line through the tensioner and the groove in the leveling block before being applied to the adhesive scrim. The adjustable spacer 248, as probably best seen in FIGS. 30, 35 and 36, includes an L-shaped wedge base 250 having a short leg 252 with a circular passage 254 therethrough and a long leg 256 having a slot 258 in its free end so as to bifurcate the long leg thereby defining a pair of straddling arms 262. The long leg is tapered in cross-section so that it is thicker at the end adjacent to the short leg 252 and thinner at its free end 260. The L-shaped base is secured to an end of the leveling block 222 with an adjustable cap screw 264 that passes through the passage 254 in the short leg such that the short leg is captured between the head 266 of the screw and a fixed washer 268 on the screw. The screw is threadably received in a threaded hole 270 in the end of the leveling block and is adjustable therein so that as the screw is advanced into or backed out of the threaded hole in the leveling block, the L-shaped base is slidably moved relative to the pivot shaft 226. The slot 258 in the long leg straddles the pivot shaft so that the arms 262 are positioned above and below the pivot shaft. Sliding movement of the L-shaped arm along the length of the long leg 256 between the leveling block and the ring block causes the spacing between the leveling block and the ring block to be adjusted as the cap screw 264 is moved into or out of the threaded hole. The L-shaped base is preferably made of a low friction material that interfaces with the low friction washer 238 previously described so that the leveling block freely pivots relative to the ring block as desired.

The heating or adhesive activating station 68 consists of a steel or other heat transmitting cylindrical core 272 that is positioned interiorly of the belt 124 immediately downstream from the weft yarn material application station 66 and forms an axial extension of the rigid cylindrical ring 162 in the weft yarn application station. Resistive heat elements 274 are circumferentially positioned around the steel core 272 with the resistive heat elements connected to an electrical source by wiring 276 as possibly best seen in FIGS. 8 and 10, which passes through the cylindrical ring support in the weft yarn application station and outwardly of the apparatus through a circular aperture 278 therein so that it can be plugged into an electrical power source in a conventional manner. When an electrical current is applied to the resistive elements, the metal core 272 is heated thereby radiating heat outwardly through the warp yarn material, the adhesive scrim or lace of the warp yarn material, and the overlying layer of weft yarn material. The heat is controlled to sufficiently activate the adhesive in the adhesive scrim to bond the warp and weft yarns together. In addition to the heating and cooling means described herein, the skilled artisan can select other heating and cooling means, e.g., steam heat and cooling water mist, could be employed.

As the composite material 131 of bonded warp and weft yarns is moved downstream, it next encounters the cooling or adhesive setting station 70 which, again, includes a steel or other heat conductive cylinder 280 which immediately underlies the belt 124. A heat transfer system 282 interiorly of the cylinder 280 uses circulating coolant from inlet and outlet tubes 284, respectively, in a conventional manner to remove heat from the composite material. The coolant transfer tubes which are seen in FIG. 19, for example, are connected to the heat transfer system so that a continuous supply of coolant fluid can be circulated through the cooling station to set the adhesive of the scrim or lace thereby securely bonding the warp and weft yarn material.

As the composite fabric material 131 leaves the cooling station 70 and is moved further downstream, it engages the fabric cutter 132 that is conventional and is mounted on a bracket 286 immediately beneath the foam support 140. The cutter serves to sever the composite material 131 of warp and weft yarn material along its length as it is moved along the apparatus. Heat or ultrasonic means (not shown) can also be used to fuse the severed edges of the fabric material as it is being cut.

As the composite fabric material progresses further downstream after being cut, it is flattened out as the support structure 126 transgresses from a cylindrical configuration to a flat configuration in the flattening station 72. Accordingly, as the nonwoven fabric material reaches the drive roller 133 and then passes to the take-up station 76, it has been flattened on the belt 124 and is wrapped around the take-up roll 136 until a desired amount of fabric material has been accumulated. The take-up roll can then be removed from the machine and replaced with another take-up roller to continue the process.

The resulting nonwoven fabric has both warp and weft yarns, secured by adhesive which contacts only a portion of the individual yarns, i.e., by yarn to yarn, or point to point contact. No yarns in the product are intentionally coated completely with adhesive. This factor preserves the feel of the nonwoven fabric as being more akin to a woven fabric. This nonwoven fabric material is another especially preferred embodiment of the present invention.

To further describe one preferred nonwoven fabric manufacturing method of the invention and the operation of the apparatus therefor, a supply roll 90 of warp yarn material that was prepared in the warp yarn material manufacturing unit 82 is mounted in the supply station 64 and the warp yarn materials pulled through the apparatus to the take-up station where it is secured to the take-up roll 136. The drive roller 133 is rotatively driven by a motor (not shown) at the same speed as the transfer belt 124 and the motor is controlled by a control system in box 302 (FIGS. 1-3) that also serves as the control system for the motor 178 at the weft yarn application station 66, the heating station 68 and the cooling station 70. To begin manufacture of the nonwoven fabric 131, after the warp yarns have been aligned and adhesive has been applied to them, or in the alternative to a nonwoven substrate in the warp yarn material manufacturing unit 82, to create the warp yarn material, the drive roller 133 and transfer belt 124 are driven in conjunction with the take-up roll 136. The Teflon® belt 124 supports and moves the warp yarn material along the length of the apparatus. A braking force (not shown) is applied to the supply roll of the warp yarn material to facilitate regulating the tension in the warp yarn material and avoid overruns. The rotating drum 130 in the weft yarn application station is next activated so as to rotate in a clockwise direction as viewed upstream in FIGS. 17 and 18. Before advancing the warp yarns and before rotating the drum, the strands of weft yarn material mounted in the drum are threaded through the associated eyelets 198, the tensioners 204 and around the guide pins 218 and initially taped to the warp yarn material 78. It will, therefore, be appreciated that when the drum is rotated in the clockwise direction, the various strands of weft yarn material 128 are wrapped around the warp yarn material, which is simultaneously being moved linearly through the weft yarn application station 66 so that the various strands of weft yarn material are wrapped about the warp yarn material in adjacent relationship. As will be appreciated, by varying the rate of rotation of the drum relative to the linear speed of the warp yarn material passing through the drum, the spacing of the weft yarn strands can be regulated so that the strands are either positioned in closely packed contiguous relationship or slightly spaced with the spacing being variable but precise relative to one another depending upon the relative speeds of the rotating drum and drive roll and transfer belt which advances the transfer belt and the warp yarn material linearly through the drum. Of course, the greater the ratio of linear speed of warp yarn material to the rotating speed of the drum, the greater the spacing between wraps of weft yarn strands.

As will also be appreciated, since the warp yarn material is moving linearly in a machine direction, as the weft yarns are wrapped there around, the weft yarns are not wrapped perfectly perpendicular to the warp yarns or fibers in the warp yarn material even though they are substantially so. Again, as the ratio of the linear speed of the warp yarn material to the rotative speed of the drum increases, the angle of wrap of the weft yarn material relative to the length of the warp yarns or fibers decreases. The angle of wrap might vary anywhere up to slightly more than about 89.7 degrees depending upon the relative differential in speeds. In other words, when slowing the linear speed of the warp yarn material relative to the rotative speed of the drum, the yarns can be wrapped closely together and substantially perpendicular to the warp yarns or fibers in the warp yarn material (i.e., approaching 90 degrees) but as the linear speed of the warp yarn material is increased without increasing the rotating speed of the drum, the angle of wrap decreases down to, for example, about 80-85 degrees. The angle of wrap is the angle between the longitudinal axis of the machine and the transverse direction of the weft yarn material.

As mentioned previously, after the weft yarn material is wrapped about the adhesive scrim and the underlying warp yarns or fibers of the warp yarn material, the combined materials pass through a heating station 68 where the adhesive is activated to a tacky state such that the warp and weft yarn material are adhesively bonded or joined together. As the material progresses further downstream, it passes through a cooling station 70 where the adhesive is set so as to remove the tacky or sticky nature of the adhesive but yet the warp and the weft yarns are bonded into a nonwoven fabric as desired. Further movement of the warp and weft material along the length of the machine causes the cylindrically wrapped weft yarns to be cut by the cutter 132 thereby forming a web of nonwoven fabric material 131 which is flattened out as it progresses toward the drive roller, a flat bed laminator 74 (if used), and ultimately the take-up roll 136 (or sheeter, not shown), by the progressively flattening nature of the support structure 126 on which the material is guided. The material is wrapped around the take-up roll at the take-up station which can be removed from the machine when a desired amount of nonwoven fabric material is wrapped thereon.

The adhesive scrim or lace 116 of the warp yarn material 78 could come in numerous forms but in a preferred embodiment it is a web of adhesive strands which have been secured together randomly providing gaps therebetween. A suitable adhesive web is manufactured by Bostic Company of Middleton, Mass. Accordingly, when the adhesive scrim is activated at the heating station, the adhesive does not cover the entire surface area of the warp and weft yarn material but rather preferably has a basis weight that is about 5-20% of the total weight of the structure. The amount of adhesive laid down has a direct bearing on the softness and hand of the nonwoven fabric material manufactured with the above described apparatus and, of course, this is a variable that is controlled with the type of scrim or other adhesive material used.

Another type of adhesive material that could be used is a meltblown adhesive. A meltblown adhesive web could be purchased, or a meltblown applicator could be used to blow the adhesive onto the adhesive support roll of the adhesive applicator for lamination onto the aligned warp yarns or the meltblown adhesive could be blown directly onto the warp yarns. The advantage of a meltblown adhesive may be the uniformity of the web at the low density of adhesive basis weight. Since meltblown fibers are micro denier fibers, a low density, and very uniform web can be created for bonding the warp yarns to the weft yarns of the nonwoven. Uniformity of the adhesive web may enhance the appearance of the non-woven.

Figure 27:
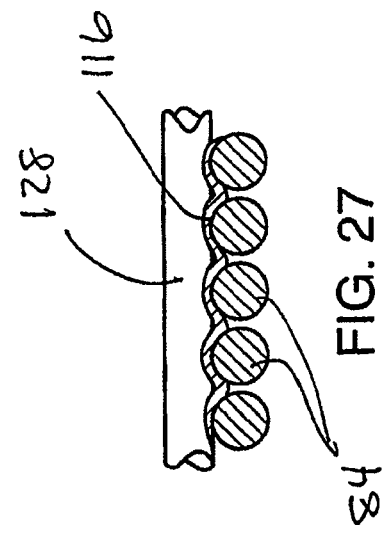
FIG. 27 is a vertical section taken through the fabric of FIG. 24 with the fabric being inverted.
Figure 28:
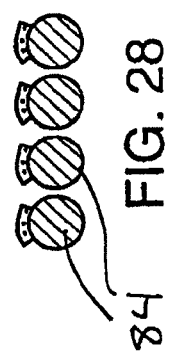
FIG. 28 is a sectional view taken through the warp yarns of the nonwoven fabric of the present invention with adhesive being shown on the radially outermost surface of the yarns.

As mentioned previously, by varying the speed of rotation of the drum 130 relative to the linear speed of the belt 124, the wraps of weft yarn material can either be positioned immediately adjacent and contiguous with each other or in spaced relationship. This is illustrated, for example, in FIGS. 23 and 24, respectively. Warp yarns 84 as illustrated in each embodiment are positioned contiguous with each other but the spacing of the wraps of weft yarn 128 is varied. FIG. 25 shows an even greater spacing of the weft yarns 128 relative to the warp yarns 84 and it should be appreciated, even though it is not evident in the drawings, that the greater the spacing of the weft yarn wraps, the smaller the angle of wrap the weft yarns make with the longitudinal axis of the warp yarns. In other words, as the weft yarns are wrapped closer and closer together, the angle of wrap of the weft yarn increases to approach 90 degrees, but as the spacing of the weft yarns increase, the angle diminishes down to, for example, approximately 80-85 degrees. FIG. 27 is a diagrammatic view illustrating the adhesive bond between the warp 84 and weft 128 yarns, while FIG. 28 is a diagrammatic view illustrating how the adhesive in the scrim 116 is applied only to the radially outermost surface of the warp yarns 84.

Figure 29:
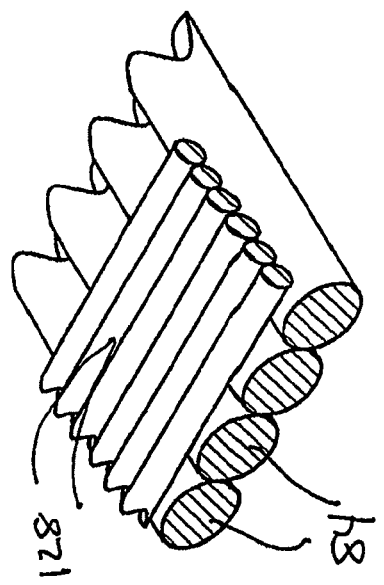
FIG. 29 is a fragmentary isometric of a fifth embodiment of a nonwoven fabric made with the apparatus of FIG. 1.
Figure 26:
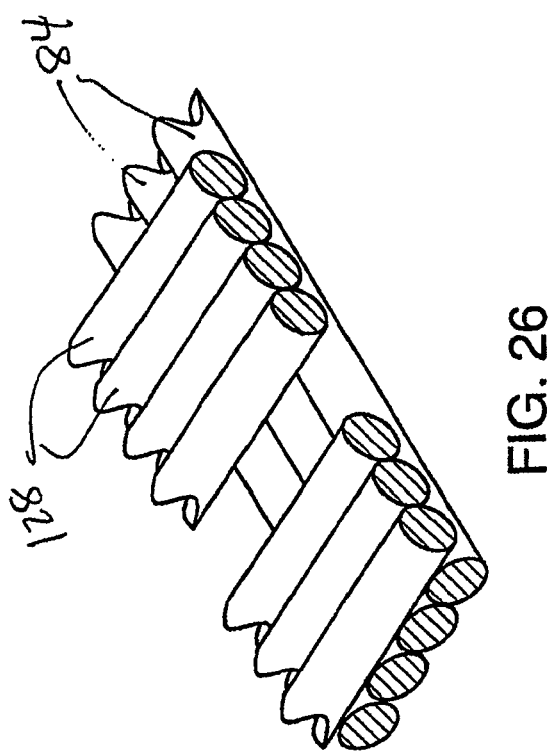
FIG. 26 is a fragmentary isometric of a fourth embodiment of a fabric manufactured with the apparatus of FIG. 1.

FIG. 29 illustrates still another embodiment of a fabric that can be manufactured with the apparatus of the present invention and wherein the weft yarn material 128 is of a smaller denier or diameter than the warp yarns 84 It will be appreciated that the warp yarns could also be of a smaller denier relative to the weft yarns. Moreover, mixtures of weft yarns (not shown), for example yarns of various types (synthetic, natural, yarn-substitutes) and/or yarns of various deniers, can be applied as weft yarns using this apparatus, resulting in nonwoven fabric materials having particularly interesting and unique properties.

Another preferred version of the XD apparatus is shown in FIGS. 60 through 70, and includes an elongated in-line framework 62' including a warp yarn material supply station 64', a weft yarn application station 66', a heating station 68', a cooling station 70', a flattening station 72', and a take-up station 76'. From the take-up station, the composite nonwoven fabric of this invention can either be used directly, for instance as a light filtering medium, or it can be pressure laminated into a high strength composite fabric, suitable for use under extreme conditions, e.g., as sail cloth fabric. As shown in FIGS. 60 and 62, a warp yarn material 78' is provided on a supply roll 80' at the warp yarn material supply station 64'. Once in place at the supply station 64' of the apparatus of the present invention the warp yarn material 78' is passed on an endless, recycling transfer belt 124', preferably of PTFE (Teflon®). A series of bars and folding points (not shown) convert the flat sheet of warp yarn material and the belt into a curved or cylindrical shape. This folding box equipment is known in the art, and once the warp yarn material has the general shape of a cylinder, with the adhesive layer on the outside or exposed surface, the warp yarns are ready to be over wrapped with the weft yarn material.

Once formed into a cylindrical shape, the warp yarn material is advanced through the weft yarn application station 66' at a pre-determined rate with the warp yarn adhesive film positioned on the exterior surface of the cylindrically configured warp yarn material. As the warp yarn material passes through the weft yarn application station, a series of weft yarns 128' radially located on a rotating drum 130' an equal distance from one another are wrapped transversely around the cylindrically configured warp yarn material at a predetermined rate and the resultant composite structure of warp yarn material 78', adhesive film 116' and weft yarns 128' is then advanced through the heating station 68' where the adhesive film is melted so that the adhesive will bond the warp yarn material and the weft yarns.

Immediately thereafter, the composite material passes through the cooling or adhesive setting station 70' where the adhesive is set so as to no longer be tacky. The bonded fabric composite 131' progresses from the cooling station to the take-up station 76', a cutter 132', preferably a rotary cutter, longitudinally severs the cylindrical composite fabric material and the cut composite fabric material progressively changes from its cylindrical orientation, back to a generally flat orientation in the flattening station 72'. At the downstream end of the flattening station, the belt passes down and around a drive roller 133' that underlies the endless belt, where the belt is returned to the supply station 64' via tensioning roller 135' and idler rollers 137'. The drive roller, through its driving engagement with the endless belt, thereby advances the warp yarn material through the apparatus.

FIG. 63 is another diagrammatic view looking down on the apparatus shown in FIG. 62. This view illustrates the longitudinal, or machine direction orientation of the warp yarn material as it enters the weft yarn application station 66' and the resultant nonwoven composite fabric product 131' extending from the weft yarn application station toward the take-up station 76'.

The supply of warp yarn material 78' is disposed on the transfer roll 90 at the supply station and the yarns or fibers in the material 78' extend in parallel side-by-side relationship. A suitable braking or friction system (not shown) prevents the roll 110' from rotating freely and thus overrunning. The material is passed over an idler roller 144' onto the driven, endless recycling PTFE (Teflon®) belt 124 that supports the warp yarn material and advances it through the weft yarn application station. The PTFE (Teflon®) belt conforms to the support structure 126' and slides over a stainless steel wear plate.

As seen in FIG. 63, at the weft yarn application station 66', the PTFE (Teflon®) belting 124' continues through the weft yarn application station and is supported by a rigid inner cylindrical ring 144' that extends substantially the full length of the weft yarn application station. FIG. 64 illustrates the weft yarn application station 66' which includes an outer housing 146' having a rear or downstream wall 152' having an aligned circular opening 154' therethrough, a top wall 156', a bottom wall 158', and side walls 160'. A rigid support ring 162' having a peripheral flange 164' at its upstream end is bolted or otherwise secured to the rear wall 152' of the housing and defines a cylindrical passage 166' through the weft yarn application station. An inner cylindrical surface of the support ring is circumferentially spaced from the belting as it extends through the weft yarn application station. The support ring carries at longitudinally spaced locations on its outer surface the inner races of large diameter thin section ball bearings 168' such as of the type provided by Kaydon Corp. of Sumter, S.C. Outer races of the ball bearings respectively support another cylindrical body 170' that forms the inner cylindrical wall of the rotating drum. The inner cylindrical wall of the rotating drum supports a front radial wall 172' at the upstream end of the drum and radial wheel 194' at the downstream end of the drum, and the radial walls support an outer cylindrical wall 176' of the drum. The radial wheel 194' has guide posts 195' on the outer edges for delivering the weft yarns to the warp ring. The innermost portion of the radial wheel terminates at the conical aligner 200, which has a radiused, curved or sloped surface. The conical aligner 200 guides the weft yarns into a substantially perpendicular alignment with the warp yarns.

A variable speed electric motor 178', serving as power means for the weft yarn application station, is mounted on the upstream face of the front wall 148' of the housing and has a drive shaft 180' that extends into the interior of the housing and supports a drive pulley 182' that is aligned with one of the ball bearings 168'. The inner cylindrical wall 170' supports a pulley 186' around which a drive belt 188' extends so as to operably interconnect the drum with the drive pulley 182' of the electric motor. Energization of the electric motor thereby rotates the drum at variably selected speeds. The details of the mounting of the ball bearing and drive belt is probably best seen in the enlarged view in FIG. 65.

A plurality of source supplies of weft yarn material are provided in the form of spools 206' of such material and are removably mounted on the inner surface of the front wall 172' of the rotating drum, again in circumferentially spaced relationship and alignment with the circular openings 190' in the rear wall of the drum. It should be appreciated that the number of spools of weft yarn material could vary and while the disclosed embodiment shows six such spools, more or less could be used, in a preferred embodiment, twelve such spools are used. The weft yarn material is extended from a spool 206' to the eyelet 198' on disk 194' and then passed radially inwardly down the face of disk 194' to another eyelet at the base of disk 194'.

Figure 69:
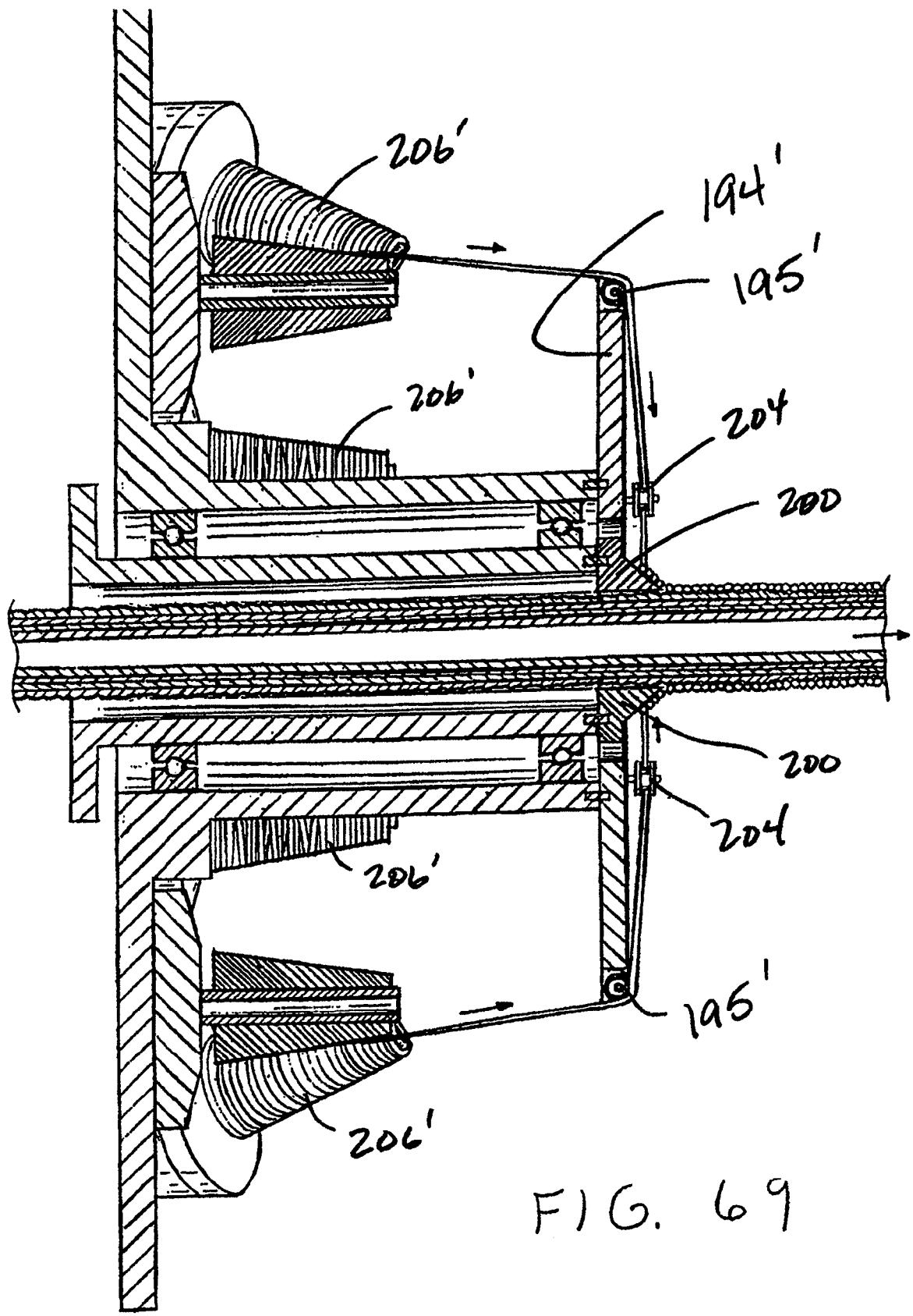
FIG. 69 is a side cutaway of the conical aligner showing how the weft yarns are delivered to the warp yarn surface in a tightly packed arrangement.
Figure 70:
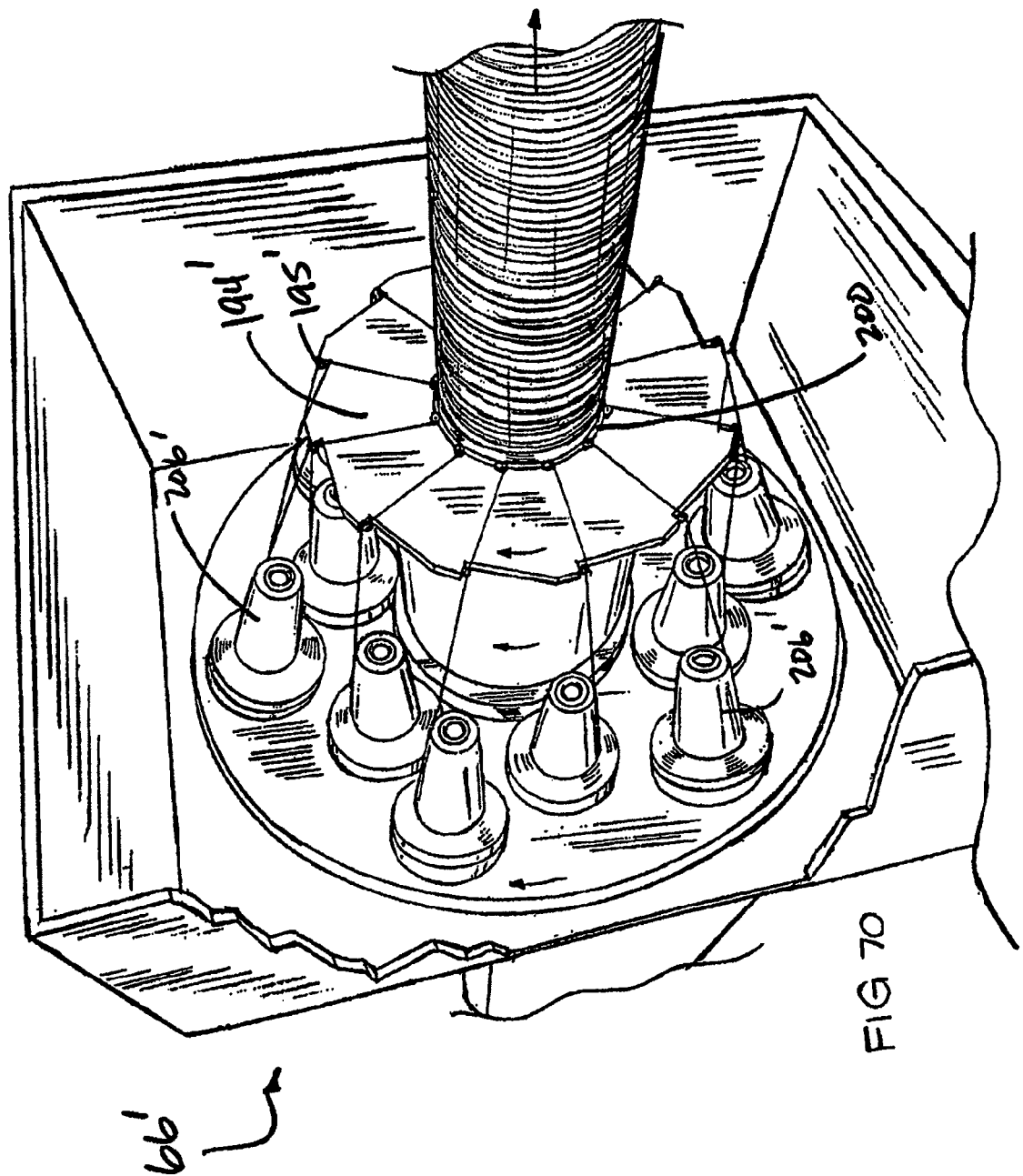
FIG. 70 is a perspective view showing the weft yarns being applied at wide spacing to the warp yarn cylinder, showing how the weft yarns slide down the conical aligner face to drop precisely down on the warp yarn material.

As the weft yarn application drum rotates, the weft yarns are delivered through guides 204' on disk 194', and the yarns slip down the curved slope of the conical aligner 200, by which each yarn is delivered to the warp in a substantially perpendicular alignment. FIGS. 69 and 70 best illustrate the conical aligner of the present invention. As shown in FIG. 69 in particular, the conical aligner 200 is a stationary device, with a surface angle or slope which faces the direction of travel of the warp yarn materials. The weft yarns are delivered to the surface of the conical aligner by rotatory pulleys operating in conjunction with the rotating drum. As with the previously described XD embodiment, mixtures of weft yarns (not shown), for example yarns of various types (synthetic, natural, yarn-substitutes) and/or yarns of various deniers, can be applied as weft yarns using this apparatus, resulting in nonwoven fabric materials having particularly interesting and unique properties. The individual weft yarns are each delivered to substantially the same spot on the sloped surface of the conical aligner. They fall down the sloped surface, and are forced, one after the other, down into a tight spacing on the surface of the adhesive coated warp yarns. FIG. 70 shows a perspective view of the application of weft yarns, in a wide spacing manner, to the warp yarns. FIGS. 69 and 70 are perspective views showing the conical aligner 200 from the right and left sides respectively. Once the weft yarns have been applied to the warp yarn material, the adhesive between the yarns must be heated and cooled to form a nonwoven fabric. These steps are conducted in the next part of the apparatus as discussed below.

The adhesive heating station 68' consists of a steel or other heat transmitting cylindrical core 272' that is positioned interiorly of the belt 124' immediately downstream from the weft yarn material application station 66' and forms an axial extension of the rigid cylindrical ring 162' in the weft yarn application station. Resistive heat elements 274' are circumferentially positioned around the steel core 272' with the resistive heat elements connected to an electrical source by wiring 276' as possibly best seen in FIGS. 67 and 69, which passes through the cylindrical ring support in the weft yarn application station and outwardly of the apparatus through a circular aperture 278' therein so that it can be plugged into an electrical power source in a conventional manner. When an electrical current is applied to the resistive elements, the metal core 272' is heated thereby radiating heat outwardly through the warp yarn material, the adhesive on the warp yarn material, and the overlying layer of weft yarn material. The heat is controlled to sufficiently melt the adhesive to bond the warp and weft yarns together.

As the composite fabric material 131' of bonded warp and weft yarns is moved downstream, it next encounters the cooling or adhesive setting station 70 which, again, includes a steel or other heat conductive cylinder 280' which immediately underlies the belt 124'. A heat transfer system 282' interiorly of the cylinder 280' uses circulating coolant (e.g., cold water) from inlet and outlet tubes 284', respectively, in a conventional manner to remove heat from the composite fabric material. The coolant transfer tubes (not shown) are connected to the heat transfer system so that a continuous supply of coolant fluid can be circulated through the cooling station to set the adhesive thereby securely bonding the warp and weft yarn material.

As the composite fabric material 131' leaves the cooling station 70' and is moved further downstream, it engages the fabric cutter 132' that is conventional and is mounted on a bracket 286'. The cutter serves to sever the composite fabric material 131' along its length as it is moved along the apparatus.

As the material progresses further downstream after being cut, it is flattened out as the support structure 126' transgresses from a cylindrical configuration to a flat configuration in the flattening station 72'. Accordingly, as the nonwoven composite fabric material reaches the drive roller 133' and then passes to the take-up station 76', it has been flattened on the belt 124' and is wrapped around the take-up roll 136' until a desired amount of fabric material has been accumulated. The take-up roller can then be removed from the machine and replaced with another take-up roller to continue the process. If desired, the combined warp and weft yarn material formed on either of the XD apparatus described above can be reused as a substrate material. An adhesive material would be required for further processing with additional layers of weft yarn materials, but composite structures can be formed using the apparatus described herein.

Pressure Lamination Apparatus and Nonwoven Fabrics Formed Thereby

Figure 1B:
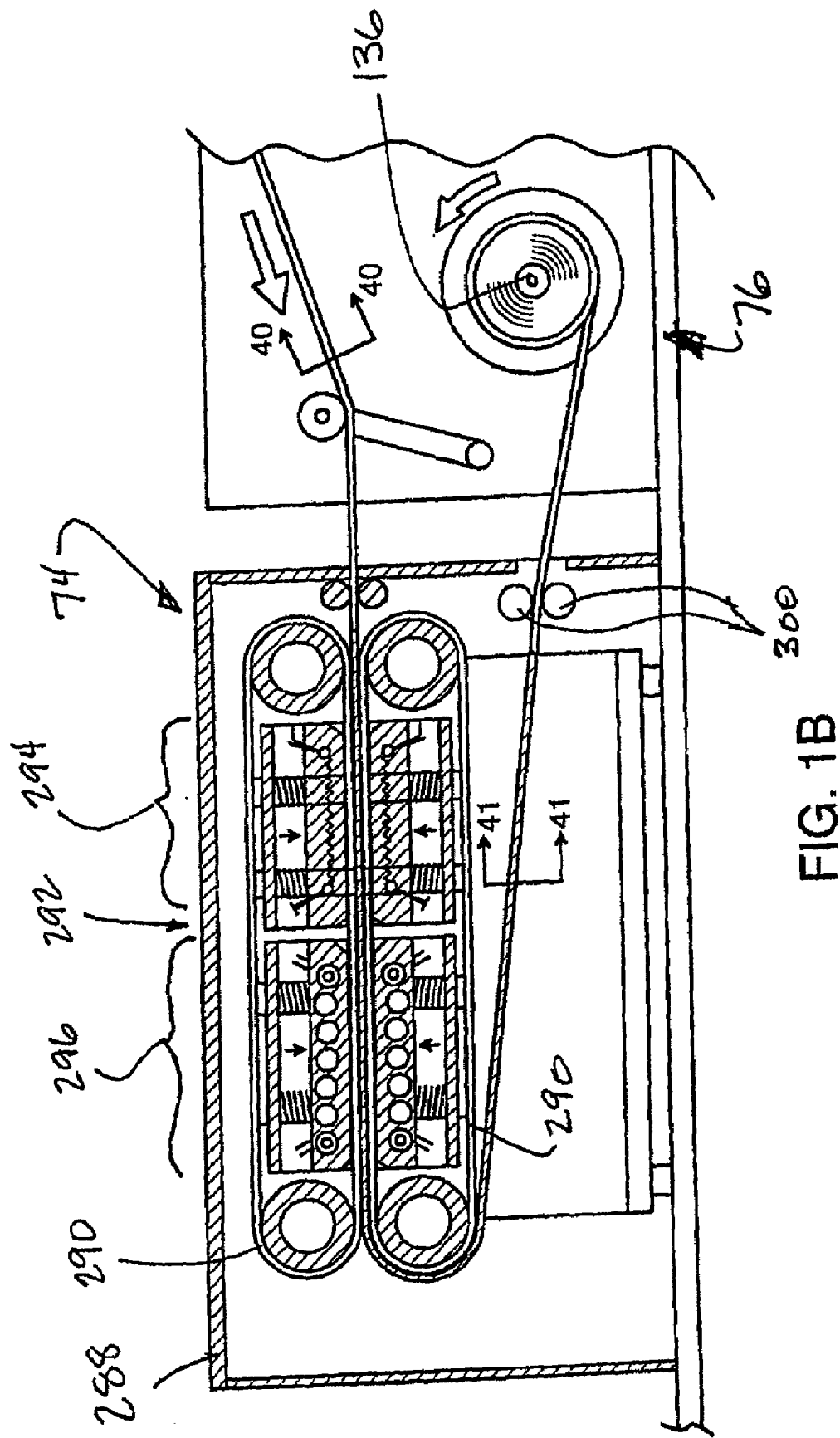
FIG. 1B is a diagrammatic vertical section taken through a flat bed laminator that can form part of the apparatus shown in FIG. 1.

If desired, the bond between the warp yarns and weft yarns can be made more intimate, for example by heating and cooling the product under pressure, e.g., by a lamination apparatus. One embodiment of a flat bed laminator 74 as illustrated in FIG. 1B, may be positioned between the drive roller 133 and the take-up roller 136. The flat bed laminator may be of a conventional type manufactured by Reliant of Great Britain and serves to further enhance the above described heating and cooling stations 68 and 70 respectively. The flat bed laminator reheats and then cools the nonwoven fabric 131 to set the adhesive in a flat as opposed to cylindrical configuration which is sometimes advantageous depending upon the type of yarns utilized and further enhances the bond as well.

Figure 41:
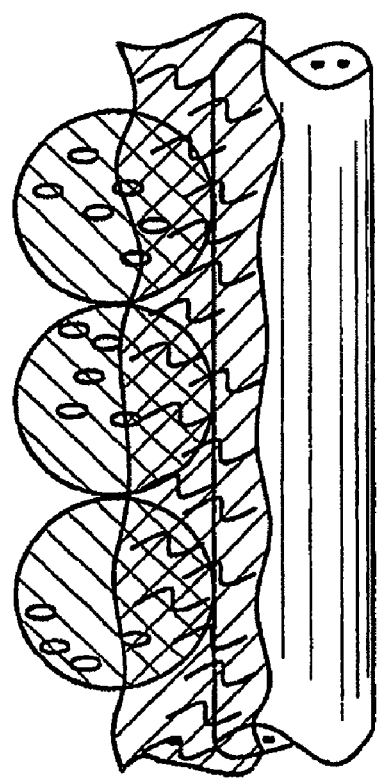
FIG. 41 is an enlarged fragmentary section taken along line 41-41 of FIG. 1B.
Figure 40:
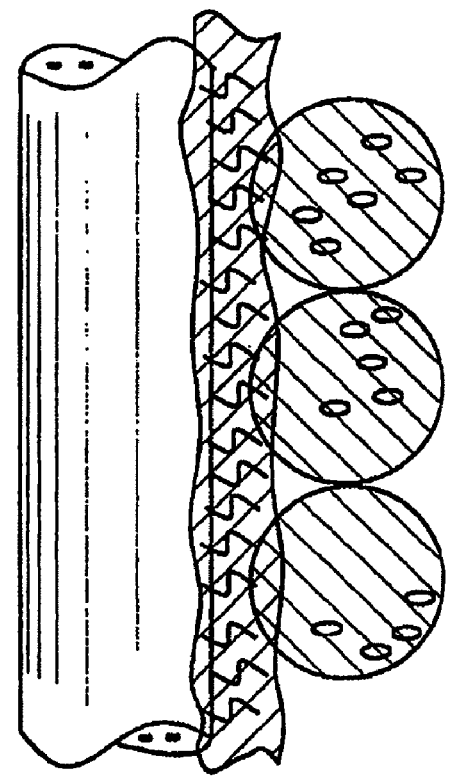
FIG. 40 is an enlarged fragmentary section taken along line 40-40 of FIG. 1B.

A diagrammatic representation of a flat bed laminator of the type that might be employed in the apparatus of the present invention is shown in FIG. 1B. It will there be appreciated that the laminator is disposed at the downstream end of the apparatus in a position to receive the laminated fabric material 131 of the present invention. The laminator includes a housing 288 in which are disposed a pair of driven pressure belts 290 between which the laminate passes and is driven through a heating/cooling system 292 with a first segment of the system comprising a heater 294 with conventional heating coils or the like above and below the fabric and the second segment of the system being a cooler 296 with conventional cooling lines above and below the fabric. Accordingly, as the fabric passes through the heating/cooling system the adhesive is initially reactivated or remelted with the laminate in a flat orientation and shortly thereafter the laminate is cooled to thereby set the adhesive. Pressure is applied to the laminate by the pressure belts 290 as it advances through the heating/cooling system from above and below the laminate so that the cross-section of the laminate changes from the arrangement illustrated in FIG. 41 where the weft yarns are lightly bonded to the warp yarns to an orientation as shown in FIG. 42 where the weft yarns are further embedded in the adhesive and, therefore, more tightly adhered to the warp yarns.

After leaving the cooler 296, the fabric passes around the end of the lower pressure belt 290 and then is directed upstream through a pair of idler rollers 300 and onto the take-up roll 136 at the downstream end of the manufacturing apparatus.

An especially preferred high pressure lamination apparatus 400 is illustrated in FIGS. 71 through 77. The laminator 400 comprises a housing or frame in which a pressure box is mounted. The pressure box comprises two spaced apart pressure sections, an upper section and a lower section, wherein the space formed between the two pressure sections defines the lamination section. Two counter rotating drive belts, an upper drive belt and a lower drive belt, are rotatably mounted in the housing or frame, and the belts contact one another and are pulled through the lamination section by drive rollers mounted at the outlet end. A pressure generator is used to supplying air (or other fluid medium—liquid or gas) pressure to the upper and lower sections of the pressure box for compressing substrate materials carried between the two drive belts. Pressure is maintained because the box has pressure seals all around the points of contact with the belt. In the rectangular box of the current preferred embodiment, side seals are provided on the sides of both the upper and lower sections of the pressure box. Inlet and outlet seals are also provided on the upper and lower sections of the pressure box, ensuring that the desired diaphragm effect can be created therein. When pressurized, the apparatus caused the pressure lamination of substrates situated between the two belts.

Figure 71:
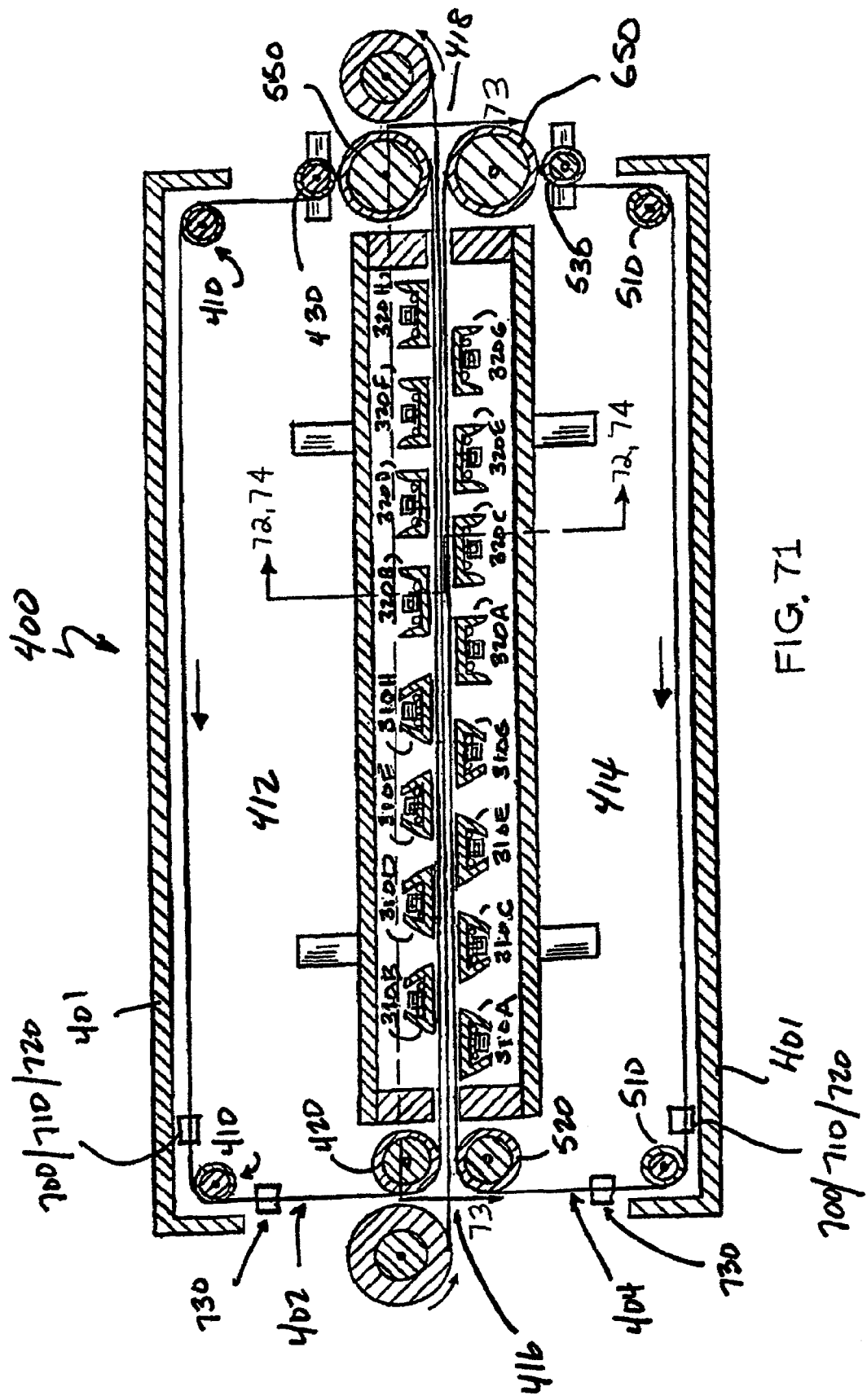
FIG. 71 is a side view of a preferred embodiment of the pressure box and drive belt system for the laminator of the invention in which eight heater bars (four in each section) and eight cooling bars (four in each section) are used for pressure lamination of nonwoven fabric substrates.

Referring to FIG. 71, a number of the essential components of the preferred pressure box 401 used in the pressure laminator of the present invention are shown in cross-section. As illustrated, two rotatable belts, top belt 402 and bottom belt 404, mounted on a plurality of support rollers (top—410, 420, 430; bottom—510, 520, 530), are pulled through the pressure box 401, between the upper section 412 and the lower section 414, entering at the inlet end 416 and exiting at the outlet end 418, by their respective drive rollers 550 (top) and 650 (bottom).

Alignment of the two rotating belts 402 and 404, is maintained by an electric alignment system comprising an alignment carriage 700, alignment pivot 710, electric alignment servo 720 and electric alignment eye 730. If either of the belts move out of alignment, the electric eye 730 detects the same and activates the alignment servo, which causes the belt to be adjusted as necessary by lateral movement of the alignment carriage 700.

Eight spaced apart radiant heat bars (310A, 310B, 310C, 310D . . . 310H) are shown at the inlet end 416 of pressure box 401 and eight spaced apart cooling bars (320A, 320B, 320C, 320D . . . 320H) are shown at the outlet end 418 of pressure box 401. Four of the heat bars are rigidly mounted in the lower section 414 of the pressure box 401, namely heat bars 310A, 310C, 310E and 310G. The other four radiant heat bars (310B, 310D, 310F and 310H) are flexibly mounted such that they float above the upper belt, permitting materials of varied thickness to pass there under. Four of the cooling bars are rigidly mounted in the lower section 414 of the pressure box 401, namely cooling bars 320A, 320C, 320E and 320G. The other four cooling bars (320B, 320D, 320F and 320H) are flexibly mounted such that they float above the upper belt, permitting materials of varied thickness to pass there under.

As illustrated, the plurality of heating and cooling bars are preferably arranged in a staggered configuration. Thus, the substrate is heated from below, then above, then below, etc., and the cooling is accomplished in the same manner; the substrate is cooled from below, then above, then below, etc. This arrangement permits rapid and uniform heating, as well as rapid and uniform cooling of the substrate materials being laminated in the pressure laminator. The uniformity of heating and cooling under pressure leads to improved physical characteristics of the resulting laminates. In the case of nonwoven fabrics laminated in this manner, shrinkage of the fabrics is held to a minimum and the resulting laminated material has the appearance and feel of a woven fabric.

In the preferred embodiment, at least 75 percent of the belt width is heated and cooled by these elements. For example, on a 29 inch wide belt, the central 22 inches are heated and cooled. On a 76 inch wide belt, the central 60 inches would be heated and cooled. The Reliant ER177A heat bars (England) are each provided with a thermocouple to measure the temperature delivered to the belts. The cooling bars are each provided with water fed cooling pipes.

The thickness of the PTFE impregnated fiberglass belt can be modified as desired, and depends on the nature of the materials being laminated and the desired operating speed in feet per minute (fpm). For laminating nonwoven fabrics, a belt thickness ranging from 2 to 20 mil, preferably 5 to 15 mil has been found satisfactory. Belts of 14 mil thickness have been operated at 5 fpm, with a temperature of 380° F. being delivered to the substrates. Belts of 5 mil thickness have been operated at 12 fpm, with a temperature of 380° F. being delivered to the substrates. Optimum belt speeds of 50, 60, 70 . . . 100 fpm can be achieved by modification of the belt thickness and/or composition. The optimum belt speed for nonwoven fabric lamination is currently believed to be 60-70 fpm. Another way in which to achieve higher speeds is to simply increase the size of the laminator apparatus. The current preferred apparatus has a length of about 4 feet. Increasing the size from 2 times to 10 times would allow for faster operating speeds.

During the lamination process the substrate material may create a counter-pressure as any entrapped air in the substrates expands. To deal with this counter-pressure, at least one (or both) of the PTFE (Teflon®) impregnated fiberglass drive belts used in the pressure laminator of the present invention can be modified on the outside edges, to comprise a thick (about 0.125 inch) porous glass fiber mat (not shown). This porous glass fiber mat allows the expanded air from the heated laminate to escape via this sideways (transverse) porosity.

Figure 72:
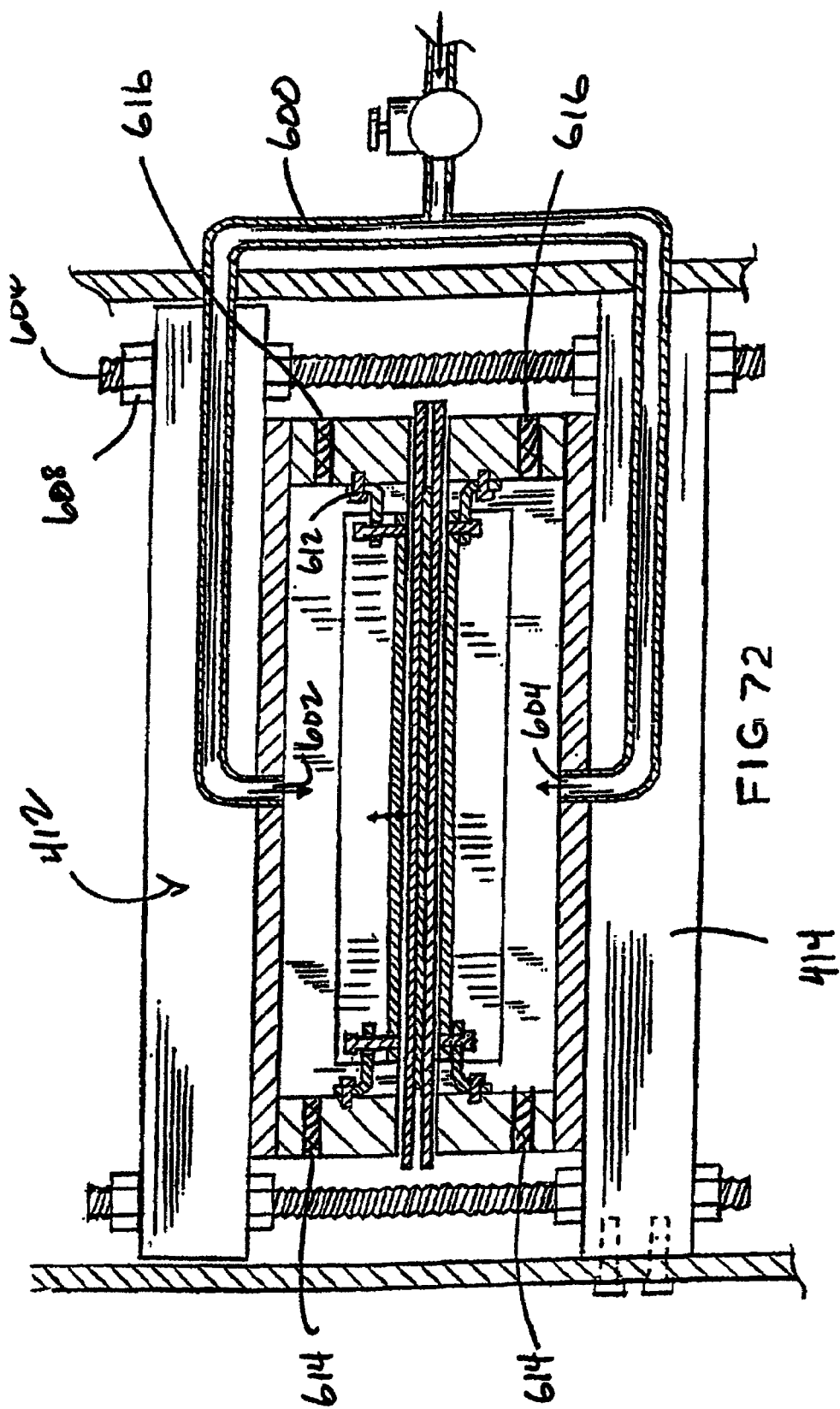
FIG. 72 is an end view of the pressure box of FIG. 71, which shows the pressure delivery system for the upper and lower sections of the pressure box.

FIG. 72 illustrates in cross-section, one view of pressure box 1, showing in particular the air pressure feed line 600, and the preferred points of contact thereof 602 and 604 with the upper section 412 and lower section 414 of the pressure box, respectively. The pressure box is advantageously made out of metal, such as aluminum (from 2 to 5 inches thick) and is held together by a plurality of threaded steel rods and nuts 606 and 608. As shown in FIG. 72, the heating and cooling bars located in the lower section 414 of the pressure box are locked in place at each end by a fixed bracket 610. The heating an cooling bars located in the upper section 412 of the pressure box ride on a pin bracket mount 612, which allows upward motion of the bars, while gravity keeps the bars resting on the upper belt A plurality of cooling water lines, inlet 614 and outlet 616 are also shown in this illustration. The electrical heating wires (not shown) are provided in a manner similar to the water lines.

Figure 73:
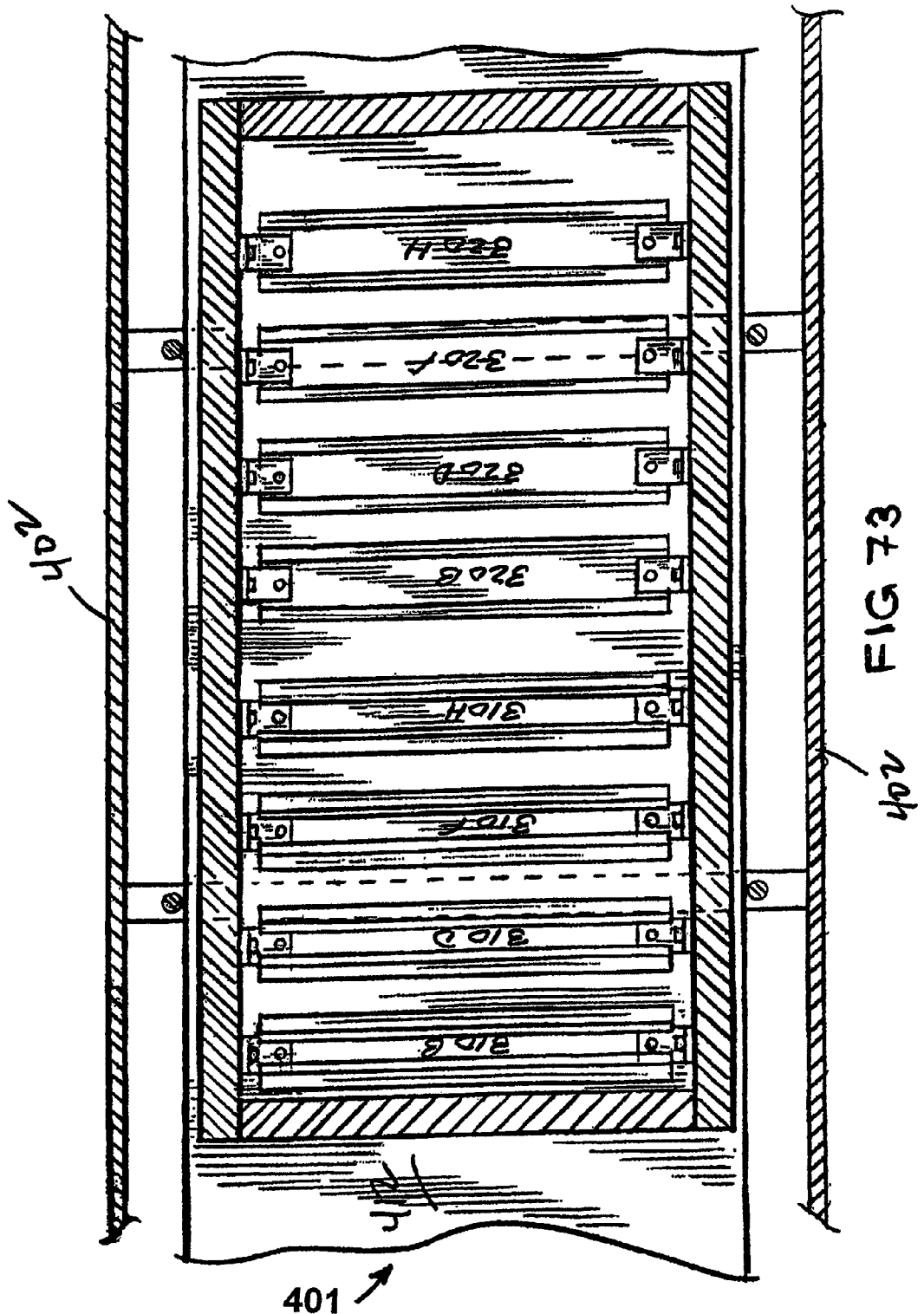
FIG. 73 is a top view of the upper section of the pressure box of FIG. 71, showing the spacing of the heating and cooling bars.

FIG. 73 illustrates a top view of the interior of the upper section 412 of the pressure box 401, showing the currently preferred arrangement of the upper heating bars (310B, 310D, 310F and 310H) and cooling bars (320B, 320D, 320F and 320H). The pressurized box 401 is held together by steel bars 700 mounted to the threaded rods 706 shown in the four corners. Not shown in this illustration are the nuts that thread thereon. The sides 402 of the housing or frame, to which the steel bars and all rollers and controls are mounted, are also shown in this figure.

Figure 74:
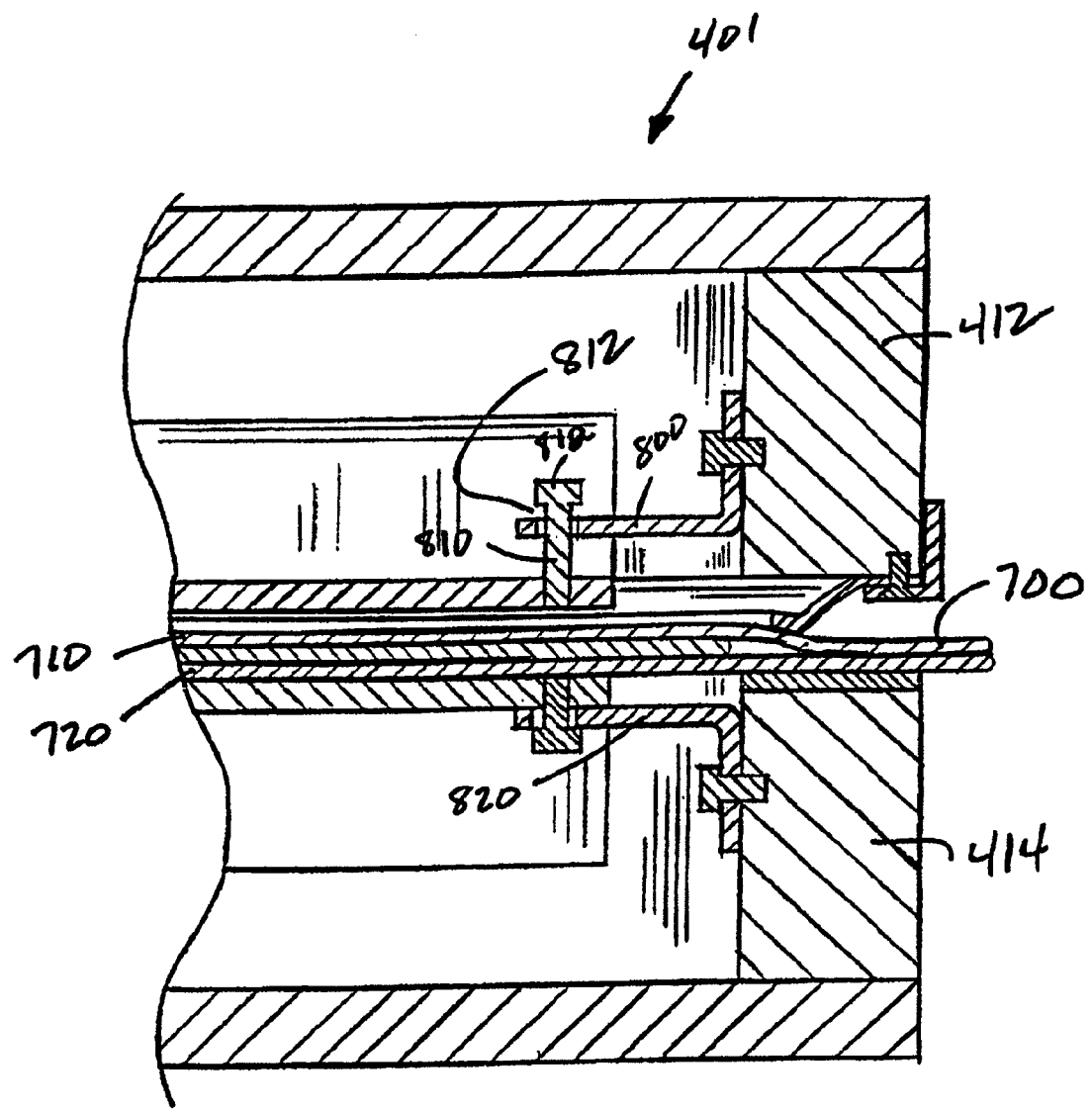
FIG. 74 is a side view of the pressure box of FIG. 71, showing the mounting brackets for the upper section (displaceable) heating and cooling bars and the mounting brackets for the lower section (fixed) heating and cooling bars. Also shown is one embodiment of a side sealing element.

FIG. 74 illustrates, the pin bracket 812 for the upper section, vertically displaceable, heating and cooling bars. As illustrated, the pin bracket comprises a steel mounting bracket 800, fixed at one end to the aluminum side wall of the upper section 412 of the pressure box. A slot (not shown) is provided near the opposite end of bracket 800, through which a post 810 rides. The post 810 is mounted to the top of the heating or cooling bar at one end and capped at the opposite end 812, thereby limiting the vertical displacement distance of the heating and cooling bars. The bracket for the lower section heating and cooling bars 820 is also a steel bracket, but it is rigidly attached to both the heating and cooling bars and the aluminum side wall of the lower section 414 of the pressure box.

Figure 75:
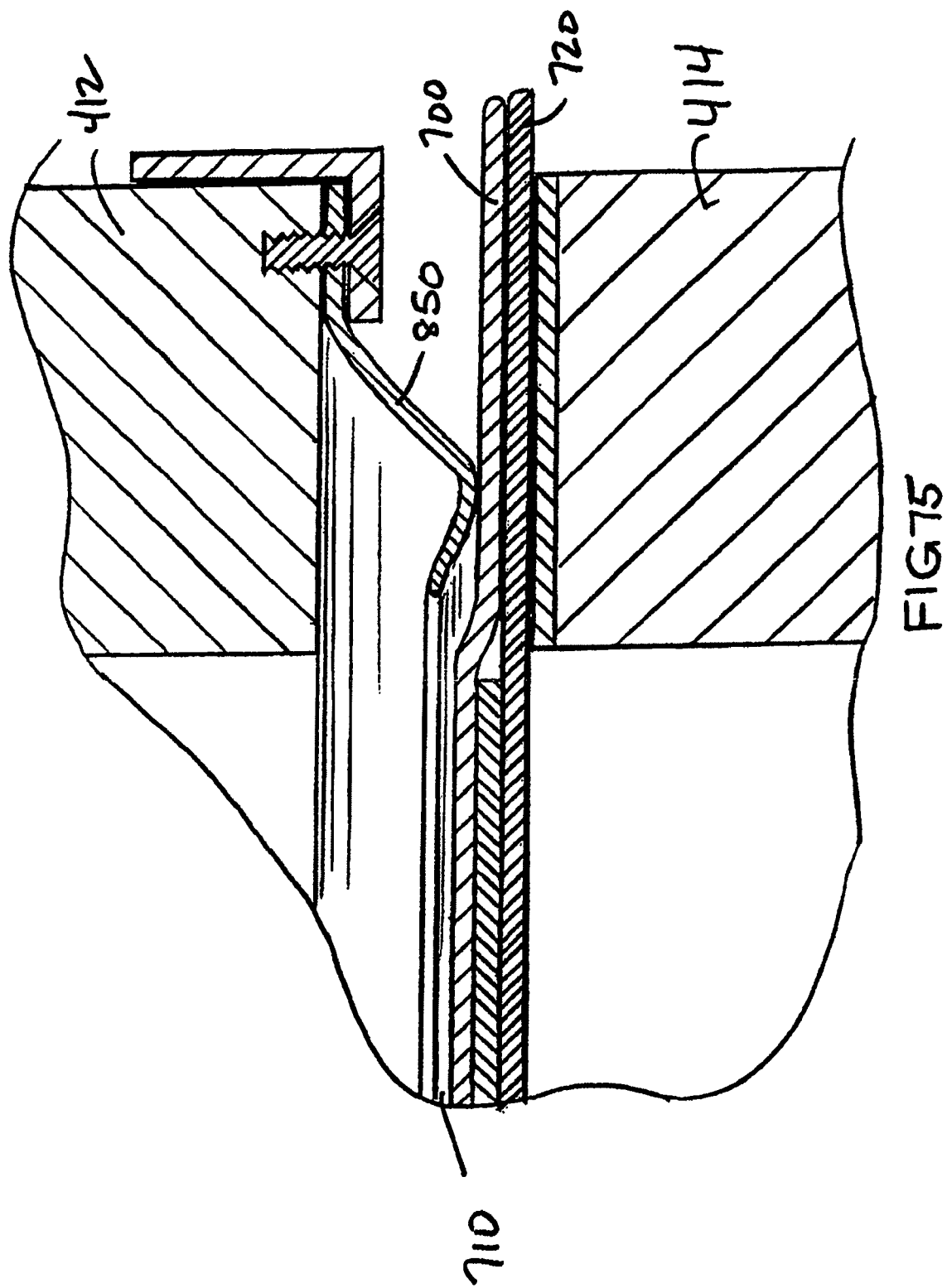
FIG. 75 illustrates the side pressure seal of FIG. 74 in greater detail.

A suitable inlet and side pressure seal 850 is illustrated in FIG. 74 and illustrated in greater detail in FIG. 75. This seal is formed from a high temper curved aluminum slat 700 (0.008×1⅜") sandwiched between 2 mil PTFE (Teflon®) tape 710 on the upper side and 10 mil ultrahigh molecular weight polyethylene tape 720 on the bottom side. The seal is held in place by a steel bracket 870.

Figure 76:
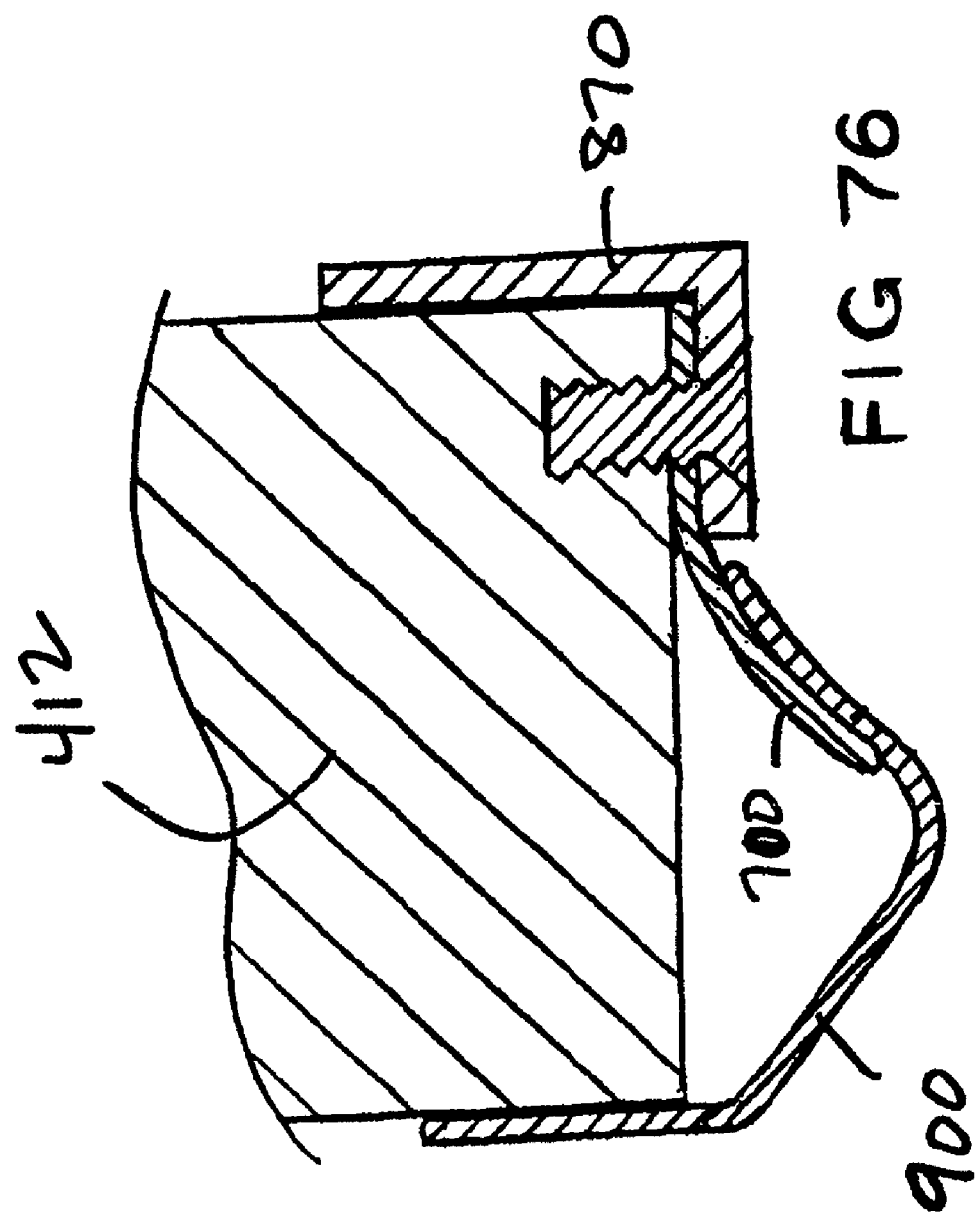
FIG. 76 is a side view of the pressure box of FIG. 71, showing the pressure box inlet pressure seal element.
Figure 77:
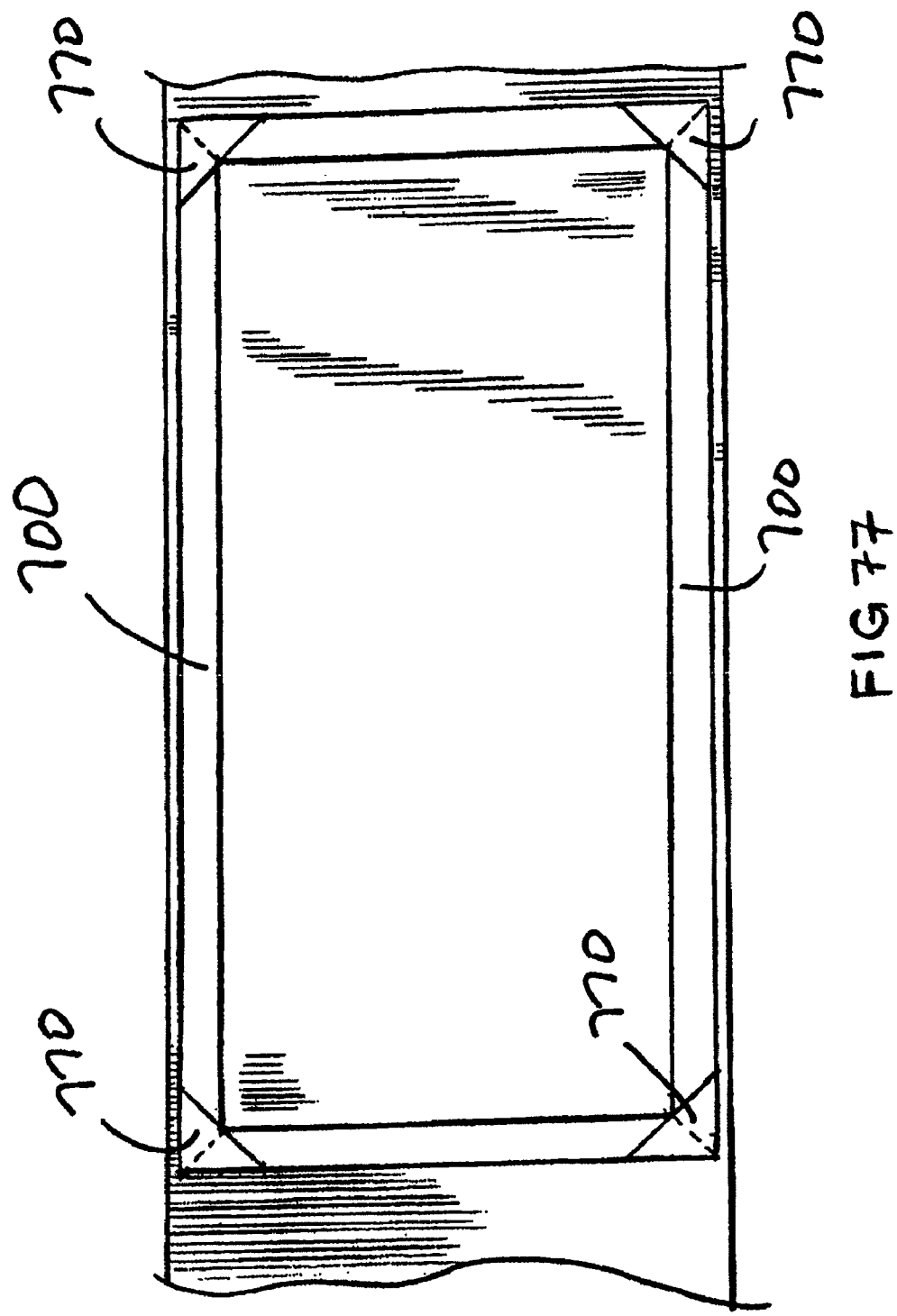
FIG. 77 is a side view of the pressure box of FIG. 71, showing the pressure box outlet pressure seal.

As illustrated in FIGS. 76 and 77, it has been discovered that the aluminum pressure seal taught in FIG. 74 can be simplified, such that the side and inlet pressure seals consist predominantly of the curved aluminum slat 700 as previously described. The ultrahigh molecular weight polyethylene tape can be omitted and the PTFE tape can be omitted, except in the corners 770 of the pressure box, where the tapes still prove useful. This improved side seal and inlet pressure seal is best illustrated in FIG. 76.

The inlet and outlet pressure seals are best illustrated in FIG. 76. In addition to the curved aluminum slat 700, the belt side of the aluminum slat is coated with 5 mil PTFE (Teflon®) fiberglass cloth 900, which extends beyond the end of the aluminum seal and mounts to the inside of the pressure box frame. This exit seal design keeps the drive belt from binding on the aluminum slat.

In use, the combined composite fabric material formed by the XD apparatus, which has adhesive between a layer of aligned warp yarns on one side and a layer of weft yarns substantially perpendicular to the warp yarns on the other side, is fed to the pressure laminator, either directly (as with the flat bed laminator described above), or by a feed roll. The composite material is drawn into the pressure box by the drive belts, through the inlet seal and into the pressurized heating zone. The heating zone melts the adhesive between the fabric layers and causes the adhesive bridges to flow and spread between the layers of fabric. The pressure holds the fabric in place, preventing shrinkage, and the cooling zone, which has the same pressure as the heating zone, cools the melted adhesive and fixes the bond between the layers of fabric. This nonwoven fabric material has very high strength characteristics and antifray characteristics, and represents yet another especially preferred embodiment of the present invention.

SUMMARY

It will be appreciated that one or all of the above-described nonwoven embodiments could be run through one of the adhesive application stations a second time so that adhesive would be applied to the laminate and then the adhesive covered laminate secured to the warp yarns or other substrate to form a new warp yarn material that has the laminate secured thereto for passage through the nonwoven apparatus again so that a multiple layer laminate of warp and weft yarns could be laid down. It is also within the realm of this invention to include multiple weft application stations spinning in the same direction or in opposite directions to create various weft yarn angles of lay down. Yet another potential embodiment is to laminate films on the front or back of the nonwoven product of the invention for structural or performance reasons. Alternatively, a film could also be positioned between the warp and the weft yarns so that the yarns would then provide structural support to the film.

A key feature of the nonwoven apparatus of the present invention is that it provides a method of engineering a nonwoven article. The weft yarns can have different properties, the warp yarns can have different properties, the distance between warp yarns and the distance between weft yarns can be adjusted, the amount and type of adhesive can be adjusted, the angle of the weft yarns relative to the warp yarns can be adjusted and the multiple weft application and warp supply stations can be used to create a multitude of different structures very efficiently and at high speed. As a result of the above, the nonwoven product can also have the same or different strengths in its warp and weft directions.

Although the present invention has been described with a certain degree of particularity, it is understood that the present disclosure has been made by way of example, and changes in detail or structure may be made without departing from the spirit of the invention as defined in the appended claims.

What claimed is:

1. A method of forming a non-woven fabric, comprising the steps of:
   providing a supply of elongated side-by-side warp yarns;
   applying an adhesive scrim to only one side of the elongated side-by-side warp yarns to form an elongated warp sheet, wherein the adhesive scrim defines a web of adhesive strands that extend between adjacent warp yarns on said one side of the warp sheet to hold the warp yarns in a substantially parallel and non-twisting relationship;
   forming the warp sheet into a substantially cylindrical configuration, wherein the adhesive scrim on said one side of the warp sheet is exposed;
   moving the cylindrically-formed warp sheet along a linear path while transversely wrapping weft yarns around the cylindrically-formed warp sheet;

adhering the weft yarns to the adhesive scrim on said one side of the cylindrically-formed warp sheet to form a substantially cylindrical non-woven fabric of said warp and weft yarns; and cutting the substantially cylindrical non-woven fabric along the linear path to free the non-woven fabric from its cylindrical form.

2. The method of claim 1 further including the step of applying heat to soften the adhesive scrim after wrapping the weft yarns around the cylindrically-formed warp sheet.

3. The method of claim 2 further including the step of cooling the adhesive scrim after softening the adhesive scrim with heat.

4. The method of claim 1 further including the step of unfolding the non-woven fabric, after the step of cutting the substantially cylindrical non-woven fabric, to form a relatively flat non-woven fabric.

5. The method of claim 4 further including the step of accumulating the relatively flat non-woven fabric on a drum.

6. The method of claim 1 wherein the weft yarns are pulled from a plurality of circumferentially spaced spools surrounding the linear path of the cylindrically-formed warp sheet and are transversely wrapped around the cylindrically-formed warp sheet.

7. The method of claim 6 wherein said plurality of spools are mounted on a drum that is rotatable about the linear path.

8. The method of claim 7 further including the step of delivering all of the weft yarns from the plurality of spools to one end of the drum along the linear path before transversely wrapping the weft yarns around the cylindrically-formed warp sheet.

9. The method of claim 8 further including the step of providing a uniform level wrapping of the weft yarns around the cylindrically-formed warp sheet at said one end.

10. The method of claim 1 further including the step of maintaining a predetermined tension in the weft yarns before wrapping the weft yarns around the cylindrically-formed warp sheet.

11. The method of claim 1 wherein the adhesive strands are applied only to a radially outermost surface of the warp yarns on said one side of the warp yarns.

12. The method of claim 11 wherein the web of adhesive strands are randomly oriented providing gaps within the scrim so that portions of the weft yarns are not adhesively connected to the warp yarns.

13. The method of claim 12 wherein the adhesive scrim has a basis weight that is about 5-20% of the total weight of the non-woven fabric.

14. The method of claim 12 wherein the adhesive scrim has a basis weight of approximately 15 grams per square meter.

15. The method of claim 11 wherein the step of applying an adhesive scrim to only one side of the warp yarns further comprises:

passing the adhesive scrim over an upper surface of a carrier roll; and feeding said one side of the warp yarns downwardly onto an underside of the carrier roll to merge the adhesive scrim with said one side of the warp yarns.

16. The method of claim 15 wherein the step of applying an adhesive scrim to only one side of the warp yarns further comprises:

positioning an infrared heater adjacent to the upper surface of the carrier roll so that the adhesive scrim passes underneath the infrared heater prior to the step of merging the adhesive scrim with said one side of the warp yarns; and internally cooling the carrier roll so that only an outer surface of the adhesive scrim is activated by the infrared heater.

* * * * *